US011354718B2

(12) United States Patent
Fredrich et al.

(10) Patent No.: US 11,354,718 B2
(45) Date of Patent: Jun. 7, 2022

(54) DYNAMIC PROCESSING OF ELECTRONIC MESSAGING DATA AND PROTOCOLS TO AUTOMATICALLY GENERATE LOCATION PREDICTIVE RETRIEVAL USING A NETWORKED, MULTI-STACK COMPUTING ENVIRONMENT

(71) Applicants: Paul Fredrich, Brooklyn, NY (US); Michael Bifolco, Irvington, NY (US); Greg E. Alvo, Brooklyn, NY (US); Ofir Shalom, Jersey City, NJ (US)

(72) Inventors: Paul Fredrich, Brooklyn, NY (US); Michael Bifolco, Irvington, NY (US); Greg E. Alvo, Brooklyn, NY (US); Ofir Shalom, Jersey City, NJ (US)

(73) Assignee: OrderGroove, Inc., New York, NY (US)

( * ) Notice: Subject to any disclaimer, the term of this patent is extended or adjusted under 35 U.S.C. 154(b) by 316 days.

(21) Appl. No.: 16/779,601

(22) Filed: Feb. 1, 2020

(65) Prior Publication Data
US 2020/0250728 A1  Aug. 6, 2020

Related U.S. Application Data

(63) Continuation of application No. 16/046,690, filed on Jul. 26, 2018, now Pat. No. 10,586,266, which is a
(Continued)

(51) Int. Cl.
*G06Q 30/06* (2012.01)
*G06Q 10/08* (2012.01)
(Continued)

(52) U.S. Cl.
CPC ....... *G06Q 30/0625* (2013.01); *G06F 16/211* (2019.01); *G06F 16/9537* (2019.01);
(Continued)

(58) Field of Classification Search
None
See application file for complete search history.

(56) References Cited

U.S. PATENT DOCUMENTS

| 4,814,996 A | 3/1989 | Wang |
| 4,869,266 A | 9/1989 | Taylor et al. |
| | (Continued) | |

FOREIGN PATENT DOCUMENTS

| AU | 8694301 A | 3/2002 |
| JP | 2000148432 A | 5/2000 |
| WO | 2019089480 A2 | 5/2019 |

OTHER PUBLICATIONS

Amazon Dash Replenishment Adds New Device Makers and Launches New Products. Retrieved from . Originally published Nov. 22, 2016. (Year: 2016).
(Continued)

*Primary Examiner* — Mehmet Yesildag
(74) *Attorney, Agent, or Firm* — Kokka & Backus, PC

(57) ABSTRACT

Various embodiments relate generally to computer science, data science, software, and computer program and platform architectures, including receiving from a device geolocation data and input data, parsing the input data, evaluating the event data and the location data to generate shipment data, parsing the account to identify subscription data, selecting a sample associated with another item, the sample being selected by an adaptive distribution platform, transmitting other data to the device that renders an electronically-displayed message on an interface on the device, calling one or more data services to retrieve item data associated with the item, and generating a retrieval option associated with the item if the threshold, the query, and the additional input data indicates the device is within a numerical range of the
(Continued)

first location or an alternative location and retrieval of the item from the first location is indicated.

20 Claims, 22 Drawing Sheets

Related U.S. Application Data continuation-in-part of application No. 15/821,362, filed on Nov. 22, 2017, now Pat. No. 10,719,860, and a continuation-in-part of application No. 15/716,486, filed on Sep. 26, 2017, now Pat. No. 11,144,980, which is a continuation-in-part of application No. 15/479,230, filed on Apr. 4, 2017.

(60) Provisional application No. 62/425,191, filed on Nov. 22, 2016.

(51) Int. Cl.
    *H04L 51/046*     (2022.01)
    *G06F 17/18*     (2006.01)
    *H04W 4/021*     (2018.01)
    *G06F 16/21*     (2019.01)
    *G06F 40/205*     (2020.01)
    *G06F 16/9537*     (2019.01)

(52) U.S. Cl.
CPC ............ *G06F 17/18* (2013.01); *G06F 40/205* (2020.01); *G06Q 10/083* (2013.01); *G06Q 30/0631* (2013.01); *H04L 51/046* (2013.01); *H04W 4/021* (2013.01)

(56) References Cited

U.S. PATENT DOCUMENTS

| | | | |
|---|---|---|---|
| 5,090,734 A * | 2/1992 | Dyer | ............... B42D 15/00 283/67 |
| 6,204,763 B1 | 3/2001 | Sone | |
| 6,415,262 B1 | 7/2002 | Walker et al. | |
| 6,963,848 B1 | 11/2005 | Brinkerhoff | |
| 7,251,617 B1 | 7/2007 | Walker et al. | |
| 7,295,990 B1 | 11/2007 | Braumoeller et al. | |
| 7,340,414 B2 | 3/2008 | Roh et al. | |
| 7,353,194 B1 | 4/2008 | Kerker et al. | |
| 7,540,767 B1 | 6/2009 | Czarnecki | |
| 7,552,068 B1 * | 6/2009 | Brinkerhoff | ....... G06Q 30/0236 705/14.36 |
| 7,747,543 B1 | 6/2010 | Braumoeller et al. | |
| 7,953,645 B2 | 5/2011 | Kerker et al. | |
| 8,121,876 B1 | 2/2012 | Braumoeller et al. | |
| 8,126,784 B1 | 2/2012 | Agarwal | |
| 8,353,448 B1 | 1/2013 | Miller et al. | |
| 8,370,271 B1 | 2/2013 | Robinson et al. | |
| 8,417,639 B1 | 4/2013 | Baram | |
| 8,428,988 B1 | 4/2013 | Braumoeller et al. | |
| 8,458,051 B1 | 6/2013 | Saltzman et al. | |
| 8,498,888 B1 * | 7/2013 | Raff | .................... G06Q 10/087 705/28 |
| 8,620,707 B1 | 12/2013 | Belyi et al. | |
| 8,818,836 B1 | 8/2014 | Braumoeller et al. | |
| 8,867,401 B1 | 10/2014 | Tomay et al. | |
| 8,924,262 B2 | 12/2014 | Shuster | |
| 9,047,607 B1 | 6/2015 | Curial et al. | |
| 9,134,675 B2 | 9/2015 | Yang et al. | |
| 9,659,310 B1 * | 5/2017 | Allen | ................. G06Q 30/0259 |
| 9,792,643 B1 | 10/2017 | Masterman | |
| 9,886,810 B1 | 2/2018 | Murphy | |
| 9,959,565 B2 | 5/2018 | Shuster | |
| 10,262,294 B1 | 4/2019 | Hahn et al. | |
| 10,275,740 B2 | 4/2019 | Alvo et al. | |
| 10,332,067 B2 | 6/2019 | Sirisilla et al. | |
| 10,360,617 B2 | 7/2019 | High et al. | |
| 10,430,858 B1 | 10/2019 | Glasgow et al. | |
| 10,445,751 B2 | 10/2019 | Nakano et al. | |
| 10,453,112 B2 | 10/2019 | Alvo et al. | |
| 10,586,266 B2 | 3/2020 | Fredrich et al. | |
| 10,614,501 B2 | 4/2020 | Fredrich et al. | |
| 10,719,860 B2 | 7/2020 | Bifolco et al. | |
| 10,769,708 B2 | 9/2020 | Alvo et al. | |
| 10,796,274 B2 | 10/2020 | Putcha et al. | |
| 10,817,885 B2 | 10/2020 | Concannon et al. | |
| 11,144,980 B2 | 10/2021 | Fredrich et al. | |
| 2002/0161652 A1 | 10/2002 | Paullin et al. | |
| 2002/0161670 A1 | 10/2002 | Walker et al. | |
| 2003/0004784 A1 | 1/2003 | Li et al. | |
| 2003/0110103 A1 | 6/2003 | Sesek et al. | |
| 2003/0195788 A1 | 10/2003 | Loeb et al. | |
| 2003/0212614 A1 | 11/2003 | Chu et al. | |
| 2004/0111326 A1 | 6/2004 | Rock et al. | |
| 2004/0162880 A1 | 8/2004 | Arnone et al. | |
| 2005/0150951 A1 | 7/2005 | Sacco et al. | |
| 2005/0165656 A1 | 7/2005 | Frederick et al. | |
| 2008/0015951 A1 | 1/2008 | Kerker et al. | |
| 2008/0071626 A1 | 3/2008 | Hill | |
| 2009/0024801 A1 | 1/2009 | Choi et al. | |
| 2009/0094121 A1 | 4/2009 | Newhouse et al. | |
| 2010/0102082 A1 | 4/2010 | Ebrom et al. | |
| 2010/0217450 A1 | 8/2010 | Beal et al. | |
| 2010/0280960 A1 | 11/2010 | Ziotopoulos et al. | |
| 2011/0032070 A1 | 2/2011 | Bleile | |
| 2011/0054935 A1 | 3/2011 | Hardaway | |
| 2011/0153466 A1 | 6/2011 | Harish et al. | |
| 2011/0246215 A1 | 10/2011 | Postma et al. | |
| 2011/0251807 A1 | 10/2011 | Rada et al. | |
| 2011/0258072 A1 | 10/2011 | Kerker et al. | |
| 2012/0004977 A1 | 1/2012 | Daniels, Jr. et al. | |
| 2012/0036045 A1 | 2/2012 | Lowe et al. | |
| 2012/0124859 A1 | 5/2012 | May et al. | |
| 2012/0150461 A1 | 6/2012 | Ohiwa et al. | |
| 2012/0150677 A1 | 6/2012 | Shuster | |
| 2013/0041605 A1 | 2/2013 | Ting et al. | |
| 2013/0080968 A1 | 3/2013 | Hanson et al. | |
| 2013/0117053 A2 | 5/2013 | Campbell | |
| 2013/0128396 A1 | 5/2013 | Danesh et al. | |
| 2013/0159454 A1 | 6/2013 | Hunter et al. | |
| 2013/0268315 A1 | 10/2013 | Cotton et al. | |
| 2014/0012706 A1 | 1/2014 | Foerster | |
| 2014/0191573 A1 | 7/2014 | Chen et al. | |
| 2014/0258165 A1 | 9/2014 | Heil | |
| 2014/0279208 A1 * | 9/2014 | Nickitas | ............. G06Q 30/0631 705/26.7 |
| 2014/0279215 A1 | 9/2014 | Alvo et al. | |
| 2014/0279291 A1 | 9/2014 | Brosnan et al. | |
| 2014/0297487 A1 | 10/2014 | Bashkin | |
| 2014/0304026 A1 | 10/2014 | Delaney et al. | |
| 2014/0324598 A1 | 10/2014 | Freeman | |
| 2015/0019342 A1 | 1/2015 | Gupta | |
| 2015/0105880 A1 | 4/2015 | Slupik et al. | |
| 2015/0106228 A1 | 4/2015 | Shuster | |
| 2015/0106238 A1 | 4/2015 | Shuster | |
| 2015/0112826 A1 | 4/2015 | Crutchfield, Jr. | |
| 2015/0127421 A1 | 5/2015 | Nakano et al. | |
| 2015/0178654 A1 | 6/2015 | Glasgow et al. | |
| 2015/0261644 A1 | 9/2015 | Zhang et al. | |
| 2015/0302510 A1 | 10/2015 | Godsey et al. | |
| 2015/0363866 A1 | 12/2015 | Depew | |
| 2015/0363867 A1 | 12/2015 | Tipton et al. | |
| 2016/0034024 A1 | 2/2016 | Mergen | |
| 2016/0148149 A1 | 5/2016 | Suddamalla et al. | |
| 2016/0218884 A1 | 7/2016 | Ebrom et al. | |
| 2016/0231792 A1 | 8/2016 | Richter et al. | |
| 2016/0275424 A1 | 9/2016 | Concannon et al. | |
| 2016/0275530 A1 * | 9/2016 | Concannon | ........ G06Q 30/0601 |
| 2016/0286059 A1 | 9/2016 | Hitaka | |
| 2016/0314514 A1 | 10/2016 | High et al. | |
| 2016/0356641 A1 | 12/2016 | Larson | |
| 2016/0371762 A1 | 12/2016 | Fergis et al. | |
| 2017/0011304 A1 | 1/2017 | Shimizu | |
| 2017/0019266 A1 | 1/2017 | Lim et al. | |
| 2017/0032101 A1 | 2/2017 | Skoda | |
| 2017/0109687 A1 | 4/2017 | Kamadolli et al. | |

(56) References Cited

U.S. PATENT DOCUMENTS

| | | | |
|---|---|---|---|
| 2017/0134182 A1 | 5/2017 | Davis et al. |
| 2017/0206489 A1 | 7/2017 | Sirisilla et al. |
| 2017/0300984 A1 | 10/2017 | Hurwich |
| 2018/0005173 A1 | 1/2018 | Elazary et al. |
| 2018/0031616 A1 | 2/2018 | Hansen et al. |
| 2018/0053153 A1 | 2/2018 | Mai |
| 2018/0082038 A1 | 3/2018 | Blair et al. |
| 2018/0089614 A1 | 3/2018 | Laskowitz et al. |
| 2018/0131658 A1 | 5/2018 | Bhagwan et al. |
| 2018/0144290 A1 | 5/2018 | Alvo et al. |
| 2018/0144389 A1 | 5/2018 | Fredrich et al. |
| 2018/0204256 A1 | 7/2018 | Bifolco et al. |
| 2018/0253952 A1 | 9/2018 | Huang |
| 2018/0285809 A1 | 10/2018 | Fredrich et al. |
| 2018/0315111 A1 | 11/2018 | Alvo et al. |
| 2018/0322447 A1 | 11/2018 | Cantrell |
| 2018/0336512 A1 | 11/2018 | Clarke et al. |
| 2018/0349980 A1 | 12/2018 | Alvo et al. |
| 2018/0357688 A1 | 12/2018 | Webb et al. |
| 2018/0365753 A1 | 12/2018 | Fredrich et al. |
| 2019/0066183 A1 | 2/2019 | Fredrich et al. |
| 2019/0073627 A1 | 3/2019 | Nakdimon et al. |
| 2019/0087769 A9 | 3/2019 | Glasgow et al. |
| 2019/0295148 A1 | 9/2019 | Lefkow et al. |
| 2019/0295150 A1 | 9/2019 | High et al. |
| 2019/0392378 A1 | 12/2019 | Alvo et al. |
| 2020/0104903 A1 | 4/2020 | Alvo et al. |
| 2020/0250727 A1 | 8/2020 | Fredrich et al. |
| 2021/0004881 A1 | 1/2021 | Bifolco et al. |
| 2021/0049670 A1 | 2/2021 | Alvo et al. |

OTHER PUBLICATIONS

Eskridge, Cory W., Final Office Action dated Apr. 6, 2021 for U.S. Appl. No. 15/479,230.
Eskridge, Cory W., Non-Final Office Action dated Aug. 18, 2020 for U.S. Appl. No. 15/479,230.
Koester, Michael R., Non-Final Office Action dated Jan. 8, 2021 for U.S. Appl. No. 15/716,486.
Koester, Michael Richard, Final Office Action dated Jun. 5, 2020 for U.S. Appl. No. 15/716,586.
Mitchell, Nathan A., Non-Final Office Action dated Mar. 23, 2021 for U.S. Appl. No. 16/398,241.
Vodnick, Craig, "How Do You Handle Subscription Renewals?", Published Mar. 28, 2011, Cleverbridge Blog, URL: <> (Year: 2011).
Garg, Yogesh C., Non-Final Office Action dated Oct. 18, 2021 for U.S. Appl. No. 16/930,825.
Koester, Michael R., Notice of Allowance and Fee(s) Due, Examiner Interview Summary and Examiner's Amendment dated Jun. 10, 2021 for U.S. Appl. No. 15/716,486.
Mitchell, Nathan A., Final Office Action dated Jul. 28, 2021 for U.S. Appl. No. 15/905,764.
Mitchell, Nathan A., Final Office Action dated Jul. 28, 2021 for U.S. Appl. No. 16/398,241.
"Belkin WeMo Insight Switch", Belkin Instruction Manual, Part# 8830uk17750/SKU: F7C029uk, Oct. 23, 2014, http://www.free-instruction-manuals.com/pdf/pa_1184191.pdf.
"WeMo Insight Smart Plug, F7C029 Frequently Asked Questions", Belkin Knowledge Article, retrieved Nov. 9, 2017, http://www.belkin.com/us/support-article?articleNum=80139.
Alvo et al., "Consumable Usage Sensors and Applications to Facilitate Automated Replenishment of Consumables Via an Adaptive Distribution Platform," U.S. Appl. No. 62/579,871, filed Dec. 31, 2017.
Alvo et al., "Consumable Usage Sensors and Applications to Facilitate Automated Replenishment of Consumables Via an Adaptive Distribution Platform," U.S. Appl. No. 15/801,002, filed Nov. 1, 2017.
Alvo et al., "Consumable Usage Sensors and Applications to Facilitate Automated Replenishment of Consumables Via an Adaptive Distribution Platform," U.S. Appl. No. 62/579,872.
Alvo et al., "Consumable Usage Sensors and Applications to Facilitate Automated Replenishment of Consumables Via an Adaptive Distribution Platform," U.S. Appl. No. 15/801,172, filed Nov. 1, 2017.
Alvo et al., Consumable Usage Sensors and Applications to Facilitate Automated Replenishment of Consumables Via an Adaptive Distribution Platform, U.S. Appl. No. 16/398,241, filed Apr. 29, 2019.
Alvo, Greg, "Automated Method and System for Converting One-Time Buyers of a Product/Service Into Recurring Subscribers", U.S. Appl. No. 61/791,873, filed Mar. 15, 2013.
Amazon, "Order a Subscribe & Save Subscription," archived back at least as far as Oct. 2014, accessed Jul. 10, 2019 at https://web.archive.org/web/20141009140840/http://www.amazon.com/gp/help/customer/display.html?nodeId=201125870.
Anonymous, Amazon.com Launches Magazines Store; Customers Can Now Purchase Magazine Subscriptions for Themselves or as Gifts on Amazon.com, Oct. 30, 2001, Business Water, pp. 1-2. (Year: 2001).
Bargeon, Brittany E., Notice of Allowance and Fee(s) Due for U.S. Appl. No. 13/962,213 dated Jul. 25, 2019.
Bargeon, Brittany E., U.S. Patent and Trademark Office Final Office Action dated Oct. 23, 2015 for U.S. Appl. No. 13/962,213 (24 pages).
Bargeon, Brittany E., U.S. Patent and Trademark Office Non-Final Office Action dated Aug. 14, 2014 for U.S. Appl. No. 13/962,213 (21 pages).
Bargeon, Brittany E., U.S. Patent and Trademark Office Non-Final Office Action dated Jun. 9, 2016 for U.S. Appl. No. 13/962,213 (26 pages).
Bargeon, Brittany E., U.S. Patent and Trademark Office Non-Final Office Action dated Nov. 18, 2016 for U.S. Appl. No. 13/962,213 (22 pages).
Bifolco et al., "Adaptive Scheduling to Facilitate Optimized Distribution of Subscribed Items", U.S. Appl. No. 62/425,191, filed Nov. 22, 2016.
Bifolco et al., "Adaptive Scheduling to Facilitate Optimized Distribution of Subscribed Items," U.S. Appl. No. 15/821,362, filed Nov. 22, 2017.
CTIA's Annual Survey Says US Wireless Providers Handled 3.2 Trillion Megabytes of Data Traffic in 2013 for a 120 Percent Increase Over 2012, Jun. 17, 2014, https://web.archive.org/web/20140723023447/http://www.ctia.org/resource-library/press-releases/archive/ctia-annual-survey-2013.
Eskridge, Cory W., Final Office Action dated Feb. 21, 2020 for U.S. Appl. No. 15/479,230.
Fredrich et al., "Adaptive Scheduling of Electronic Messaging Based on Predictive Consumption of the Sampling of Items Via a Networked Computing Platform", U.S. Appl. No. 15/716,486, filed Sep. 26, 2017.
Fredrich et al., "Dynamic Processing of Electronic Messaging Data and Protocols to Automatically Generate Location Predictive Retrieval Using a Networked, Multi-Stack Computing Environment," U.S. Appl. No. 16/046,690, filed Jul. 26, 2018.
Fredrich et al., "Dynamic Processing of Electronic Messaging Data and Protocols to Automatically Generate Location Predictive Retrieval Using a Networked, Multi-Stack Computing Environment," U.S. Appl. No. 16/115,474, filed Aug. 28, 2018.
Fredrich et al., "Electronic Messaging to Distribute Items Based on Adaptive Scheduling," U.S. Appl. No. 15/479,230, filed Apr. 4, 2017.
Garg, Yogesh C., Non-Final Office Action dated Nov. 12, 2019 for U.S. Appl. No. 15/821,362.
Kim, Harry C., Notification of Transmittal of the International Search Report and the Written Opinion of the International Searching Authority, or the Declaration for International Application No. PCT/US2018/058053 dated May 7, 2019.
Koester, Michael Richard, Non-Final Office Action dated Nov. 25, 2019 for U.S. Appl. No. 15/716,486.
Mahone, Kristie A., Final Office Action for U.S. Appl. No. 15/801,002 dated Sep. 28, 2018.
Mahone, Kristie A., Non-Final Office Action for U.S. Appl. No. 15/801,002 dated Mar. 8, 2018.

(56) References Cited

OTHER PUBLICATIONS

Mitchell, Nathan A., Non-Final Office Action for U.S. Appl. No. 15/905,764 dated Mar. 18, 2020.

Mitchell, Nathan A., Notice of Allowance and Fee(s) Due dated Mar. 1, 2019 for U.S. Appl. No. 15/801,002.

Rao, Leena, "Amazon to Add Trash Cans, Dishwashers, Dryers to Smart Reordering Service." Published Aug. 2016. Retrieved from on Feb. 22, 2019.

Ricker, Thomas; "Wanted: An Amazon Fridge That Automatically Reorders Food," Published Jan. 18, 2017; Retrieved From on Mar. 18, 2020.

Ricker, Thomas; "Wanted: An Amazon Fridge That Automatically Reorders Food." Published Jan. 2017. Retrieved from on Feb. 22, 2019.

Stinson, Tanner, "AmazonKitchen DRS", Hackster Project, Published Feb. 5, 2017, https://www.hackster.io/tanner-stinson/amazonkitchen-drs-75fc24?ref=challenge&ref_id=78&offset=9.

Wilder, Andrew H., Non-Final Office Action dated Nov. 25, 2019 for U.S. Appl. No. 15/801,172.

Zimmerman, Jeffrey P., Final Office Action dated Apr. 15, 2019 for U.S. Appl. No. 16/046,690.

Zimmerman, Jeffrey P., Final Office Action dated Apr. 15, 2019 for U.S. Appl. No. 16/115,474.

Zimmerman, Jeffrey P., Non-Final Office Action for U.S. Appl. No. 16/046,690 dated Dec. 10, 2018.

Zimmerman, Jeffrey P., Non-Final Office Action for U.S. Appl. No. 16/115,474 dated Dec. 6, 2018.

Zimmerman, Jeffrey P., Non-Final Office Action dated Jul. 15, 2019 for U.S. Appl. No. 16/115,474.

Zimmerman, Jeffrey P., Non-Final Office Action dated Jun. 20, 2019 for U.S. Appl. No. 15/479,230.

Zimmerman, Jeffrey P., Non-Final Office Action dated Jun. 20, 2019 for U.S. Appl. No. 16/046,690.

\* cited by examiner

DYNAMIC PROCESSING OF ELECTRONIC MESSAGING DATA AND PROTOCOLS TO AUTOMATICALLY GENERATE LOCATION PREDICTIVE RETRIEVAL USING A NETWORKED, MULTI-STACK COMPUTING ENVIRONMENT

CROSS-REFERENCE TO RELATED APPLICATIONS

This application is a continuation application of U.S. patent application Ser. No. 16/046,690, filed Jul. 26, 2018 and entitled, "DYNAMIC PROCESSING OF ELECTRONIC MESSAGING DATA AND PROTOCOLS TO AUTOMATICALLY GENERATE PREDICTIVE RETRIEVAL USING A NETWORKED, MULTI-STACK COMPUTING ENVIRONMENT;" U.S. patent application Ser. No. 16/046,690 is a continuation-in-part application of U.S. patent application Ser. No. 15/716,486, filed Sep. 26, 2017 and entitled, "ADAPTIVE SCHEDULING OF ELECTRONIC MESSAGING BASED ON PREDICTIVE CONSUMPTION OF THE SAMPLING OF ITEMS VIA A NETWORKED COMPUTING PLATFORM;" U.S. patent application Ser. No. 15/716,486 is a continuation-in-part application of U.S. patent application Ser. No. 15/479,230, filed Apr. 4, 2017 and entitled, "ELECTRONIC MESSAGING TO DISTRIBUTE ITEMS BASED ON ADAPTIVE SCHEDULING;" U.S. patent application Ser. No. 16/046,690 is also a continuation-in-part application of U.S. patent application Ser. No. 15/821,362, filed Nov. 22, 2017 and entitled, "ADAPTIVE SCHEDULING TO FACILITATE OPTIMIZED DISTRIBUTION OF SUBSCRIBED ITEMS;" U.S. patent application Ser. No. 15/821,362 claims the benefit of U.S. Provisional Patent Application No. 62/425,191, filed Nov. 22, 2016 and entitled, "ADAPTIVE SCHEDULING TO FACILITATE OPTIMIZED DISTRIBUTION OF SUBSCRIBED ITEMS;" all of which are herein incorporated by reference in their entirety for all purposes.

FIELD

Various embodiments relate generally to computer and data science, computer software, distributed network computing, and computer systems, software, and application architecture. More specifically, techniques for dynamic parsing of electronic messaging data and protocols to automatically generate location predictive retrieval options using a networked, multi-stack computing environment are described.

BACKGROUND

Advances in computing hardware and software, as well as computing networks and network services, have bolstered growth of Internet-based product and service procurement and delivery. For example, online shopping, in turn, has fostered the use of "subscription"-based delivery computing services with an aim to provide convenience to consumers. In particular, a user becomes a subscriber when associated with a subscriber account, which is typically implemented on a remote server for a particular seller. In exchange for electronic payment, which is typically performed automatically, a seller ships a specific product (or provides access to a certain service) at periodic times, such as every three (3) months, every two (2) weeks, etc., or any other repeated periodic time intervals. With conventional online subscription-based ordering, consumers need not plan to reorder to replenish supplies of a product.

But conventional approaches to provide subscription-based order fulfillment, while functional, suffer a number of other drawbacks. For example, traditional subscription-based ordering relies on computing architectures that predominantly generate digital "shopping cart" interfaces with which to order and reorder products and services. Traditional subscription-based ordering via shopping cart interfaces generally rely on a user to manually determine a quantity and a time period between replenishing shipments, after which the quantity is shipped after each time period elapses. Essentially, subscribers receive products and services on "auto-pilot."

So while the conventional approaches to implementing shopping cart interfaces may be functional for stable rates of consumption, such approaches are not well-suited to facilitate timely reordering of products and services with which consumers may use at rates that vary from the fixed periods of time between repeated deliveries. Thus, conventional approaches to reordering or procuring subsequent product and services deliveries are plagued by various degrees of rigidity that interject sufficient friction into reordering that cause some users to either delay or skip making such purchases. Unfortunately, such friction causes some users to supplement the periodic deliveries manually if an item is discovered to be running low more quickly than otherwise might be the case (e.g., depleting coffee, toothpaste, detergent, wine, or any other product more quickly than normal).

Examples of such friction include "mental friction" that may induce stress and frustration in such processes. Typically, a user may be required to rely on one's own memory to supplement depletion of a product and services prior to a next delivery (e.g., remembering to buy coffee before running out) or time of next service. Examples of such friction include "physical friction," such as weighing expending time and effort to either physically confront a gauntlet of lengthy check-out and shopping cart processes, or to make an unscheduled stop at a physical store.

Typical online approaches, including conventional shopping cart interfaces, suffer from less than optimal means with which to reconcile the different rates of product and service usage of different users. One prevalent consequence of mismatches between time periods for delivering subscribed products or services and consumption rates by consumers is that, over time, the supply of a subscribed item is either over-delivered or under-delivered. An oversupply of subscribed product or service typically degrades consumer experience due to a number of reasons. For example, subscribers may believe that a seller is "over-billing" the customer for unneeded products or services. Similarly, an under-supply of subscribed product may give to frustration and friction that an expected subscribed product or service is scarce or unavailable.

Online retailers and merchants may experience similar consequences due to mismatching of delivery times and consumption rates, such as at an aggregate level of subscribers. In the aggregate, the mismatches may cause either overstocking or understocking of inventory of the online retailers and merchants. Fluctuations in inventory may cause non-beneficial consumption of resources and time. Note, too, that the computing systems of online retailers and merchants are not well-adapted to address the above-described mismatching phenomena when ordering, shipping, and performing inventory management. These types of subscription models, therefore, are not generally well-suited for application to usual consumption rates of depletable products and services (e.g., product usage that depletes some or all of the product or service).

In some approaches, online retailers and merchants attempt to increase exposure and awareness of certain products by, for instance, providing samples of products to potential consumers. In one approach, a printed paper, such as a "flyer," is typically added a box containing a purchased product being readied for shipment (e.g., from a warehouse). The flyer usually conveys information about a product in which a consumer may purchase in the future. For example, a flyer may include a website or other contact information that accompanies a variety of snacks and directs a recipient how to order a favored snack from the variety of snacks. But prior to sampling a product, the "friction" encountered by a consumer to acquire the sample described in a flyer is relatively high (e.g., a low likelihood of future acquisition of the item). Consumers have little time to follow directions to receive a sample for a product they are not aware that they would like to receive. In a modified approach, a sample of the product (e.g., either free or at a nominal price) may be included in a boxed shipment and the flyer, which explains how to purchase a product should the consumer desire.

Conventional computing platforms that implement traditional online merchant techniques, while functional, suffer drawbacks that limit opportunities to receive information regarding one or more consumers' experiences regarding a product. Known software and applications, therefore, are suboptimal in determining information of consumer experiences. As manufacturers and retailers expend millions to billions of dollars in investing in manufacturing samples for distribution, the information received back via conventional software and applications have yet to reach their potential.

Thus, what is needed is a solution to facilitate techniques for dynamically process electronic data to generate location resultants to optimize physical product distribution in networked application and platform architectures, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
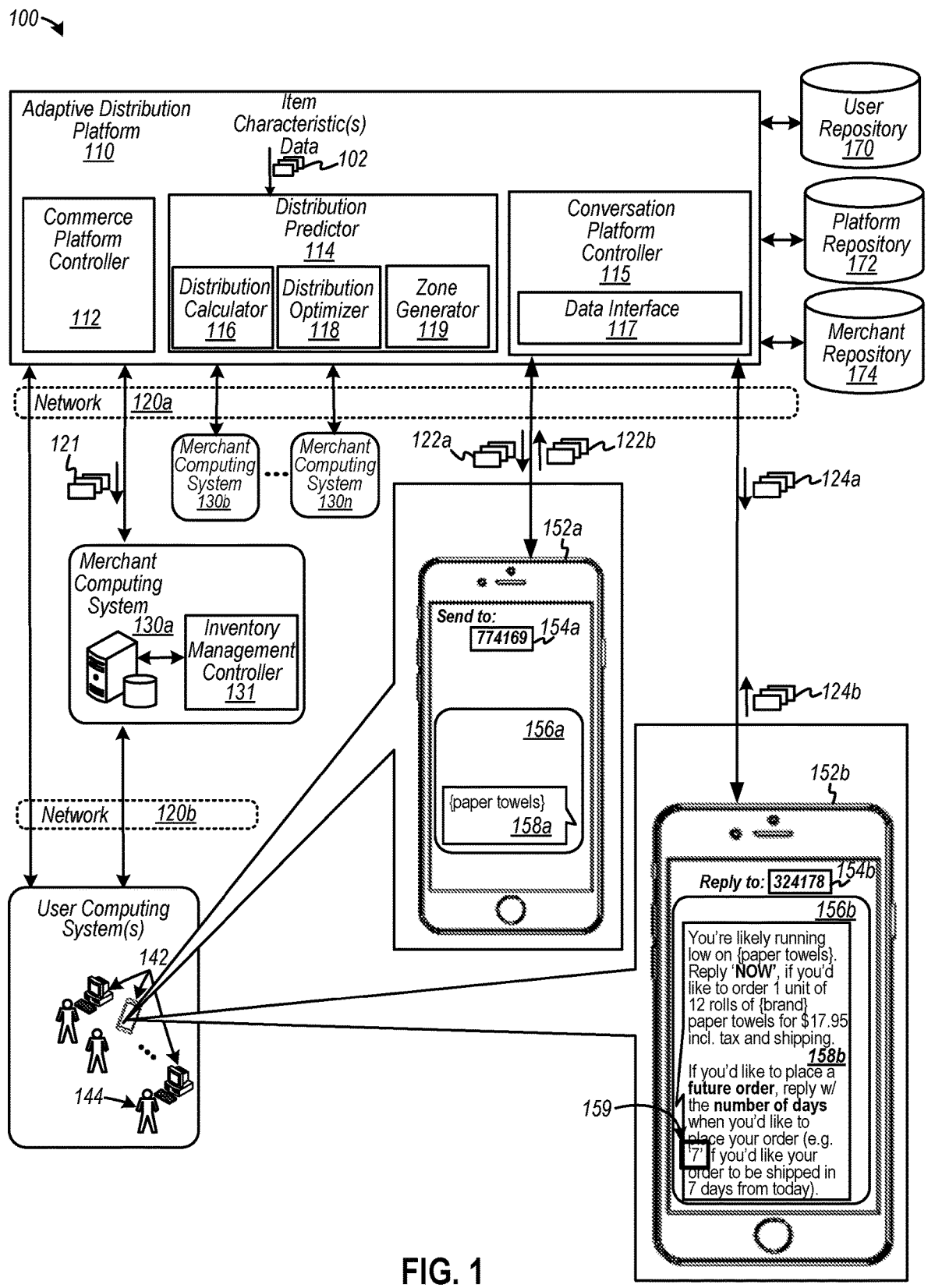
FIG. 1 is a diagram depicting an adaptive distribution platform, according to some embodiments.

FIG. 1 is a diagram depicting an adaptive distribution platform, according to some embodiments. Diagram 100 depicts an example of adaptive distribution platform 110 that may be configured to facilitate automatic distribution of items in accordance with an adaptive schedule. For example, adaptive distribution platform 110 may be configured to initiate electronic messaging (e.g., as reminder messages) of pending exhaustion of an item, which may be any good or service, to facilitate replenishment. The timing of the distribution may be adapted to a specific user 144 (or group of users 144). In the example shown, adaptive distribution platform 110 may include a commerce platform controller 112, a distribution predictor 114, and a conversation platform controller 115. Adaptive distribution platform 110 and any of its elements, such as commerce platform controller 112, distribution predictor 114, and conversation platform controller 115, may include logic, whether implemented in hardware or software, or a combination thereof.

Commerce platform controller 112 may be configured to perform functions to support the initiation of the distribution (e.g., shipment) of an item, among other things. For example, commerce platform controller 112 may be configured to facilitate financial-related transactions with one or more merchant computing systems 130a, 130b, and 130n, including, but not limited to, credit card transactions or the like. In some cases, commerce platform controller 112 may also control participation by users and their electronic interactions with adaptive distribution platform 110. For example, commerce platform controller 112 may manage enrollment of a user to form an electronic account that enables access via a computing device, such as one of mobile computing devices 152a and 152b, to adaptive distribution platform 110.

Distribution predictor 114 may be configured to predict a point in time (or a range of time) at which an item may be exhausted, and based on the prediction, adaptive distribution platform 110 may be further configured to determine a zone of time (not shown) in which depletion and near exhaustion of an item is predicted. Further, distribution predictor 114 may be configured to determine the zone of time relative to a distribution event. In some cases, a zone of time is determined as a range of time preceding the distribution event. Distribution predictor 114 may be configured to associated a point in time with the zone of time, the point in time defining a moment at which an electronic message may be transmitted to a computing device 142, 152a, or 152b to inform a user of a pending exhaustion of an item and to provide an opportunity to replenish the item in a configurable manner.

Conversation platform controller 115 may be configured to facilitate an exchange of electronic messages and data, as a "conversation," between adaptive distribution platform 110 and any of user computing devices 142, which may include mobile computing devices 152a and 152b. According to some examples, conversation platform controller 115 may be configured to monitor whether to replenish an item, for example, by determining whether a particular date coincides with a zone of time. If the particular date coincides with a date range of the zone of time, conversation platform controller 115 may transmit data representing an electronic message 124a via one or more networks 120a and 120b to mobile computing device 152b to cause presentation of a reminder message in an interface 156b. In response, mobile computing device 152b may transmit data representing an electronic message 124b to initiate distribution (e.g., shipment) of an item.

In some examples, conversation platform controller 115 may be configured to receive an electronic message 122b originating at user computing device 152a as conversation platform controller 115 monitors whether to replenish an item. Electronic message 122b may include data representing an item characteristic (e.g., a product classification, such as "paper towels," or a product type, such as a brand name (e.g., "Brand 'X'")). In this example, a user 144 may enter a product classification ("paper towels") 158a as displayed in a user interface 156a. Also, conversation platform controller 115 may be configured to initiate transmission of a control message (e.g., via commerce platform controller 112) to one of merchant computing systems 130a, 130b, and 130n to initiate distribution of an item for replenishment, whereby a merchant computing system may initiate distribution, shipment, delivery, etc. of the item, by any known means, to a geographic location (e.g., an address) associated with an account (e.g., a user account associated with user 144). Thus, conversation platform controller 115 may be configured to control replenishment of an item regardless of whether an electronic message that initiates a conversation originates at adaptive distribution platform 110 or at user computing device 142, 152a, or 152b.

Adaptive distribution platform 110 may be configured to facilitate "adaptive" scheduling services via a computing system platform for multiple online or Internet-based retailers and service providers, both of which may be referred to as merchants. In this example, a merchant may be associated with a corresponding one of merchant computing systems 130a, 130b, or 130n that includes one or more computing devices (e.g., processors, servers, etc.), one or more memory storage devices (e.g., databases, data stores, etc.), and one or more applications (e.g., executable instructions for performing adaptive subscription services, etc.). Examples of merchant computing systems 130a, 130b, or 130n may be implemented by any other online merchant. Accordingly, adaptive distribution platform 110 can be configured to distribute items in accordance with predicted distribution events (e.g., a predicted time of distribution), any of which may be adaptively derived to optimize delivery of items.

In view of the foregoing, the structures and/or functionalities depicted in FIG. 1 may illustrate an example of adaptive scheduling to automatically facilitate the optimal replenishment and distribution of items, such as shipping an item that is ordered or reordered in accordance with various embodiments. According to some embodiments, adaptive distribution platform 110 may be configured to facilitate online ordering and shipment of a product responsive to an electronic message 122b, 124b, whereby at least one electronic message 122b, 124b may be sufficient to complete a transaction with at least one of merchant computing systems 130a, 130b, and 130n. Thus, consumption of resources and time for both users and merchant, as well as associated computing systems, may be reduced such that "friction" of replenishment is reduced or negated, at least in some cases. In the example shown, computing device 152a may include an application (e.g., a text messaging application) configured to receive input via a user interface, such as an input ("paper towels") 158*a* and a destination account identifier ("774169") 154*a* via interface 156*a*. Computing device 152*b* may also include an application to receive, for example, a user input "NOW" (or any other input) responsive to displayed message 158*b* via interface 156*b*. Further to this example, electronic messages 122*b* and 124*b* may be text messages that each includes sufficient information and data to initiate and complete replenishment of an item as a transaction. In some cases, data representing an identification of a product classification (or type) and an associated account identifier (e.g., a mobile phone number) in text messages 122*b* and 124*b* may be sufficient. In some examples, adaptive distribution platform 110 may provide replenishment services for multiple entities (e.g., for multiple merchant computing systems 130), thereby reducing resources that otherwise may be needed to perform replenishment services individually at each merchant computing system 130*a*, 130*b*, and 130*n*.

According to various examples, a distribution event may be predicted automatically or manually to form an adaptive schedule (e.g., an adaptive shipment schedule). A "distribution event" may refer, at least in some examples, to an event at which a shipment is to occur (or is likely to occur), or at which an item (e.g., a depletable item) is predicted to be exhausted. For example, a distribution event (e.g., either depletion or shipment) may be timed to occur at the 30th day after a user has purchased a bottle of vitamin supplements having 30 tablets that are taken once a day (e.g., at a depletion rate of 1 tablet per day). In some examples, a distribution event (e.g., a time of distribution) may be predicted as a "predicted distribution event" (e.g., a "predicted time of distribution") based on any number of sources of information and/or item characteristics, including, but not limited to, as a usage rate of item by a particular user 144 or a population of users 144 associated with one or more merchant computing systems 130*a*, 130*b*, and 130*n*. In some examples, a usage rate may be a function of a depletion rate. Further, a "predicted distribution event" may be optimized based on, for example, feedback or results of various data analyses. For example, a value representing a predicted distribution event or date may be optimized by including a user's monitored preference in predicting a modified distribution event. A particular user may prefer to deviate from a predicted distribution event by delaying or expediting a shipment (e.g., repeatedly pushing back or pulling forward shipment dates). Thus, a reminder message may be generated in accordance with the user's preference.

According to some examples, a term "order" may be used interchangeably with "reorder." In some cases, an "order" may refer to a first transaction for a good or service, and a "reorder" may refer to subsequent transactions. During a first transaction, such as a text requesting an order to a merchant via adaptive distribution platform 110, a prior relationship may not exist with a merchant. If a prior relationship has yet to exist between user 144 and a merchant computing system 130*a*, payment information and shipping address information may not be available to a merchant with which user 144 is engaging. In some examples, adaptive distribution platform 110 may determine user 144 has a prior relationship with any other networked merchant computing systems (e.g., systems 130*b* and 130*n*). Thus, payment information and shipping address information may be used from prior orders with merchant computing systems 130*b* and 130*n*. In one case, however, if no relationship exists with either adaptive distribution platform 110 or any merchant computing systems 130*a*, 130*b*, and 130*n*, adaptive distribution platform 110 may generate an electronic message requesting payment information and shipping address information. The payment information and shipping address information may be transmitted via any medium (e.g., website, via phone, email, text messaging, etc.).

In some embodiments, data representing a predicted or unpredicted distribution event for any item, regardless of whether due to fulfillment of a subscription, one-time, ad hoc, randomly-generated, infrequent, frequent, periodic, scheduled, or other type of order, or any other data described herein may be implemented by an inventory management controller 131 to manage an amount of inventory to enhance optimally the efficacy of fulfilling and replenishing items for an aggregate number of users 144. In some examples, other data may include item, shipping, user (e.g., address, city, state, zip code, province, country, or the like), user behavior (e.g., what stores are visited by a user, stores in which a user purchases an item, physical locations in which user has historically purchased items, and the like), order history (e.g., have items been purchased by a given user using an online ordering application or platform or physical retail or wholesale location, what types of online orders have been placed, periodicity of online orders relative to in-store pick up (i.e., retrieval), and the like), billing, payment, merchant, warehouse, shipping, fulfillment, or other data (e.g., geolocation, geographic information systems (GIS) data, among others) or information that may be used to order and/or prepare an item for shipment or retrieval (i.e., "pick up") from a physical location. A merchant computing system, such as merchant computing system 130*a*, may include an inventory management controller 131, which may be implemented as a known inventory management software application. The inventory management software application may be adapted to receive an aggregate number of predicted distribution events for group of users 144 (or an aggregated representation thereof) to refine, for example, amounts of inventory at a storage facility prior to dispatch or replenishment. Adaptive distribution platform 110 may be configured to provide a subset of predicted distribution events (e.g., predicted shipment dates) for an item for respective users. Alternatively, platform 110 may provide an optimal value for a predicted distribution event for an item to inventory management controller 131. Accordingly, inventory management controller 131 may be configured to determine an inventory amount (e.g., dynamically) based on the values representing one or more predicted distribution events. Therefore, a merchant associated with merchant computing system 130*a* may be configured to optimally determine an amount or quantity of items for fulfillment in an inventory based on, for example, a predicted shipment date and/or a predicted date of exhaustion.

As described, commerce platform controller 112 may facilitate financial-related transactions and enrollment of user accounts. According to some examples, commerce platform controller 112 may be configured to enroll user 144 and form a corresponding electronic account as a data arrangement, which may include data representing an indication that user 144 has interacted at least one time with at least one of merchant computing systems 130*a*, 130*b*, and 130*n* (i.e., a consumer has purchased previously a product from a merchant, and a data relationship between the merchant and the consumer may exist). Based on a previous purchase, commerce platform controller 112 may access data to facilitate reordering, such as data representing a geographic location (e.g., a shipping address), a payment instrument (e.g., a credit card number, a debit card number, a PayPal™ number, or any other type or form of payment, etc.) and a list of products previously ordered. A user computing device identifier, such as a user's mobile phone number, email address, etc., may also be included as data in the electronic account, which may be formed during an enrollment process or upon initiation of the distribution of an item (e.g., during reordering). An enrollment process may be implemented as an algorithm that may be executed during a check-out process so user 144 may opt to include the above-described data, including authorization to receive electronic messages (e.g., text messages), at a mobile computing device. Further, the enrollment process may be performed at a merchant or a point of sale. For example, a customer of a health food establishment may be presented with an opportunity to enroll (e.g., provide payment and shipping information). In some cases, the opportunity to avail oneself of the various features described herein may be integrated or supplemented with the merchant's loyalty or member program.

In at least one example, data relating to a user profile acquired in a previous transaction may be disposed in a merchant repository 174, which may include data generated by one or more of merchant computing systems 130*a*, 130*b*, and 130*n*. User profile and account data may be stored in user repository 170, which may include data relating to one or more users 144, or stored in a platform repository 172, which may include data relating to any aspect of data transactions among users 144 and merchant computing systems 130*a*, 130*b*, and 130*n* used to facilitate operability of adaptive distribution platform 110.

Commerce platform controller 112 may be configured to facilitate financial-related transactions and need not perform a financial transaction. For example, commerce platform controller 112 may receive a control message to initiate distribution of an item. In response, commerce platform controller 112 may transmit transaction-related data (e.g., credit card information, destination address, etc.) to one of merchant computing systems 130*a*, 130*b*, and 130*n*, which, in turn applies payment (e.g., receives credit card authorization) and distributes an item. Hence, commerce platform controller 112 may provide data transfer of information so that each of merchant computing systems 130*a*, 130*b*, and 130*n* may be a merchant of record.

Distribution predictor 114 may include a distribution calculator 116, a distribution optimizer 118, and a zone generator 119. Distribution calculator 116 may be configured to calculate one or more predicted distribution events or replenishment-related data to form an adaptive schedule (e.g., an adaptive shipping schedule). Distribution optimizer 118 may be configured to optimize values of predicted distribution events to, for example, adapt scheduling of distributed items (i.e., product shipments) to conform (or substantially conform) to delivery or usage preferences of user 144 or a group of users 144. For example, distribution optimizer 118 may be configured to analyze data representing purchasing patterns related to a particular item for a specific user 144. Based on the results of such an analysis, distribution optimizer 118 may be configured to emphasize certain item characteristics (or values thereof) that may align more closely to a user's ordering or reordering patterns. For example, replenishment of an exact brand name at a later date may be preferred by user 144 over substitution of a comparable other brand at an earlier date. Zone generator 119 may be configured to define a zone of time, which may be configurable or adjusted based on, for example, one or more of user preferences, an amount of time since a prior distribution (e.g., a prior purchase), one or more usage rates, units of depletion or depletion rate, etc. An example of a depletion rate is the rate at which 2 units of a product are depleted per unit time. To illustrate another example, consider that a bottle of vitamins has 180 tablets and is reordered or depleted every 72 days. Thus, a predicted rate of depletion may be 2.5 per day (e.g., 180 units/72 days). For example, a user may consume 2 to 3 tablets per every other day).

Distribution calculator 116 may be configured to receive data representing item characteristics data 102, according to some embodiments, and may be configured further to determine (e.g., identify, calculate, derive, etc.) one or more distribution events based on one or more item characteristics 102, or combinations thereof (e.g., based on derived item characteristics). For example, distribution calculator 116 may compute a projected date of depletion for a particular product, such as a vitamin product, based on usage patterns and/or ordering patterns of a specific user 144. Note, however, a projected date of depletion may also be based on usage patterns and/or ordering patterns of other users 144 over any number of merchant computing systems 130*a*, 130*b*, and 130*n*. In some examples, a projected data of depletion may be correlated to, or used interchangeably with, the terms a "predicted distribution event," a "predicted shipment date," a "predicted time of distribution," or the like.

In at least one example, distribution calculator 116 may be configured to operate on data representing an item characteristic 102, which may be derived or calculated based on one or more other item characteristics 102. Examples of item characteristics data 102 may include, but are not limited to, data representing one or more characteristics describing a product, such as a product classification (e.g., generic product name, such as paper towels), a product type (e.g., a brand name, whether derived from text or a code, such as a SKU, UPC, etc.), a product cost per unit, item data representing a Universal Product Code ("UPC"), item data representing a stock keeping unit ("SKU"), etc., for the same or similar items, or complementary and different items. Item characteristics 102 may also include product descriptions associated with either a SKU or UPC. Based on a UPC for paper towels, for example, item characteristics 102 may include a UPC code number, a manufacture name, a product super-category (e.g., paper towels listed under super-category "Home & Outdoor"), product description (e.g., "paper towels," "two-ply," "large size," etc.), a unit amount (e.g., 12 rolls), etc. Item characteristics 102 also may include any other product characteristic, and may also apply to a service, as well as a service type or any other service characteristic. In some examples, data representing item characteristics 102 may be accessed from and/or stored in any of repositories 170, 172, and 174.

A predicted distribution event for an item may be based on a usage rate of the item (e.g., a calculated usage rate), whereby a usage rate may be a rate at which a product or service is distributed (e.g., ordered or reordered), consumed, or depleted. In one example, predicted distribution of an item for a user 144 may be based on a predicted time of exhaustion, such as exemplified in the above example in which a distribution event for a bottle of 30 vitamin tablets is predicted to occur at the 30th day (e.g., relative to a previous delivery). In another example, predicted distribution of an item for user 144 may be based on the user's pattern of purchasing, using, ordering, or reordering the item (or generically similar or complementary items). For example, a predicted time of distribution to replenish an item, such as a bottle of ketchup, may be based on a user's past rates of replenishment (e.g., shipment rates), such as a median or average time between successive requests to distribute reordered items. A distribution event may be predicted or supplemented by predicting a time of distribution for ketchup based on rates of past replenishment of mustard, a complementary product having a usage rates that may correlate to that of ketchup as both items may be used together (and thus consumed at similar depletion rates). Other users' patterns of purchasing, using, ordering, or reordering of the same item (e.g., same brand of vitamin A at the same merchant) or equivalent item (e.g., different brands of vitamin A at the same or different merchants) may also be used to predict a time of distribution. For example, consider that user 144 is replenishing an item, such a vitamin A tablets, at a merchant X. However, there may be negligible information to predict a usage rate (or a time of distribution) for that item at merchant X. Therefore, other users' patterns of reordering vitamin A at another merchant, merchant Y, may be used to form a predicted time of distribution for use in purchasing vitamin A tablets at merchant X.

In some examples, a usage rate to determine a predicted time of distribution may be based on identifying distribution rates of an item relative to one or more other accounts associated with one or more other users or other user computing systems to form an aggregate usage rate. An aggregated usage rate for an item may express, for example, a nominal usage rate that may be used (at least initially) to ascertain predicted time of reorder with a relatively high degree of confidence. Thus, the aggregated usage rate may be used to generate a predicted time of distribution. According to one implementation, usage rates associated with other users may originate from item characteristic data accessed from one or more merchant computing systems 130a, 130b, and 130n. The usage rates received from merchants may be to determine a predicted time of distribution for an item. As an example, usage rates may be derived by analyzing shipment rates of an item to identify time periods between deliveries (i.e., time intervals between order and reorder) relative to one or more merchant computing systems 130a, 130b, and 130n. Thereafter, a usage rate may be used to calculate a predicted time of distribution.

Distribution optimizer 118 may be configured to optimize values of predicted times of distribution, for example, by adapting scheduled distribution of items to conform (or substantially conform) to, for example, usage preferences of user 144 or a group of users 144. Distribution optimizer 118 may configured to receive data representing distribution-related data from distribution calculator 116, including predicted times of distribution, usage rates, etc., as well as item characteristics data 102, to determine one or more optimized times of distribution, according to some embodiments. In at least one example, distribution optimizer 118 may be configured to determine an optimal default predicted times of distribution with which to establish a time frame to deliver an item. In some examples, distribution optimizer 118 may be configured to modify a value of predicted time of distribution relative to, for example, a prior shipment, or a receipt of a reminder message, etc. A value of predicted time distribution may be modified, for example, by an adjustment factor that may be derived through computation or determined empirically. To illustrate, consider that user 144 receives electronic messages 124a at computing system 152b over multiple periods of time, whereby user 144 responds via electronic messages 124b to request a shipment delay of seven ("7") days rather than ordering at time of that message 158b is initially received. In this example, the adjustment factor may have a value of "7" that may modify a value of predicted time of distribution to form a modified value of predicted time of distribution (e.g., modified to 37 days after a last order of 30 vitamin tablets rather than 30 days). According to some embodiments, distribution calculator 116 and/or distribution optimizer 118 may be configured to monitor and update the one or more values of the item characteristics. As such, distribution optimizer 118 may be configured to dynamically determine a modified time of distribution with which to associate with a specific item (e.g., for specific user 144), among other parameters. Further, distribution optimizer 118 may be configured to derive an adjustment factor value in accordance with any number of processes or techniques described herein or that are otherwise known.

Zone generator 119 may be configured to determine a zone of time as a function of an item and/or a user, among other parameters, according to various examples. Zone generator 119 may form a zone of time (not shown) in which depletion or near exhaustion of an item is predicted. A zone of time may be relative to a distribution event (e.g., a time of distribution). In some cases, zone generator 119 may generate a zone of time as a range of time either preceding a distribution event, or subsequent thereto, or both. To illustrate, consider an example in which an item of paper towels may be exhausted in eight (8) days from generation of a reminder electronic message 124a. A zone of time may include a range of seven (7) days during which user 144 may select to delay delivery of the item by any day from seven days to one (1) day prior to the day of exhaustion. Optionally, a zone of time may also include another range of seven (7) days extending after the day of exhaustion. Thus, a user may delay or postpone replenishment of an item with any time during a range of 14 days. Note that the above-described values defining the example of a zone of time are not intended to be limiting, but may be of any value or number of days in accordance with various examples.

Conversation platform controller 115 may include a data interface 117, and may be configured to facilitate an exchange of electronic messages and data via data interface 117 between adaptive distribution platform 110 and mobile computing devices 152a and 152b to replenish a consumable item (e.g., a depletable product). Adaptive distribution platform 110 may be configured to replenish an item responsive to one of electronic messages 122b and 124b, according to some examples. In at least one implementation, adaptive distribution platform 110 may facilitate a complete transaction, from online ordering to shipment, of a product responsive to a unitary electronic message, such as electronic messages 122b or 124b. In at least one example, electronic messages 122b or 124b are text messages configured to include 160 characters or fewer.

Conversation platform controller 115 further may include logic, whether implemented in hardware or software, or a combination thereof, configured to control one or more exchanges of data to identify or determine one or more of a user account (and associated user or consumer), one or more item characteristics, and a destination account identifier. According to various examples, adaptive distribution platform 110 may initiate item replenishment. To illustrate, consider the following example. Conversation platform controller 115, or any other element of adaptive distribution platform 110, may include logic configured to monitor values of data representing predicted distribution events for user computing systems 142 and corresponding users 144. The logic may also monitor values of data representing a zone of time associated with a predicted distribution event. For example, conversation platform controller 115 may compare a point of time (e.g., a date and/or time, such as Dec. 7, 20XX at 5:00 pm) against a zone of time (e.g., a date range from Dec. 7, 20XX to Dec. 14, 20XX) associated with a predicted time of distribution for an item, such as "paper towels." If conversation platform controller 115 detects that a point of time, such as 5:00 pm on Dec. 7, 20XX, coincides with a zone of time for an item "paper towels," conversation platform controller 115 may initiate transmission of an electronic message 124a via data interface 117 to, for example, user computing device 152b. Further to the example, Dec. 14, 20XX may coincide with a predicted date of exhaustion, whereby message 124a is transmitted at a point of time that is 7 days prior. Thus, a user has an opportunity to conveniently replenish an item prior to exhaustion.

Data interface 117 may be configured to adapt data transmission to a particular communication medium and application, as well as data protocol, to form electronic message 124a. For example, data interface 117 may adapt electronic messages to implement short message service ("SMS"), as a text messaging service for reception by a mobile computing device, including mobile phones, or any other networked computing device. An example of SMS is described in one or more standards, including RFC 5724 maintained by the Internet Engineering Task Force ("IETF"), among others. According to some embodiments, electronic messages 124a need not be initiated as a function of predicted times of distribution. In some cases, electronic messages 124a (and 122a) may be manually-generated (e.g., other than algorithmically triggered).

Electronic message 124a transmitted to computing device 152b may include data configured to present via user interface 156b the following reminder message 158b to user 144, who is associated with a pending exhaustion of paper towels: "You're likely running low on {PAPER TOWELS}. Reply 'NOW', if you'd like to order 1 unit of 12 rolls of {BRAND X} paper towels for $17.95 incl. tax and shipping. If you'd like to place a future order, reply with the number of days when you'd like to place your order (e.g., text '7' if you'd like your order to be shipped in 7 days from today)." Data representing a destination account identifier 154b may also be transmitted in electronic message 124a, and, as such, user interface 156b need only receive at least one user input by user 144 to effect replenishment. In this example, destination account identifier ("324178") 154b may be implemented as a "shortcode" (e.g., five- or six-digit SMS-based shortcode) associated with either adaptive distribution platform 110 or one or more of merchant computing systems 130a, 130b, and 130n. Destination account identifier 154b may also be implemented as a phone number or as any other type of identifier.

If user 144 desires to ensure a supply of paper towels is not exhausted at or around the projected date of exhaustion, interface 156b may be configured to receive an input "NOW," which, in turn, may be transmitted as electronic message 124b to adaptive distribution platform 110. Conversation platform controller 115 generates a control message 121 to, for example, merchant computing system 130a to initiate completion of the transaction. Optionally, conversation platform controller 115 may generate a confirmation electronic message for transmission to user computing device 152b to confirm acceptance of order. Control message 121 may include financial data associated with user 144 (e.g., credit card information) to initiate authorization at merchant computing system 130a, which, in turn, ships the item and optionally sends shipping confirmation to user computing device 152b to notify user 144 of an item in transit.

If user 144 desires to modify a distribution event (e.g., a shipment), interface 156b may be configured to receive an input "#," which may represent a value with which to delay the distribution event relative to a predicted distribution event. For example, a user input "7" may be received into user interface 156b. Computing device 152b then may transmit data indicated an amount of delay as via electronic message 124b. According to some examples, a value 159 may be presented that is adapted to particular user 144 or item. For example, if user 144 historically postpones delivery by 7 days for this or other items, a value of "7" may be presented. Alternatively, a value 159 may be based on other users' patterns of postponement. Conversation platform controller 115 generates control message 121 for transmission to, for example, merchant computing system 130a, which, in turn, initiates authorization of the transaction, but with a hold on shipment (until an amount of delay expires). For example, control message 121 may include financial data to enable authorization at merchant computing system 130a. Optionally, conversation platform controller 115 may generate a confirmation electronic message for transmission to user computing device 152b to confirm a "future" order. Subsequently, conversation platform controller 115 may detect that an amount of delay has elapsed (e.g., 7 days), and, in response, may generate control message 121 to cause merchant computing system 130a to generate an order, charge the credit card, ship the item, and optionally send shipping confirmation.

In other examples, a user computing device 152a may initiate item replenishment. For example, user interface 156a may receive a user input 158a of "paper towels," and, optionally, a destination account identifier ("774169") 154a, such as a shortcode (or a phone number, an email address, a URL, etc.). User computing device 152a may be configured to transmit data representing user input 158a as electronic message 122b, which may also include data representing an account identifier (e.g., a mobile phone number) associated with user 144. Conversation platform controller 115 includes logic configured to extract data representing a portion of text, "paper towels," and analyzes the extracted data to determine that the text entered correlates to a specific item requested for replenishment. Conversation platform controller 115, for example, can compare text "paper towels" (or alternatively texted as "papr towls," or other like short-hand or erroneous entries) to data stored in one or more repositories 170, 172, and 174 to confirm that user 144 is requesting paper towels.

Once the item is identified, conversation platform controller 115 may be configured to match "paper towels" against data representing UPC information, SKU information, and other information, as well as any other associations to user 144 based on data linked to the user's account identifier. A mobile phone number can be used to link or identify item characteristics associated with past purchases of paper towels by user 144. In situations in which user 144 has historically purchased paper towels with different item characteristics (e.g., different SKUs, UPCs, etc.), conversation platform controller 115 may select an item based on the latest purchase. According to at least one example, the above-described actions may be sufficient to complete a transaction with at least one of merchant computing systems 130a, 130b, and 130n.

Item replenishment may proceed as follows, according to some further examples. Conversation platform controller 115 may transmit a summary electronic message 122a (not shown) of the item to be replenished, such as "If you would like to order 1 unit of 12 rolls of {BRAND X} paper towels for $17.95 including tax and shipping, please reply 'YES.'" In response, user interface 156a may receive a user input "YES," thereby causing user computing device 152a to transmit order affirmation as electronic message 122b. Responsive to receiving "YES," conversation platform controller 115 may generate a control message 121 for transmission to, for example, merchant computing system 130a to initiate completion of the transaction. Optionally, conversation platform controller 115 may generate a confirmation electronic message 122a for transmission to user computing device 152a. An example of such a confirmatory message is as follows: "Your order has successfully been placed. Thank you. You'll receive another text once your order has been shipped. In case of questions or problems, please call 1-800-555-1234." Control message 121 may include financial data (e.g., credit card information) associated with user 144 to initiate authorization at merchant computing system 130a, which, in turn, ships the item and optionally sends shipping confirmation to user computing device 152a to notify user 144 of an item in transit. Merchant computing system 130a may be configured to generate an order, charge the credit card, ship the item, and optionally send shipping confirmation.

User-initiate replenishment may be implemented as follows, at least in some examples. Destination account identifier ("774169") 154a may be displayed in advertising media (e.g., including printed ads, such as in newspapers and magazines, billboards, and the like), product packing, etc. so a user can review a package of, for example, Brand V protein powder to identify shortcode "774169" (or phone number) and the text to be entered (entry "V powder") to initiate a replenishment of Brand V protein powder (based on linking data related to the mobile phone number of user 144, such as shipping address, billing information, etc.). Alternatively, destination account identifier 154a may encode the product to replenish. For example, a package or other media (e.g., printed or online advertisements) may include the following: "Reorder Brand V protein powder by texting 'NOW' to 7741," whereby shortcode 7741 may be reserved to order Brand V protein powder at a merchant computing system 130. Other examples include According to various other examples, short codes, phone numbers (to text replenishment requests), etc. may encode any type of information to, for example, uniquely identify one or more of the following: a specific product, a specific merchant, and a specifically-configured shipment date and time, among other things.

Figure 2:
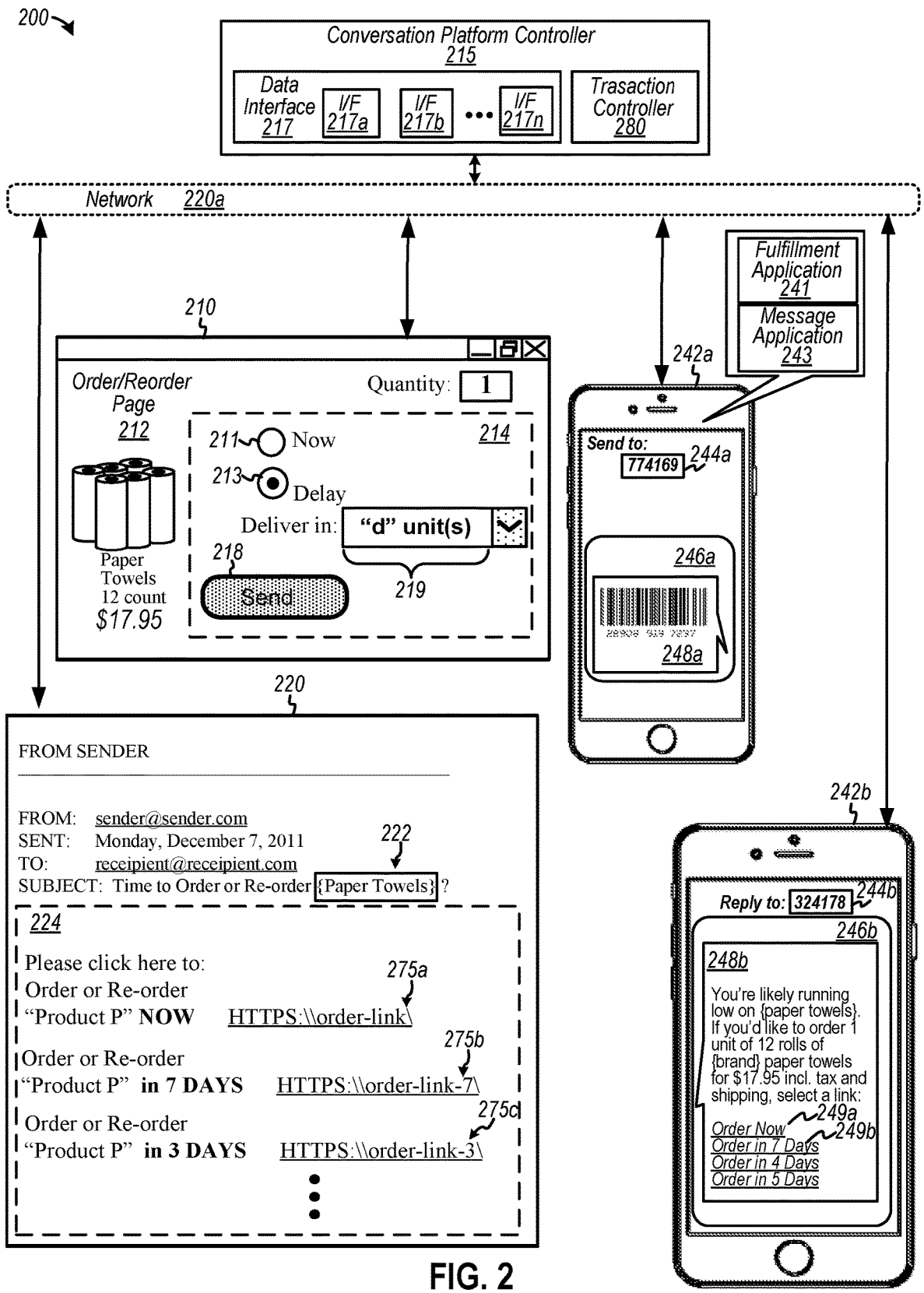
FIG. 2 is a diagram depicting an example of a conversation platform controller, according to some embodiments.

FIG. 2 is a diagram depicting an example of a conversation platform controller, according to some embodiments. Diagram 200 depicts a conversation platform controller 215 including a data interface 217, which, in turn, may include any number of specific interfaces 217a to 217n, and a transaction controller 280. Each of specific interfaces 217a to 217n may be configured to facilitate differently formatted exchanges of data via network 220a (e.g., the Internet) among conversation platform controller 215, other components of an adaptive distribution platform (not shown), and a computing device. In this example, conversation platform controller 215 may be configured to automatically facilitate optimal replenishment and distribution of items, which may include goods or services, based on an adaptive schedule using text messages or any other communication medium. Thus, electronic messages may be text messages, electronic mail messages, audio messages, web page messages, or any other messaging technique that provide sufficient information and data in a message to initiate and complete replenishment of an item. According to some examples, elements depicted in diagram 200 of FIG. 2 may include structures and/or functions as similarly-named or similarly-numbered elements depicted in other drawings.

Specific interfaces 217a to 217n may be implemented in hardware or software, or a combination thereof. In some cases, one of specific interfaces 217a to 217n may be implemented as an applications programming interface ("API"). For example, interface 217a may be configured to exchange data via HTML, HTTPS, or any other communication service/protocol between conversation platform controller 215 and web page 210. As another example, interface 217b may be configured to exchange data via POP, SMTP, IMAP, or any other communication service/protocol between conversation platform controller 215 and electronic mail message 220. Interface 217n may be configured to exchange data via SMS, EMS, MMS ("Multimedia Messaging Service") services, or any other communication service/protocol between conversation platform controller 215 and text message application in computing device 242b or a proprietary fulfillment application 241 disposed, for example, in computing device 242a. Thus, conversation platform controller 215 may be agnostic regarding the various forms of communication channels or media for which data interface 217 provides specialized interfacing.

Various structures and/or methods described herein may be applied to web pages 210, emails 220, multi-media text messages 248a and 248b, among other forms of communicating request to replenish an item. Web page 210 includes an order or reorder page as a user interface 212 to order or reorder an item (e.g., paper towels) by selecting in interface portion 214 either immediate delivery via input 211 or delayed delivery via input 213 and input 219 (a pull-down menu to select an amount of delay). Data received into interface 212 via inputs 211, 213, and 219 may be stored until input ("send") 218 is activated, after which the data may be transmitted contemporaneously (or substantially contemporaneously) to conversation platform controller 215 to initiate an order.

An electronic message to remind a user of imminent exhaustion of an item may be communicated as an email 220, which is shown to include an item characteristic 222 in a subject line so a user readily may discern the action required for such a communication. In email body 224, various delivery options may be embedded as hypertext links to enable a user to order or reorder an "Product P" "now," by selecting link 275a, or postponing shipment by 7 days with the selection of link 275b. According to some embodiments, the presentation of a link for a "7 day" delay, as a first link, may be due to its relatively high degree of compatibility with user 144 (based on probabilistic determinations at a distribution predictor, which is not shown). The presentation of a link 275c for a "3 day" delay, as a yet another link, may be due to its second-highest degree of compatibility. Thus, an adaptive distribution platform including conversation platform controller 215 may adapt presentation of user inputs to accommodate user purchasing and scheduling patterns and preferences to enhance, among other things, users' experiences.

User computing device 242a may include any messaging application 243 configured to transmit electronic messages based on, for example, SMS, MMS, or any other type of messaging service application. For example, FACEBOOK™ Messenger, TWITTER™, TWILIO™, WHATSAPP™, or any other like application may be suitable for implementation as messaging application 243, or in support of fulfillment application 241. In some examples, user computing device 242a may include executable instructions constituting a fulfillment application 241, which may be integrated with, or disposed on (e.g., built on), a messaging application layer (including messaging application 243) to provide enhanced functionality.

Further to user computing device 242a, consider that a user may initiate distribution of an item by capturing an image 248a of product label or code (e.g., UPC), such as by using a camera of user computing device 242a, to import into interface 246a. User computer device 242a may transmit image 248a as an electronic message to an adaptive distribution platform using shortcode ("774169") 244a, whereby the adaptive distribution platform may implement image processing, such as optical character recognition or other similar processes to identify an item to replenish based on an image. In some cases, transmitting image 248a from a known mobile phone number may be sufficient to complete the transaction to ensure that a supply of an item is replenished.

An adaptive distribution platform may initiate distribution of an item by transmitting message 248b for presentation in user interface 246b of user computing device 242b. As shown, multiple user inputs 249a and 249b are presented to receive different user inputs to activate a transaction. Selection of link 249a generates an electronic message requesting an immediate order for transmission to a destination account identifier 244b, whereas selection of link 249b generates an electronic message that requests an order at a delayed time, as defined by the link (e.g., 7 days). According to various embodiments, certain amounts of delay may be presented in descending order from highest probability or likelihood (e.g., 7 days) to a lowest probability (e.g., 5 days), whereby the probabilities may be determined based on a user's preferences and purchasing patterns. Thus, a user likely can find its top three most probable preferences for the amounts of postponement (e.g., 7, 4, and 5 days) with less expended time than otherwise might be the case.

Transaction controller 280 may include logic configured to control the exchange of data to identify items for replenishment and other actions associated with an order. In text-based requests, transaction controller 280 may operate to parse text submitted as an order to determine a requested product. According to some examples, transaction controller 280 may operate in accordance with a predictive model (e.g., decision tree) that operates on XML formatted messages to generate control messages to replenish an item. Transaction controller 280 may implement deep learning, machine learning, neural networks, fuzzy logic, regression techniques, or other computer-based artificial intelligence techniques to identify a user's request from various types of electronic messages. Note that the above-described implementation for FIG. 2, as well as other figures, may be applicable to services in accordance with some examples. For example, a user may, as an SMS text messaging service, receive a curated or personalized recommendation as to, for example, a particular shirt or clothing. Personalization may be based on user characteristics and preferences, including item characteristics of past purchases (e.g., shirt motifs, such as Hawaiian shirts, colors, sizes, etc.). A user need only reply "Yes" to order apparel from the curated SMS service. As another example, a user may receive an SMS text message asking whether the user is interested in delivery of a food item for lunch by responding to a text to a food delivery service, a food truck, or any other source.

Figure 3:
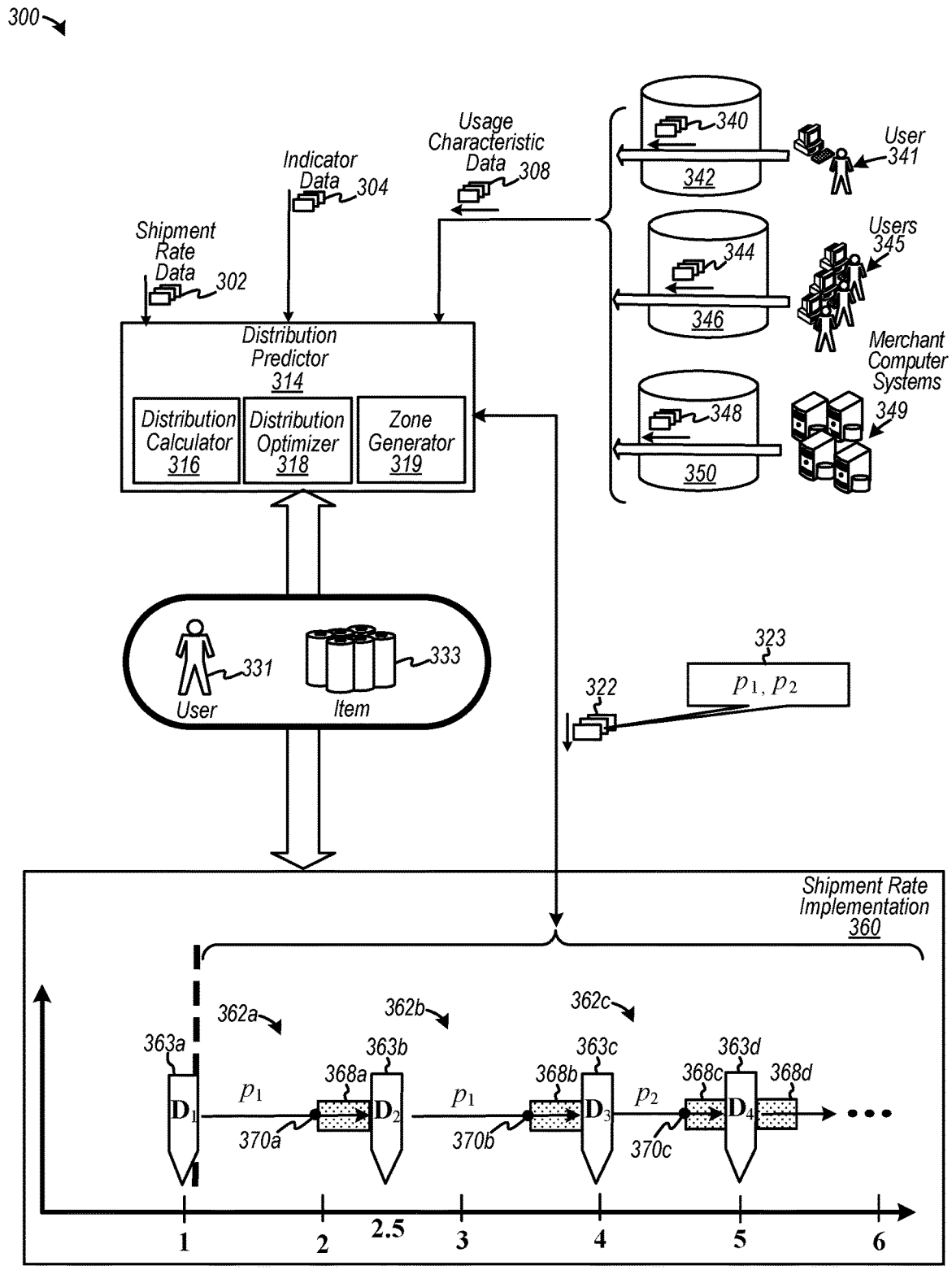
FIG. 3 is a diagram depicting an example of operation of a distribution predictor, according to some embodiments.

FIG. 3 is a diagram depicting an example of operation of a distribution predictor, according to some embodiments. As shown, diagram 300 includes a distribution predictor 314 configured to predict a point in time (or a range of time) at which an item may be exhausted or otherwise ought to be distributed to replenish a supply of an item, which may be any good or service. A good may be a durable good (e.g., goods that do not wear out quickly or are not depletable per use, such as vehicles, jewelry, appliances, etc.) or disposable goods (e.g., goods that may be used up after purchase, such as food, toiletries, clothes, and the like). A prediction may be determined periodically, aperiodically, in real-time, substantially in real-time, at any time, etc. In some examples, distribution predictor 314 may include a distribution calculator 316, a distribution optimizer 318, and a zone generator 319. In other examples, such as that shown and described in connection with FIG. 13 may be configured functionally and structurally differently and is not limited to the examples shown and described here. According to some examples, elements depicted in diagram 300 of FIG. 3 may include structures and/or functions as similarly-named or similarly-numbered elements depicted in other drawings.

In the example shown, distribution calculator 316 is shown configured to generate predicted times of distribution subsequent to, for example, an initial order and distribution (i.e., shipment) at time ("D1") 363a. Examples of predicted times of distribution, as shown shipment rate implementation 360, may include a predicted time ("$D_2$") 363b of distribution, a predicted time ("$D_3$") 363c of distribution, predicted time ("$D_4$") 363d of distribution. Predicted times 363b, 363c, and 363d of distribution are predicted distribution events that may be a function of a user 331 (e.g., a user's usage rates and consumption patterns) or an item 333 and its characteristics (e.g., based on usage rates and consumption patterns of a group of users over one or more merchant computer systems). Note that predicted times 363b, 363c, and 363d of distribution need not be predicted as if under a subscription. That is, the depiction of predicted times 363b, 363c, and 363d of distribution is for purposes of discussion, and a predicted time of distribution need not be predicted beyond a next shipment that replenishes an item nearing exhaustion.

Predicted times 363b, 363c, and 363d of distribution may be correlated to a period of time, such as periods of time p1 and p2, based a rate of depletion of an item. For example, a period of time, p, may define an amount of time (e.g., a time interval) between an initial supply level (e.g., a full supply on date of initial purchase, such as time ("D1") 363a) and a predicted date of exhaustion, such as time ("$D_2$") 363b, which may coincide with a predicted time of distribution (e.g., time of delivery). To illustrate, a distribution event at time ("$D_2$") 363b may be timed to occur at the $30^{th}$ day after a user has purchased at time ("D1") 363a a bottle of vitamin supplements having 30 tablets that are taken once a day. Thus, distribution predictor 314 may generate data 322 representing periods 323 of time, such as periods of time ("$p_1$") 362a and 362b, both of which are depicted as 1.5 units of time, and period of time ("$p_2$") 362c is depicted as 1 unit of time. In some examples, distribution optimizer 318 may receive feedback relating to ordering patterns of user 331 (e.g., user 331 typically requests shipments prior to a date of exhaustion). Based on the feedback, distribution optimizer 318 may be configured to adjust a predicted distribution event at time 363d and a period 362c of time, which is shorter than periods 362a and 362b of time. In other examples, distribution optimizer may receive, gather, request, call, or otherwise electronically obtain, either as digital data or analog signal input, data indicative of a predicted distribution event and generate distribution options using techniques such as those shown and described below.

Zone generator 319 may be configured to determine a zone of time in which depletion of an item is predicted. A zone of time, and its duration, may be adapted relative to a distribution event or a period of time since, for example, a known supply level of an item (e.g., a full supply at a previous purchase). As shown, zone generator 319 may be configured to determine a zone 368a of time associated with time 363b, a zone 368b of time associated with time 363c, and a zone 368c of time associated with time 363d, each of which may be a range of time preceding a distribution event. In some cases, zone generator 319 may be configured to determine a zone 368d of time that succeeds a distribution event at time 363d. Zone 368c of time may be different (e.g., shorter) than zones 368a and 368b of time based on respective periods of time, according to some examples.

Distribution predictor 314 also may be configured to associate a point in time with a zone of time, the point in time defining a moment at which an electronic message may be transmitted to a computing device (e.g., a mobile phone) to inform a user of the pending exhaustion of an item and to provide an opportunity to replenish the item in a configurable manner. As shown, distribution predictor 314 may associate a point 370a to zone 368a of time, a point 370b of time to a zone 368b of time, and a point 370c to zone 368c of time, whereby an adaptive distribution platform (not shown) may generate electronic reminder messages at points 370a, 370b, and 370c of time. Thus, an electronic reminder message transmitted at, for example, point 370a of time is associated with a zone 368a of time. Consider an example in which an electronic message is sent at point 370a of time, which may be eight (8) days prior to time 363b. Thus, zone 368a of time may be subdivided into, or otherwise include, various times at which to delay initiation of an order. For example, an electronic reminder message may be sent to a user eight (8) days prior to time 363b, whereby the electronic reminder message may provide user inputs to delay distribution by "7," "6," "4," "2," days, or any other amount of delay, within zone 368a of time.

According to some embodiments, distribution predictor 314 may be configured to receive and/or determine data for one or more item characteristics that may include, but are not limited to, data representing one or more characteristics of an item, shipment rate-related data 302, indicator-related data 304, and usage-related data 308, and the like. Note that data 302, 304, and 308 may be referred to as examples of item characteristics, according to various examples. Examples of some item characteristics may include a product or product type, a service or service type, SKU data, UPC data, etc. for the same or similar items, or complementary and different items (e.g., complementary or correlatable products may be predicted to have similar predicted times of distribution or rates of consumption and/or depletion). Examples of shipment rate-related data 302 may include a number of purchases or orders per user, per group of users, or per item, a number of shipments, etc. Examples of indicator-related data 304 may include data representing items characteristics that may be correlatable to, for example, order and shipment rate-related data (e.g., a "take rate," a "cancellation rate," etc., or any other data type, such as an "adoption rate" of platform-initiated or user-initiated reordering, a "conversion rate" of responding to reminder messages as a function of user and item, etc.), which, in turn, may be used to derive a predicted time of distribution. The term "take rate" may include data representing a rate at which users "take" or implement a presented value of delay (e.g., delay by "7" days) as a default amount of delay, according to some examples. The term "cancellation rate" may include data representing a rate at which users "cancel" an order (e.g., based on, for example, frustrations of over-supplied or under-supplied amounts), according to some examples.

Examples of usage-related data 308 may include data representing attributes specifying contextual-related information associated with an item, such as, but not limited to, user-related characteristics, such as demographic information, purchasing-related data (e.g., purchase patterns), and the like. In some cases, usage-related data may include attributes 340 describing items historically purchased by a user 341 (e.g., patterns of a parent), as well as attributes 344 describing items historically purchased by associated users 345 (e.g., patterns of a grandparent) or a subpopulation or a population of which a user belongs. Also, usage-related data may include sale-related and shipment-related attributes 348 provided by merchant computer systems 349. Data representing attributes 340, 344, and 348 may be stored in repositories 342, 346, and 350, according to some examples.

Figure 4:
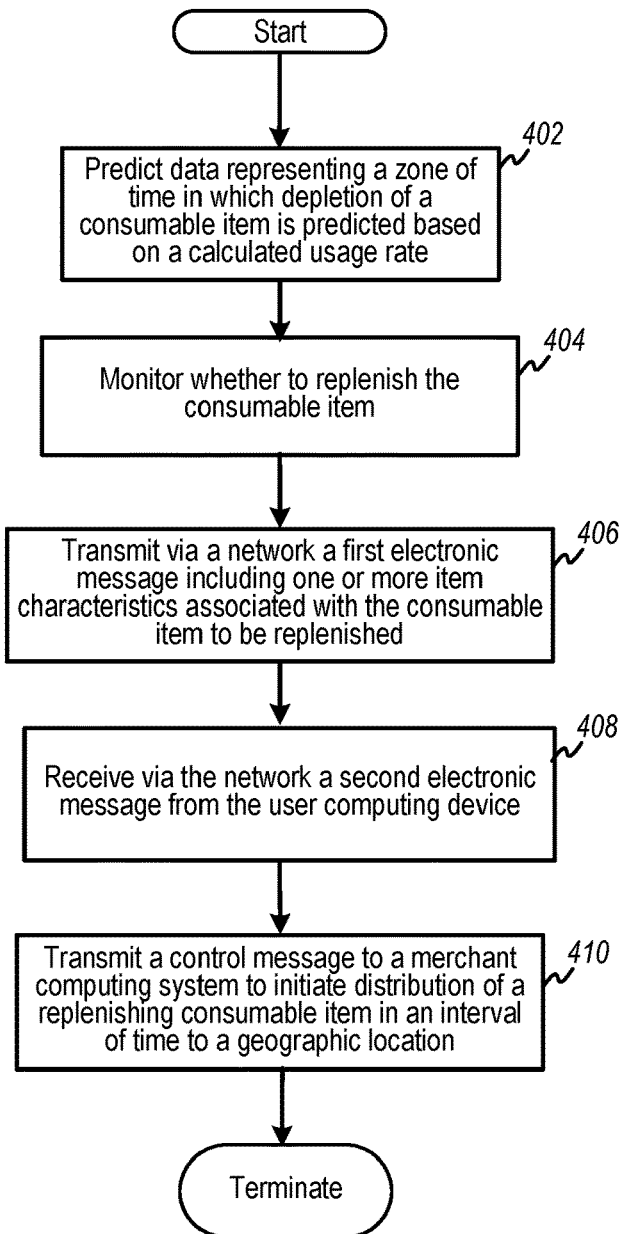
FIG. 4 is a diagram depicting an example of a flow, according to some embodiments.

FIG. 4 is a diagram depicting an example of a flow, according to some embodiments. At 402 of flow 400, data representing a zone of time in which depletion of an item (e.g., a consumable item) may be predicted. In some examples, the zone of time may be associated with a predicted distribution event (e.g., a predicted time of distribution), which may be based on a calculated usage rate related to any of a user, a group of users, and one or merchant computer systems. At 404, a predicted time of distribution may be monitored relative to a time at which to replenish a consumable item, for example, prior to exhaustion of an item, which may be any good or service. At 406, a first electronic message may be transmitted via a network to a user computing device. The first electronic message may include one or more item characteristics associated with a consumable item to be replenished. Further, data representing the first electronic message may be configured to present at least one item characteristic (e.g., a product type or brand, a product classification (e.g., paper towels), a price, an indication to delay an order, etc.) at a display portion of a user interface. According to various examples, the first electronic message may be a reminder message if replenishment is platform-initiated, or a confirmatory message if user-initiated. At 408, a second electronic message from the user computing device may be received into, for example, an adaptive distribution platform. In some examples, the second electronic message may be sufficient to initiate an order, with or without a delay, including payment and shipment. At 410, a control message may be transmitted to a merchant computing system to initiate distribution of a replenishing consumable item. For example, the distribution of an item may be to a geographic location (e.g., address) associated with an account (e.g., a user account having, for example, data representing a shipping address).

Figure 5:
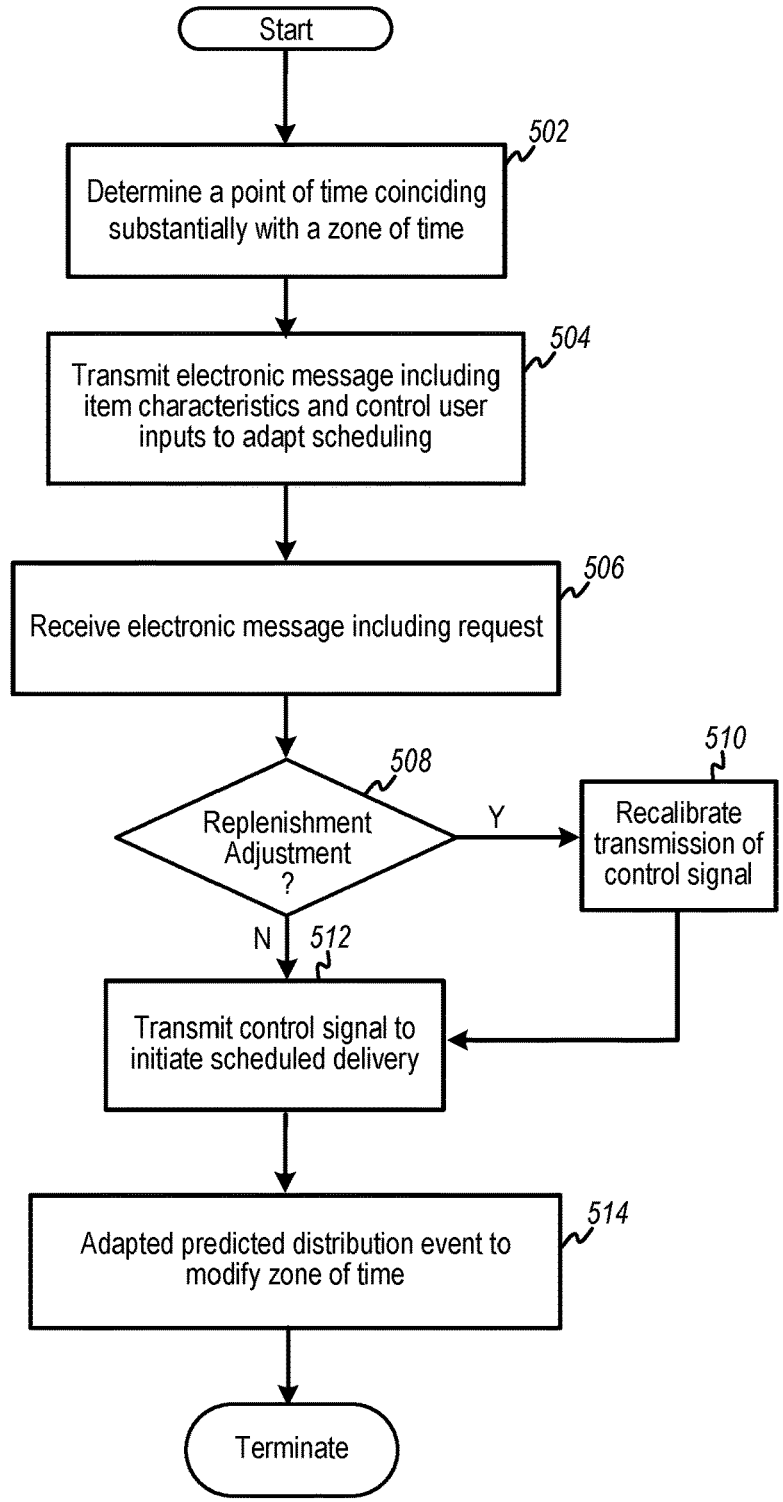
FIG. 5 depicts an example of another flow, according to some embodiments.

FIG. 5 depicts an example of another flow, according to some embodiments. Flow 500 may apply to platform-initiated replenishment, according to various examples. At 502, a point of time coinciding (or substantially coinciding) with a zone of time may be determined. For example, data representing a point of time may represent a date (e.g., as defined by year, month, day and time) that may be compared against a date range associated with a zone of time. When the point of time falls within the zone of time, replenishment may be initiated by, for example, and an adaptive distribution platform. At 504, an electronic message reminding a user may be transmitted. The electronic message may include data representing one or more item characteristics. Further, the electronic message may include one or more control user inputs to adapt scheduling of distribution of the item. A control user input, or user input, may include specifying ordering "NOW," or at any number of delayed units of time (e.g., delay by 3 days). At 506, an electronic message that includes a request for replenishment may be received into, for example, an adaptive distribution platform.

At 508, a determination is made whether replenishment may be adjusted. If no adjustment is detected, flow 500 continues to 512, otherwise flow 500 continues to 510. For example, if no delay in replenishment is detected at 508, then flow 500 continues to 512, at which a control signal may be transmitted (e.g., to a merchant computing system) to initiate scheduled delivery of an item, which may be any good or service. For example, a confirmation electronic message may be optionally generated at 512 for transmission to a user computing device to confirm acceptance of order. The control message may include financial data (e.g., credit card information) to initiate authorization of payment at a merchant computing system. If delay in replenishment is detected at 508, then flow 500 continues to 510, at which transmission of the control signal may be recalibrated. For example, a control signal may be generated for transmission to a merchant computing system to initiate authorization of the transaction with a hold on shipment. Thus, the recalibrated control signal may provide financial data for authorization of payment, but may postpone or withhold authorization to complete the transaction, including shipment. After an amount of delay has elapsed (e.g., 7 days), as determined at 510, another control message may be released for transmission to cause the merchant computing system to generate an order, charge the credit card, ship the item, and optionally send shipping confirmation.

At 514, a predicted distribution event may be adjusted, which, in turn, may modify a zone of time. For example, a predicted distribution event may be optimized based on feedback or analysis of data trends associated with users and merchants. A value representing a predicted distribution event or date may be optimized by including a user's monitored shipment delay preference, whereby the optimized predicted time of distribution may be a modified distribution event. For example, a particular user may prefer to deviate from a predicted distribution event by delaying or expediting shipping (e.g., repeatedly). Thus, a reminder message may be generated in accordance with the user's preference, which may be embodied in presented amounts of delay or in a modified date of predicted exhaustion.

According to various examples described herein, the structures and/or processes set forth to replenish items may apply to one or more items (e.g., a single item, or multiple items). In some examples, a point of time at 502 may be determined that substantially coincides with a zone of time for multiple items, such as a vitamin regimen in which a user consumes different vitamin supplement tablets (e.g., vitamins A, B, D, E, etc.) at a daily rate. In some examples, a user may set up via a user computing device a list of vitamins to be shipped at a recurring date, or predicted dates based on predicted dates of depletion or exhaustion (e.g., a time of distribution). The list may be entered via mobile phone, email, phone, webpage, etc., whereby and adaptive distribution platform may manage the tracking and delivering of multiple bottles of vitamins either in accordance with a list, or by calculating predicted times of distribution or delivery (e.g., based on computed or projected usage rates for each of the vitamins). For example, bottles of 30 vitamin tablets may be included in a list every month, whereas bottles of 60 vitamin tablets may be included in the list every other month.

At 504, an electronic message, such as a text message, and may be transmitted from adaptive distribution platform to a user computing device, whereby the electronic message may include a list of items associated with a predicted optimal point in time at which one or more items in the list are depleted or substantially depleted. For example, the electronic message may indicate: "The following is a list of items that you may wish to replenish. Reply 'Yes' if you wish to replenish each item in the list, or reply with a corresponding number for those items you wish to replenish. For vitamin A enter ' 1,' for vitamin B enter '2,' for vitamin C enter '3,' for vitamin E enter '4,' and cod liver oil tablets enter '5'(separated by space or comma)." A user desiring to replenish vitamins C and E then would enter and text "3 4" in reply at 506. At 508, one or more items (e.g., bottles of vitamins) may be delayed by any amount of time. For example, a user may enter "1p7d," "2p1m," and "5p1y," where "p" indicates an instruction to "postpone" delivery by an amount of time expressed by "d" (day), "m" (month), or "y" (year). In this example, the user is requesting to postpone delivery of vitamin A by 7 days ("1p7d, where 1=vitamin A, p=postpone, 7=number of time units to delay, and d=time units), postpone delivery of vitamin B for one month, and postpone delivery of cod liver oil tablets by one year. The delivery of vitamins A and B, as well as cod liver oil, may be recalibrated at 510 to comply with the user's requested delivery postponements. At 512, a control signal to ship vitamins C and E may be transmitted to, for example, a merchant computing system.

Figure 6:
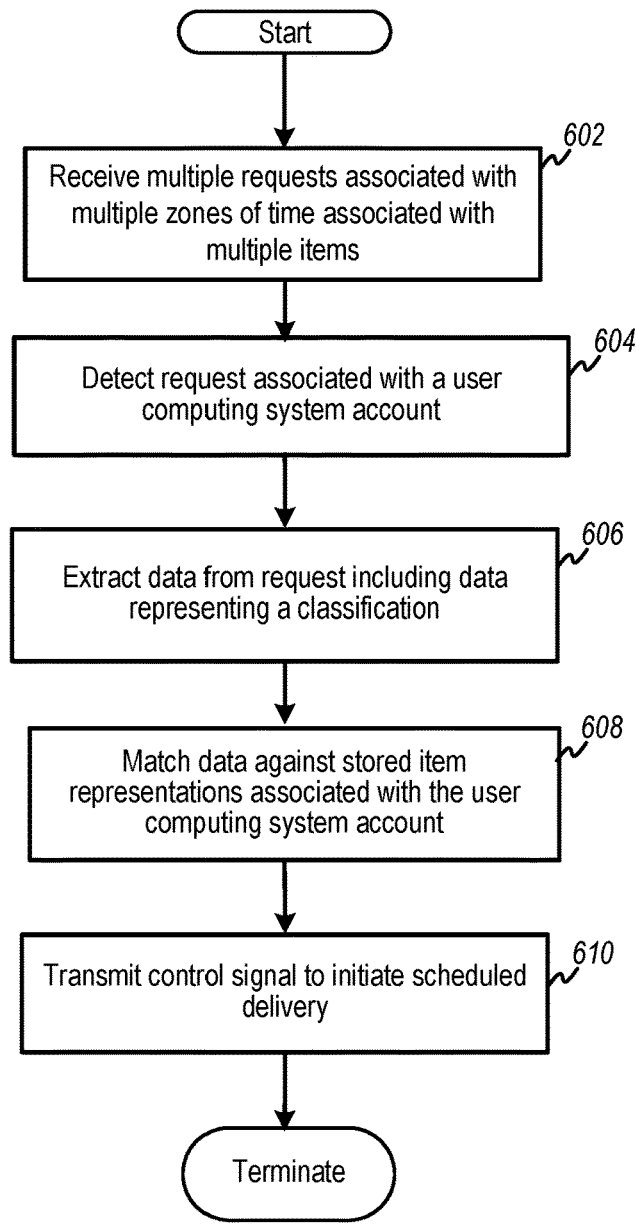
FIG. 6 depicts an example of yet another flow, according to some embodiments.

FIG. 6 depicts an example of yet another flow, according to some embodiments. Flow 600 may apply to user-initiated replenishment, according to various examples. At 602, multiple requests for replenishment for various items may be monitored by, for example, an adaptive distribution platform. Such requests may be associated with various zones of time associated with various items. At 604, a request associated with a user computing system account for a particular item may be detected. In some examples, data encapsulated in an electronic request message at 604 may be sufficient to complete an order for item replenishment. At 606, data from electronic messages including a request for item replenishment may specify, for example, data representing an item characteristic (e.g., a classification, such as "paper towels," or product type, such as a brand name). For example, a request for replenishment may include the text "paper towels." Thus, the text "paper towels" may be extracted for analysis to determine or confirm that the text entered correlates to a specific item requested for stored item representations associated with a user computing system account. For example, an account identifier, such as a mobile phone number (or email address, etc.), may be associated with a user computing device. A merchant computing system may include data representing mobile phone number, which may be accessible by an adaptive distribution platform. Thus, logic in the adaptive distributions platform may be configured to link the mobile phone number to data representing a consumer profile, including, but not limited to, a default shipping address, payment instrument, etc. The mobile phone number may also be used to identify the user's past order history to identify past items that may be relevant to the item identified in the extracted data. At 610, a control signal may be transmitted to a merchant computing system (e.g., via a commerce platform controller) to initiate scheduled delivery.

Figure 7:
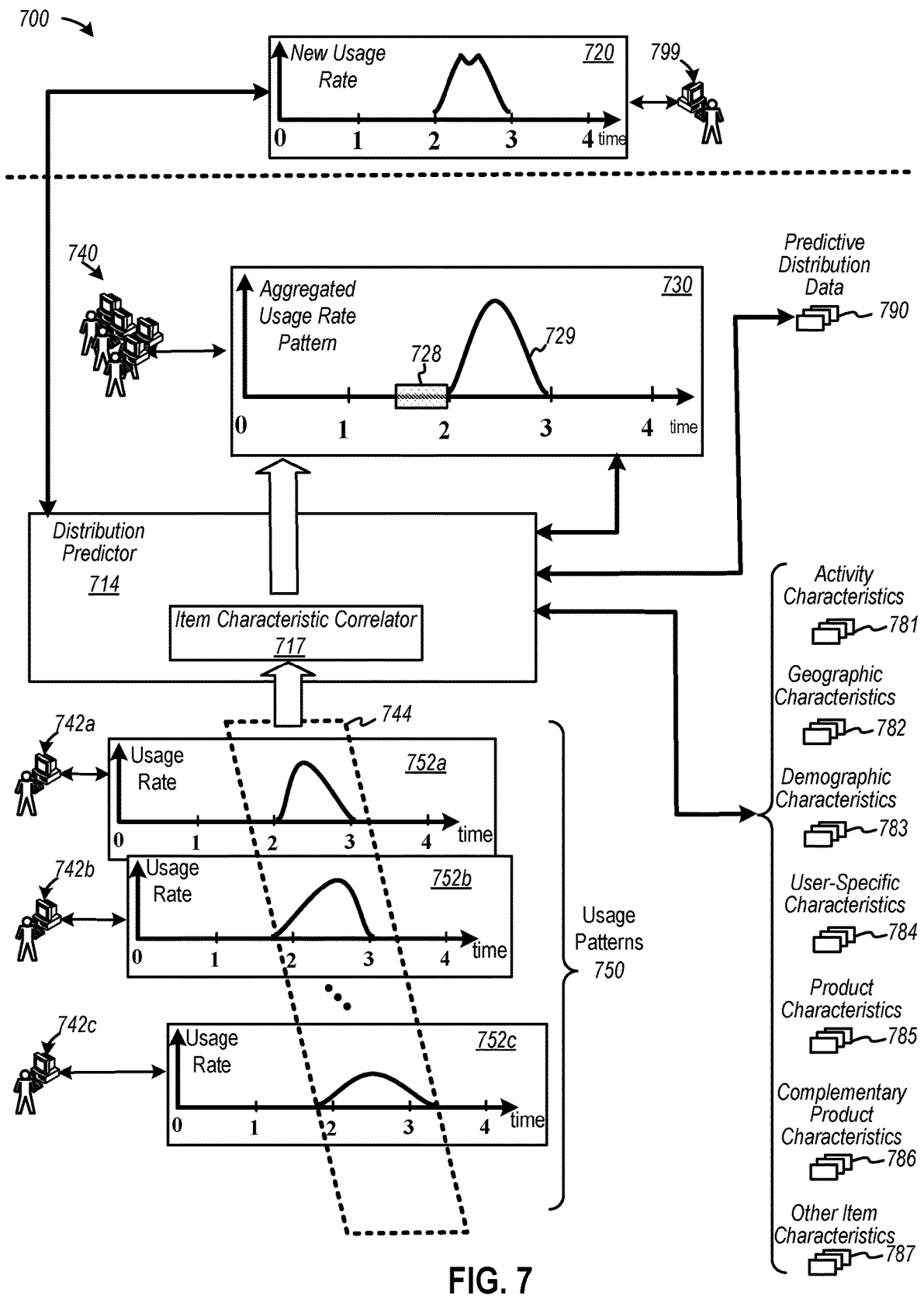
FIG. 7 is a diagram depicting an example of operation for a distribution predictor to generate predictive distribution data based on derived usage data, according to some embodiments.

FIG. 7 is a diagram depicting an example of operation for a distribution predictor to generate predictive times of distribution based on derived usage data, according to some embodiments. Diagram 700 depicts a distribution predictor 714 including an item characteristic correlator 717, which may be configured to identify one or more item characteristics 744 with which to correlate to determine or derive data that may be further used to derive or predict distribution events, times of distribution, zones of time, and associated points of time, any of which may as encapsulated in predictive distribution data 790. In some examples, item characteristic correlator 717 may be configured to generate (or characterize) an aggregated item characteristic 729 that may specify attributes of a particular aggregated item characteristic aggregated for a number of users 740 (over users 742a, 742b, and 742c).

To illustrate, consider that item characteristic correlator 717 is configured to identify usage rates 752a to 752c (e.g., a rate at which a product or service is reordered, or consumed or depleted) for corresponding user accounts 742a to 742c (e.g., associated with user phone numbers). In this example, consider that users 742a to 742c purchase a "laundry detergent" having usage rates 752a to 752c. Usage rates between "0" and "1" (e.g., usage amounts during a spring season), usage rates between "1" and "2" (e.g., usage amounts during a summer season), and usage rates between "2" and "3" (e.g., usage amounts during a fall season). It may be that users 742a to 742c play football during the fall, and consequently use more laundry detergent due to football practices and games in inclement weather (e.g., due to muddy fields, etc.) Thus, distribution predictor 714 may be able to discern patterns 750 of usage. Further, distribution predictor 714 may aggregate the usage rates to form an aggregated usage rate pattern 730 for a group of users 740. Based on aggregated usage rate pattern 730, distribution predictor 714 may be able to generate or predict an aggregated distribution event or an aggregated time of distribution 790.

Distribution predictor 714 may also use other types of data with which to evaluate when calculating a predicted time of distribution. Examples of such data are shown in diagram 700 and may include activity characteristics data 781 (e.g., characteristics indicative of participation in a sport or task), geographic characteristic data 782, demographic characteristic data 783 (e.g., aggregated user data), user-specific characteristic data 784 (e.g., history of purchases by a user, etc.), product characteristics data 785, complementary product characteristics data 786, and other item characteristics data 787.

Based on the above, distribution predictor 714 may be configured to identify a usage rate 720 of a new user 799, and further configured to match the new usage rate 720 against aggregated usage rate 729 of aggregated usage rate pattern 730 to predict, for example, that user 799 "plays football," as well as other characteristics of the user with which to derive an optimized predicted time of distribution. According to some examples, distribution predictor 714 may predict future participation in an activity or an increase in usage rate during interval 728. Thus, distribution predictor 714 may adapt a predicted time of distribution so as to prepare a user for increased usage rates by adjusting the periods of time prior to a modified time of distribution to reflect an increased laundry detergent amount or a decreased amount of time between shipments. Note that the example described in diagram 700 is not intended to be limiting to laundry detergent, but may be applicable to any characteristic of an item or other items.

Figure 8:
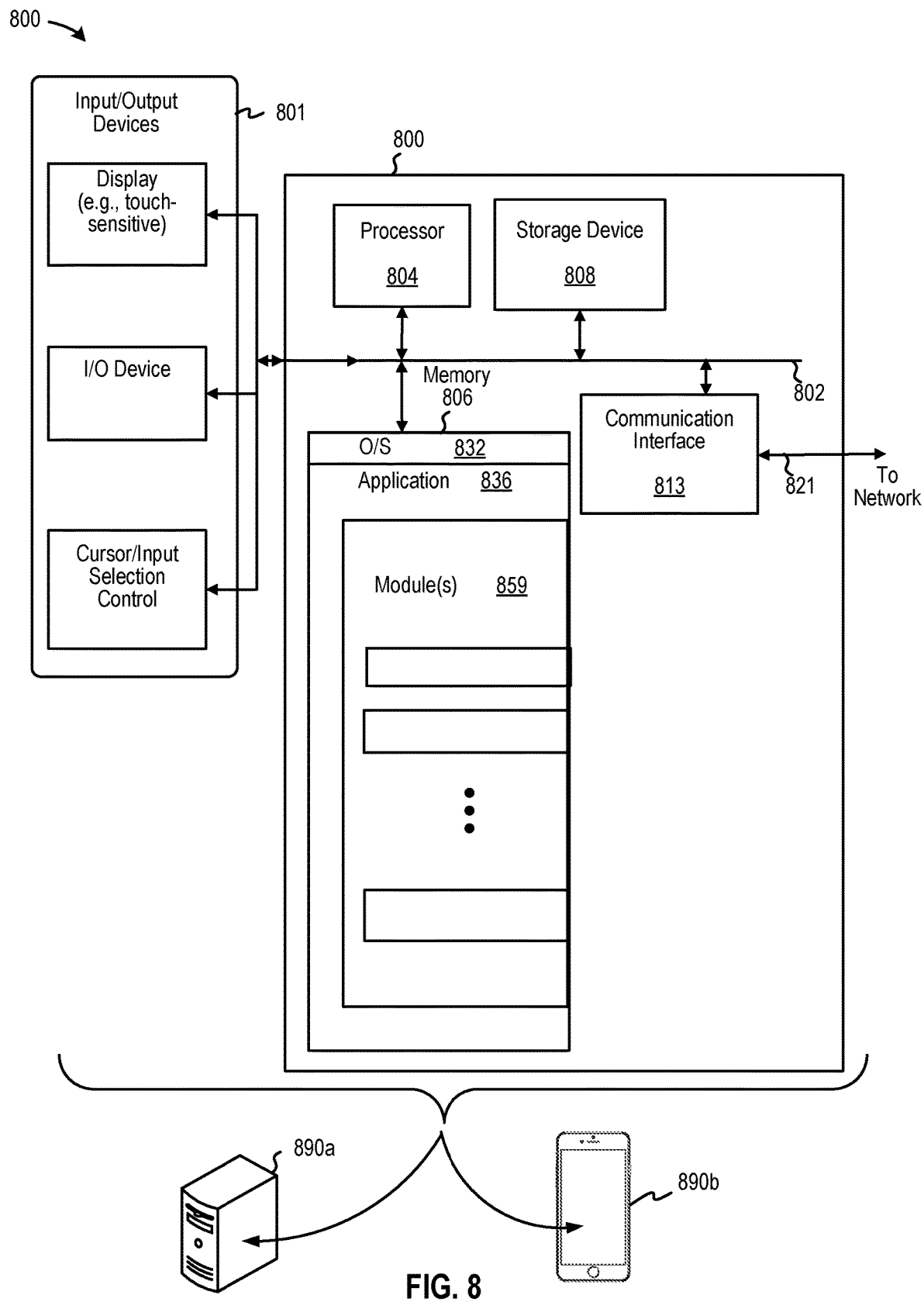
FIG. 8 illustrates examples of various computing platforms configured to provide various functionalities to predict a time of distribution of an item relative to an adaptive schedule, according to various embodiments.

FIG. 8 illustrates examples of various computing platforms configured to provide various functionalities to predict a time of distribution of an item relative to an adaptive schedule, according to various embodiments. In some examples, computing platform 800 may be used to implement computer programs, systems, platforms, applications, methods, processes, algorithms, or other software, as well as any firmware or hardware implementation thereof, to perform the described techniques.

In some examples, "system" may refer to or include the description of a computer network system or topology associated with a map, network, layout, environment, or the like of computing resources that are used to implement a feature, function, process, element, component, part, or multiple instances thereof, without any particular limitation as to the type, configuration, programming or formatting language, service, class, resource, specification, protocol, or other attributes thereof. As used herein, "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Also as used below, "platform" may refer to any type of computer hardware (hereafter "hardware") and/or software environment using one or more local, remote, distributed, networked, or computing cloud (hereafter "cloud")-based computing resources (e.g., computers, clients, servers, tablets, notebooks, smart phones, cell phones, mobile computing platforms or tablets, and the like) to execute an application, such as those described above, without restriction or limitation to any particular implementation, design, configuration, instance, or state. Distributed resources such as cloud networks (also referred to interchangeably as "computing clouds," "storage clouds," "cloud networks," or, simply, "clouds," without restriction or limitation to any particular implementation, design, configuration, instance, or state) may be used for processing and/or storage computing resources, without restriction or limitation to any particular implementation, design, configuration, instance, or state of a device or machine, physical, virtual, logical, or otherwise. As used herein, data may be refer to any data type configured to be received by a system, platform, application, or other computing device or processor, which may include, but is not limited to, digital and/or analog (e.g., binary) data in any type of format or schema, including, but not limited to files, packets, segments, frames, partitions, containers, .jar files, characters, strings, text, integers, real numbers, Boolean, alphanumeric, ASCII, RSS, or any other type beyond those listed here), or others, without limitation or restriction.

In some examples, data may be processed from various sources, including, but not limited to local, remote, distributed, networked, or cloud-based systems, applications, platforms, programs, databases, or other data sources such as data streams or sources of data that are generated from various types of applications or clients, without limitation to language, format, or protocol. As used herein, data may be stored in various types of data structures including, but not limited to databases, data repositories, data warehouses, data stores, or other data structures configured to store data in various computer programming languages and formats in accordance with various types of data schemas such as SQL, MySQL, NoSQL, DynamoDB™ from Amazon® Web Services, Inc. of Seattle, Wash., FMP, Oracle®, relational or unstructured, or others, without limitation or restriction to any particular instance or implementation. Further, references to databases, data structures, or any type of data storage facility may include any embodiment as a local, remote, distributed, networked, cloud-based, or combined implementation thereof. For example, social networking applications being used on different types of devices may be generating data in different forms, formats, and data storage schema on different types of data storage devices and databases that are configured to store data generated for text messaging, image, audio or video streams, blog (i.e., World Wide Web-posted log) or vlog (i.e., video log) entries, instant messages, disappearing messages (e.g. snaps using Snapchat™, simple message system (i.e., SMS, IRC, and the like) messages, and the like, without limitation or restriction. Data may be generated from "tweets" or messages from applications such as Twitter® of San Francisco, Calif., "snaps" using the Snapchat® application such as those developed by Snap® of Venice, Calif., or "messenger" posts using applications such as Facebook® of Menlo Park, Calif. In some examples, data may be formatted using simple messaging data communication and transmission protocols such as Internet Relay Chat (IRC), SMS, instant messaging (IM), or others, without limitation. In other examples, data may be generated, transmitted, received, transformed, or otherwise operated on in other forms and formats using programming and formatting languages intended to transmit, transfer, or transport data at different levels of an application architecture (as described in greater detail below). For example, Java®, JavaScript®, JSON, Python™, XML, HTML, SQL, MySQL, R, SPARQL, Hadoop, and other data formats and programs may be used in conjunction with the techniques described herein by application 102, which may be implemented to provide messaging functionality at the application layer of a layered "stack" application architecture following a standard such as the Open Systems Interconnect (OSI) model or others.

In some cases, computing platform 800 or any portion (e.g., any structural or functional portion) can be disposed in any device, such as a computing device 890*a*, mobile computing device 890*b*, and/or a processing circuit in association with implementing any of the various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store any types of data, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a subscriber or user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. One or more logic modules 859 may each be configured to perform at least one function as described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 859 of FIG. 8 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 859 of FIG. 8, or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 9:
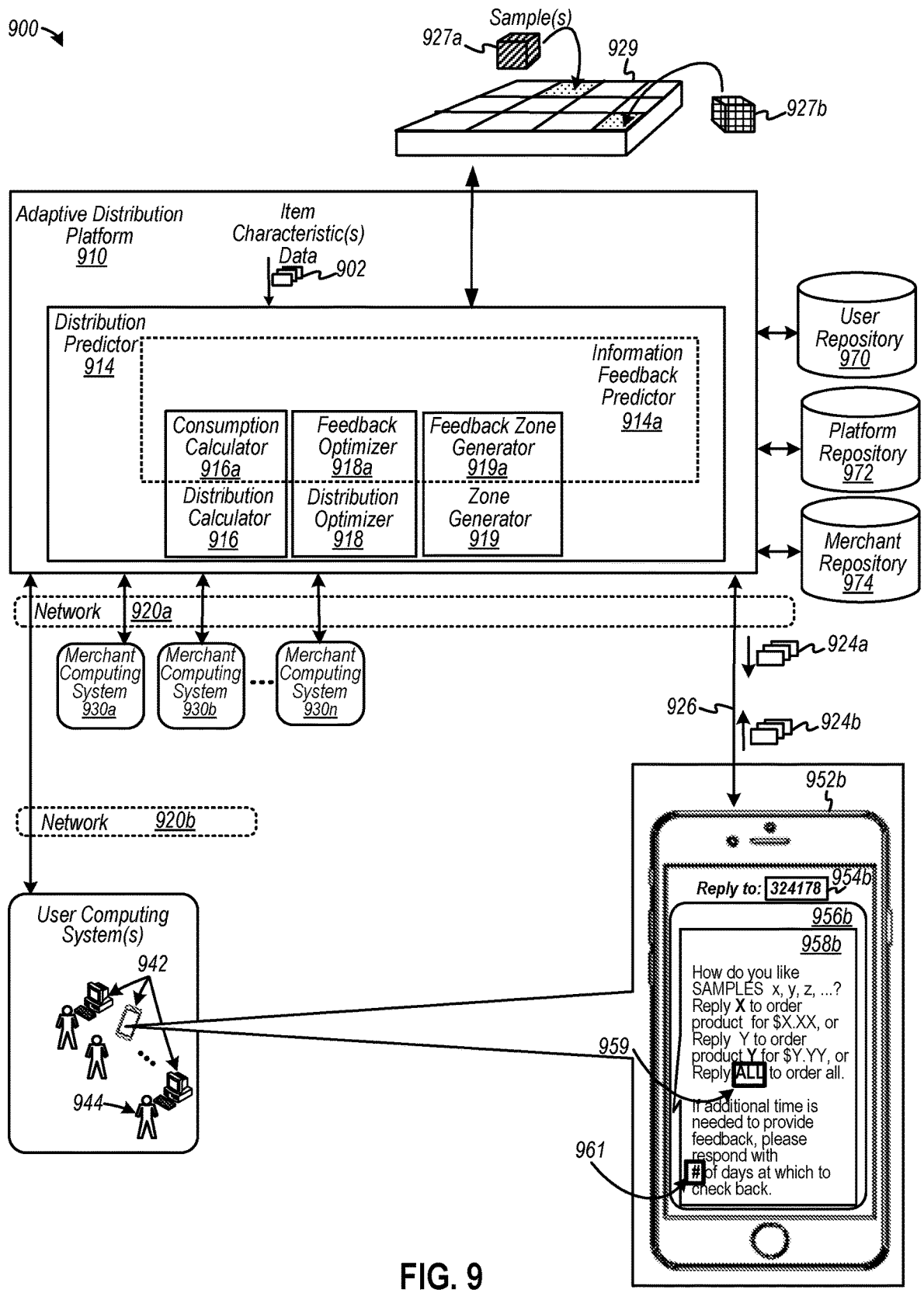
FIG. 9 is a diagram depicting another example of an adaptive distribution platform, according to some embodiments.

FIG. 9 is a diagram depicting another example of an adaptive distribution platform, according to some embodiments. Diagram 900 depicts an example of adaptive distribution platform 910 that may be configured to facilitate automatic distribution of items in accordance with an adaptive schedule. Adaptive distribution platform 910 may be configured to exchange one or more electronic messages via networks 920a and 920b with one or more of computing devices 942 and 952b for users 944, which may be a consumer. In the example shown, adaptive distribution platform 910 may include a distribution predictor 914 as well as other elements (not shown), any of which may include logic, whether implemented in hardware or software, or a combination thereof. Distribution predictor 914 is shown to include a distribution calculator 916, a distribution optimizer 918, and a zone generator 919. Further, adaptive distribution platform 910 may also be configured to access one or more of a user repository 970 configured to store at least data describing user characteristics, a platform repository 972 configured to store platform-related characteristics in data, including item characteristic data 902, and a merchant repository 974 configured to store user-identification data as well as merchant-related information (e.g., production information, inventory information, etc.). User-identification data may be based on, for example, a unique identifier including on one or more of a location (e.g., a consumer's shipping address), a payment instrument identifier (e.g., a credit card number, etc.) and an electronic account identifier (e.g., identified by a mobile phone number or the like), according to some embodiments. According to some examples, elements depicted in diagram 900 of FIG. 9 may include structures and/or functions as similarly-named or similarly-numbered elements depicted in other drawings, such as FIGS. 1 to 3 and FIG. 8, among others.

Adaptive distribution platform 910, as described herein, may be configured to facilitate "adaptive" scheduling services, as described herein, via a computing system platform for multiple online or Internet-based retailers and service providers, both of which may be referred to as merchants. In this example, a merchant may be associated with a corresponding one of merchant computing systems 930a, 930b, or 930n that includes one or more computing devices (e.g., processors, servers, etc.), one or more memory storage devices (e.g., databases, data stores, etc.), and one or more applications (e.g., executable instructions for performing adaptive subscription services, etc.). Examples of merchant computing systems 930a, 930b, or 930n may be implemented by any other online merchant.

Distribution predictor 914 is further shown to include an information feedback predictor 914a, which may be configured to predict a date of consumption with which to solicit feedback regarding a replica of an item, the replica being a portion or "sample" of an item. A replica, therefore, may be one or more units of an item configured to provide a recipient an opportunity to experience the item, whereby a recipient may learn information regarding the item (e.g., learning information regarding the benefits of using the item, such as the health-related benefits of "Omega-3" fatty acid-based health supplements). Units of an item may describe a serving size, such as a number of Omega-3 tablets, a volumetric amount (e.g., a number of milliliters or ounces of shampoo), and the like.

According to various examples, information feedback predictor 914a may be configured identify one or more samples of items to transmit to a location associated with an electronic account for consumer 944. Further, information feedback predictor 914a may be configured to automatically generate a communication channel 926 to facilitate communication via one or more electronic messages 924a and 924b to identify whether a sample, for example, is consumed and the results therefrom. In at least one example, electronic message may be formatted and transmitted as a short message service ("SMS") message or equivalents thereof. In at least some embodiments, information feedback predictor 914a may be configured to generate data automatically at a determined point in time (or time interval) that may be optimized to solicit feedback by transmitting an electronic message requesting feedback of a consumed sample. For example, data representing a request for feedback may be transmitted as electronic message 924a at a point in time at which a particular consumer 944 may likely have predictively consumed at least one unit of consumption to render a position for generating feedback information and data.

Diagram 900 depicts information feedback predictor 914a as including a consumption calculator 916a, a feedback optimizer 918a, and a feedback zone generator 919a, each of which may include logic, whether implemented in hardware or software, or a combination thereof, similar or equivalent to that in distribution calculator 916, distribution optimizer 918, and zone generator 919, respectively. Logic in one or more of distribution calculator 916, distribution optimizer 918, and zone generator 919 may be modified or supplemented to facilitate the functionality of consumption calculator 916a, feedback optimizer 918a, and feedback zone generator 919a, according to at least some examples. In one example, consumption calculator 916a may be configured to calculate a time (e.g., a time interval) at which one or more units of consumption of a sample may be consumed. Responsive to the calculated time, information feedback predictor 914a may generate an electronic message requesting feedback at this point.

In another example, feedback optimizer 918a may be configured to optimize a determination of a time at which one or more units of consumption of a sample may be consumed. Hence, feedback optimizer 918a may optimize a calculated time of consumption as determined by consumption calculator 916a. In particular, feedback optimizer 918a may be configured to adapt a computed time interval in which consumption is likely to predict a date of consumption by user 944 based on, for example, user characteristics, such as, but not limited to, a consumer's usage rate (or "consumption rate") of an item, demographic characteristics of consumer 944, data representing patterns of historic purchasing and/or consumption behaviors, and the like. For example, consumer 944 may historically consume vitamins or supplements at a rate less than recommended (e.g., a user may consume 1 tablet a day rather than the recommended 2 tablets a day), and, thus, consumer 944 may consume an item at a different rate. Hence, feedback optimizer 918a may be configured to adapt optimally data representing consumption rates (and dates) to conform to consumption (e.g., usage) patterns of a particular user 944. Responsive to data representing characteristics of a user and/or item, information feedback predictor 914a may generate an electronic message requesting feedback at this point.

In yet another example, feedback zone generator 919a may be configured to adjust an adapted consumption date or range of dates, responsive to data generated at a user computing device, such as computing device 952b. For example, a user computing system 942 and/or associated electronic account for consumer 944 may include data indicating whether a unit of consumption may have been consumed or may be pending (e.g., a user 944 may yet to sample a portion of an item during an interval of time). Thus, an input may be received as data signals representing user input into interface 956b to initiate, for example, an adjusted interval of time in which to solicit feedback. Consider that user 944 may have returned from a two (2) week vacation and received a package containing a sample. The two week delay may be accommodated or addressed by enabling mobile computing device 952b (and/or adaptive distribution platform 910) and associated software applications to adjust the period in which to provide feedback.

To illustrate operation of information feedback predictor 914a, consider an example in which at least one sample 927a is included in a shipment of a purchased item transmitted via, for example, U.S. Postal Service or any other carrier. Information feedback predictor 914a may be configured to predict a date of consumption of at least a part of a replica or sample 927a. Note that sample 927a can be shipped or obtained independently from a purchased item. According to various examples, a predicted date of consumption may be based on one or more user characteristics and/or one or more item characteristics, for example. Examples of user characteristics include data representing attributes specifying contextual-related information associated with user 944, such as, but not limited to, user-related characteristics, such as demographic information, purchasing-related data (e.g., purchase patterns), and the like. In some cases, usage-related data may include attributes describing items historically purchased by a user, as well as an electronic account identifier, a payment instrument identifier (e.g., a credit card number), a location (e.g., an address), and other user-related information. User characteristics may also be mapped or otherwise associated with one or more item characteristics. For example, a usage rate of an item may be associated with a particular user (e.g., consumer 944 consumes or uses a product, such as shampoo, at a particular rate of consumption or depletion). Also, user characteristics may also include aggregated user characteristics that represent user-related information of a subpopulation from which predictions regarding, for example, selection of sample 927a or a consumption date may be determined. Examples of item characteristics include, but are not limited to, one or more other item characteristics 102 of FIG. 1.

Referring back to FIG. 9, information feedback predictor 914a may be configured to receive data representing a time of disposition or shipment of sample 927a, which may be used as a reference with which to predict consumption, and, in turn, predict a time to generate an electronic message 924a to solicit feedback. In at least one example, data representing a time of disposition or shipment of sample 927a may be generated by one or more of merchant computing systems 930a, 930c, and 930n. For example, data may be generated at any of merchant computing systems 930a, 930c, and 930n, or at adaptive distribution platform 910 or any other computing device, whereby the data may be configured to cause shipment of a replica 927a or sample to a location associated with an electronic account. As such, printed material or information regarding the samples may be viewed as superfluous, and need not be included in a shipment (e.g., excluded from a container or box including a sample), according to at least some implementations.

Information feedback predictor 914a may be configured to generate a subset of data 924a representing an electronic message (or a portion thereof) that may be transmitted to mobile computing device 952b to cause or otherwise initiate, for example, execution of instructions to generate feedback regarding sample 927a. As shown, subset of data 924a may cause user interface 956b to generate a message 958b with user inputs 959 and 961, among others, to determine a status of sample 927a (e.g., whether a sample has been received and consumed, which may be a basis from which to render feedback). In the example shown, user interface 956b displays the following: "How do you like SAMPLES x, y, z, . . . ? Reply X to order product for $X.XX, or Reply Y to order product Y for $Y.YY, or Reply ALL to order all." Also, user interface 956b may also display the following: "If additional time is needed to provide feedback, please respond with "#" (i.e., a number) of days at which to check back." Subset of data 924a may also include data representing a destination account identifier ("324178") 954b, to which a feedback response may be transmitted as electronic message 924b. According to some examples, user 944 may initiate generation of electronic message 924b, which includes feedback, via destination account identifier ("324178") 954b (or by any mode of communication) to indicate a sample has been consumed and feedback (e.g., including a purchase) may be available.

According to some examples, consumer 944 may cause generation of an input signal via user input 959 to order item "X" (e.g., based on sample 927a), order item "Y" (e.g., based on sample 927b), order other items (not shown), or order "All." Adaptive distributive platform 910 and/or merchant computing systems 930a, 930b, and 930n may assign product identifiers (e.g., SKUs) to a sample for treatment by platform 910 as any item, according to a specific implementation. Data representing user input 959 may be transmitted via electronic message 924b. Thus, a response may be interpreted positively, according to at least some embodiments, when a response confirms an interest in acquiring or purchasing an item (e.g., in accordance with a subscription or other distribution and online sales arrangements as described herein). According to some examples, a lack of response to electronic message 924a may be viewed as negative or a lack of interest related to samples 927a and 927b.

In at least one example, user 944 may have yet to consume either sample 927a or 927b, and may further request additional time (e.g., additional number of days) via user input 961 to provide feedback. Data representing a delayed request may be transmitted as electronic message 924b. Accordingly, information feedback predictor 914a may include logic configured to predict an adapted time or timing to provide feedback to enable consumer 944 to sufficiently enjoy or experience a sample 927a or 927b to provide meaningful feedback. Thus, an input 961 ("#") may be received as data signals representing user input into interface 956b to initiate, for example, an adjusted interval of time in which to solicit feedback in situations, for example, when user 944 has yet to open a package containing a sample. The delay may be addressed by enabling mobile computing device 952b (and/or adaptive distribution platform 910) and associated software applications to adjust the period in which to provide feedback. User 944 may select a particular units of time (e.g., days) with which to postpone providing feedback so as to consume a sample, such as sample 927a.

According to some examples, information feedback predictor 914a may be configured to analyze user characteristics associated with, for example, user 944 to match or align types and attributes of samples that user 944 may be likely to consume and provide feedback. For example, consider that information feedback predictor 914a may identify user characteristics that indicate user 944 likely is (1) a young parent (e.g., based on historic purchases of baby formula, diapers, baby powder, etc.), is (2) likely a pet owner (e.g., based on past purchases of dog food, puppy treats, rawhide bones, etc.), and (3) may be a vegetarian (e.g., based on previously-stored grocery purchases that exclude meat, meat-related items, or the like). Based on such exemplary user characteristics, information feedback predictor 914a may be configured to select a replica of an item as a sample. For example, information feedback predictor 914a may select a sample 927a as a sample of "diaper cream," a sample of a "bacon-flavored dog treat," or a sample of spices, herbs, or vegetables, any of which may be selected to enhance accuracies in predicting an invoked response (e.g., feedback) via electronic message 924b. By contrast, and further to the above example, information feedback predictor 914a may be configured to deemphasize "cat-related" items, "geriatric-related" items, or "meat-related" items as sample 927a for user 944.

In at least some examples, information feedback predictor 914a may be configured to determine one or more other samples 927b based on, for example, sample 927a. For instance, consider sample 927a may be any of the followings items: "catsup," "shampoo," or a "first product" of Brand "X." Information feedback predictor 914a may be configured to determine sample 927b as a complementary item that, for example, may have a relatively high correlation of synchronous usage and consumption, and, thereby, a likelihood of sampling by user 944. Thus, sample 927b may be one of "mustard" and "conditioner," which are respective compliments of "catsup" and shampoo." A "second product" of Brand "X" may be selected as sample 927b based on, for example, determining a likelihood or degree of similarity between items or predicting brand loyalty based on past purchases of Brand X products, whereby user 944 may be likely to sample the first product of Brand X and provide feedback.

In at least one example, information feedback predictor 914a may be configured to analyze data representing user-related characteristics associated with the electronic account (e.g., for user 944) against other user-related characteristics associated with other electronic accounts (e.g., for users other than user 944). In this example, information feedback predictor 914a may be configured to identify attributes of users and items common with user 944 to identify a universe of items having a relatively high likelihood of being consumed or purchased by a group of users including user 944. For example, a group of users residing in a northwest portion of the United States (e.g., the state of Maine, which experiences cold, wintery seasons) may have previously purchased "snow boots" having sizes associated with "elementary-aged" children. Thus, a common other item, such as "mittens," may be identified as being previously purchased by the other users for weather activities except user 944 (at least in this example). Therefore, information feedback predictor 914a may be configured to determine "mittens" as sample 927b (e.g., either at a discounted cost or without charge). "Mittens" may be viewed as a target item for sampling by user 944 based on data associated with the other electronic accounts.

Information feedback predictor 914a may be configured to implement any analytical determination to correlate and classify users and/or items for predicting samples, according to various examples. According to some embodiments, information feedback predictor 914a may be configured to classify and/or quantify various user and item attributes by, for example, applying machine learning or deep learning techniques, or the like. In one example, information feedback predictor 914a may be configured to segregate, separate, or distinguish a number of data points representing similar (or statistically similar) attributes, thereby forming one or more clusters or groups of data (not shown). The clustered data may be grouped or clustered about a particular attribute of the data, such as a source of data (e.g., a channel of data), a type of language, a degree of similarity with synonyms or other words, etc., or any other attribute, characteristic, parameter or the like. While any number of techniques may be implemented, information feedback predictor 914a may apply "k-means clustering," or any other known clustering data identification techniques. In some examples, information feedback predictor 914a may be configured to detect patterns or classifications among datasets and other data through the use of Bayesian networks, clustering analysis, as well as other known machine learning techniques or deep-learning techniques (e.g., including any known artificial intelligence techniques, or any of k-NN algorithms, regression, Bayesian inferences and the like, including classification algorithms, such as Naïve Bayes classifiers, or any other statistical or empirical technique).

In view of the foregoing, the structures and/or functionalities depicted in FIG. 9 may illustrate an example of adaptive scheduling for electronic messages to automatically facilitate feedback at optimal intervals of time during which a user may likely have consumed a sample to provide an assessment on whether to, for example, order or subscribe for delivery of an item based on the sample. Should a user desire not to provide feedback or generates negative feedback (e.g., does not wish to purchase an item), data representing the sample may be stored for improving accuracy in predicting which samples a user may likely consume and purchase in the future. According to some examples, optimal intervals of time in which to transmit a request for feedback may be based on predicted dates of consumption with which to enhance accuracy of soliciting feedback relatively close to consumption so a user may provide precise feedback while being "most receptive" to purchasing while the experience from the sample is "fresh" in one's mind. According to at least one implementation, an electronic message or application may include executable instructions to enable a user to adjust a date at which to provide feedback, which, in turn, enables a user to accommodate or plan consumption of a sample for purposes of rendering accurate feedback timely.

By enhancing accuracy of relevant information pertaining to a sample, information feedback predictor 914a may generate additional analytic information and insights into whether a particular sample is, for example, enhancing a "sample-to-purchase" conversion metric that describes, for example, a ratio of a number of items purchased against a number of samples sent. With improvements in said metric, fewer resources may be consumed or expended unnecessarily without a return on investment. According to various examples, adaptive distributive platform 910 and/or information feedback predictor 914a, or any other element, may be configured to store data memorializing electronic transactions and messages associated with predicting consumption of samples and feedback about the samples. Therefore, stored electronic transaction and electronic message data may be used to further refine a predicted date of consumption, as well as refinements in selecting a sample and modifying a feedback response interval of time, according to various examples. Logic, including hardware or software, or a combination thereof, may facilitate one or more structures or functions of adaptive distributive platform 910 and/or information feedback predictor 914a, or any other element to effectuate enhanced prediction of consumption of a sample for generating adaptively-scheduled electronic messages.

Figure 10:
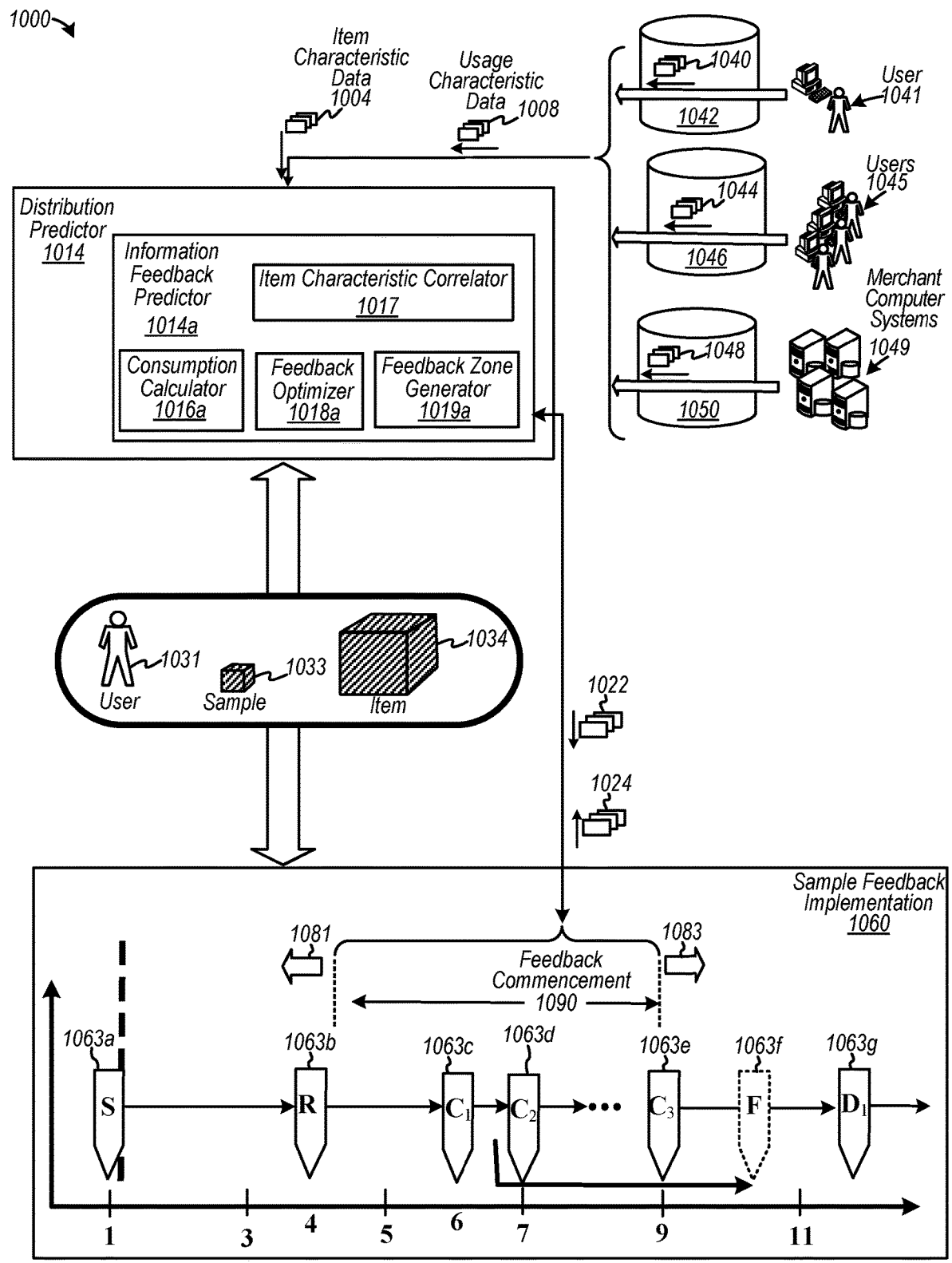
FIG. 10 is a diagram depicting an example of operation of an information feedback predictor, according to some embodiments.

FIG. 10 is a diagram depicting an example of operation of an information feedback predictor, according to some embodiments. As shown, diagram 1000 includes a distribution predictor 1014 implementing an information feedback predictor 1014a that may be configured to predict a point in time (or a range of time) at which a sample of an item (e.g., any good or service) may be exhausted or depleted, or a point in time (or a range of time) at which a sample is consumed prior to depletion. Distribution predictor 1014 may include an information feedback predictor 1014a, which, in turn, may include a consumption calculator 1016a, a feedback optimizer 1018a, and a feedback zone generator 1019a. Optionally, information feedback predictor 1014a may be configured to include an item characteristic correlator 1017, which may be structurally and/or functionally similar to that of FIG. 7, whereby item characteristic correlator 1017 may be configured to identify one or more item characteristics with which to correlate to determine or derive data that may be further used to derive or predict consumption events (e.g., units of consumption), times of distribution or shipping, times of delivery, a feedback commencement time (e.g., a point in time or a range of time in which feedback may commence), and the like, similar to described in FIG. 7. According to some examples, elements depicted in diagram 1000 of FIG. 10 may include structures and/or functions as similarly-named or similarly-numbered elements depicted in other drawings.

Diagram 1000 also depicts distribution predictor 1014 and information feedback predictor 1014a being configured receive item characteristic data 1004 and user characteristic data 1008 from, for example, repositories 1042, 1046, and

1050. In some cases, user-related and/or usage-related data 1008 may include data representing attributes 1040 that, for example, describe demographic characteristics (e.g., location, age, gender, familial status, etc.) for items historically purchased by a user 341 (e.g., data representing patterns of a parent, patterns of a pet owner, patterns of a particular sports fan, etc.). Data representing attributes 1044 may describe items historically purchased by other users 1045 (e.g., patterns of a group of grandparents, patterns of a group of pet owners, patterns of a group of sports fan for a particular team, etc.). Attributes 1044 may represent an aggregation of a subpopulation or a population of which a user belongs. Also, usage-related data may include sale-related and shipment-related attributes 1048 provided by merchant computer systems 1049. Data representing attributes 1040, 1044, and 1048 may be stored in repositories 1042, 1046, and 1050, according to some examples. Examples of some item characteristics in data 1004 may include a product or product type, a service or service type, SKU data, UPC data, etc. for the same or similar items, or complementary or different items (e.g., different items that may have correlatable samples of products that can be predicted to have similar predicted rates of consumption and/or depletion, and may be have a likelihood of a feedback response by a recipient).

Information feedback predictor 1014a may be configured to generated data 1022 to predict, among other things, a date of consumption with which to solicit feedback regarding a replica of an item. A date of consumption may be predicted to occur (e.g., statistically) in a feedback commencement interval or time 1090 during which user 1031 may be predicted to have received a sample 1033 of item 1034. Thus, predicted points in time 1063c, 1063d, and 1063e of consumption (e.g., a predicted time of consumption of a sample) may be a function of a user 1031 (e.g., a user's usage rates and consumption patterns) and/or an item 1034 and its characteristics (e.g., based on usage rates and consumption patterns of a group of users over one or more merchant computer systems). Sample 1033 may be representative of item 1034 and, hence, may include its characteristics. Note that feedback commencement interval 1090 may represent a single point in time, or any number of points in time, according to some examples.

Information feedback predictor 1014a may be configured to receive data from a merchant computing system 1049 that a sample 1033 has shipped to a location at a time ("S") 1063a. Further, information feedback predictor 1014a may be configured to receive data representing that sample 1033 has been delivered to a location at time ("R") 1063b. As such, information feedback predictor 1014a may identify time 1063b as a beginning of feedback commencement time 1090. Consumption calculator 1016a may be configured to calculate a time ("$C_1$") 1063c, time ("$C_2$") 1063d, or time ("$C_3$") 1063e (or a time interval) at which one or more units of consumption of a sample may be consumed. According to some examples, times 1063c, 1063d, and 1063e, as well as interval 1090, may be based on usage rates or rates of depletion.

Feedback optimizer 1018a may be configured to adapt a computed time interval 1090 in which consumption is likely to predict a date of consumption by user 1031 based on, for example, user characteristics. Hence, feedback optimizer 1018a may be configured to extend or reduce a size of interval 1090 by adjusting one or more points by modifying beginning or an ending (e.g., shifting the interval in directions 1081 or 1083). Feedback zone generator 1019a may be configured to adjust an adapted consumption date or range of dates, responsive to data 1024 generated at a user computing device. For example, a user may request to extend a feedback response time to point of time ("F") 1063f. Thus, feedback zone generator 1019a may be configured to receive adjustment data responsive to data 1022 to generate feedback, the adjustment data configured to modify a predicted date of consumption to time 1063f (or another time). As such, feedback zone generator 1019a can be configured to cause generation of another subset of data to ask or solicit feedback at later date by generating ancillary data representative of another request for a feedback response from user 1031. User 1031 may generate feedback data 1024 including, for example, a request to purchase or subscribe to item 1034 at time ("D1") 1063f Feedback other than a purchase, whether positive or negative, may also be included in data 1024 (e.g., a request for an additional sample). At time 1063f, data representing a feedback response to accept a unit of the item in an online purchase may be received, whereby scheduling of transmission of a unit of the item to the location (associated with electronic account) may be generated to initiate successive shipments of the item to user 1031.

Information feedback predictor 1014a may be configured to transmit a request of feedback via electronic message data 1022 at any time in feedback commencement time 1090. For example, information feedback predictor 1014a may transmit electronic message data 1022 to user 1031 at time ("$C_1$") 1063c, time ("$C_2$") 1063d, or time ("$C_3$") 1063e, any of which may be selected based on user characteristics and/or item characteristics. For example, user 1031 may be likely to render feedback after a first unit of consumption at time 1063c for "shampoo," whereas user 1031 may likely require additional time to render feedback for a sample of a "health supplement," which may take several days to experience (e.g., two tablets per day for a two weeks). Thus, an item characteristic of "product classification" (e.g., classification of "shampoo" in contrast to "health supplements") may be used to determine or predict a point in time to transmit a request for feedback during time interval 1090. In some cases, user characteristics of user 1031 may also be used to select one or time ("$C_1$") 1063c, time ("$C_2$") 1063d, or time ("$C_3$") 1063e. If user 1031 is determined or predicted to belong to a household of two to four persons (e.g., a family), then additional time may be provided to ensure multiple persons may experience sample 1033. Thus, a subsequent time 1063e may be selected rather than a first time 1063c. Other user characteristics and item characteristics may be used to select an optimal time at which to solicit feedback, according to various examples.

Figure 11:
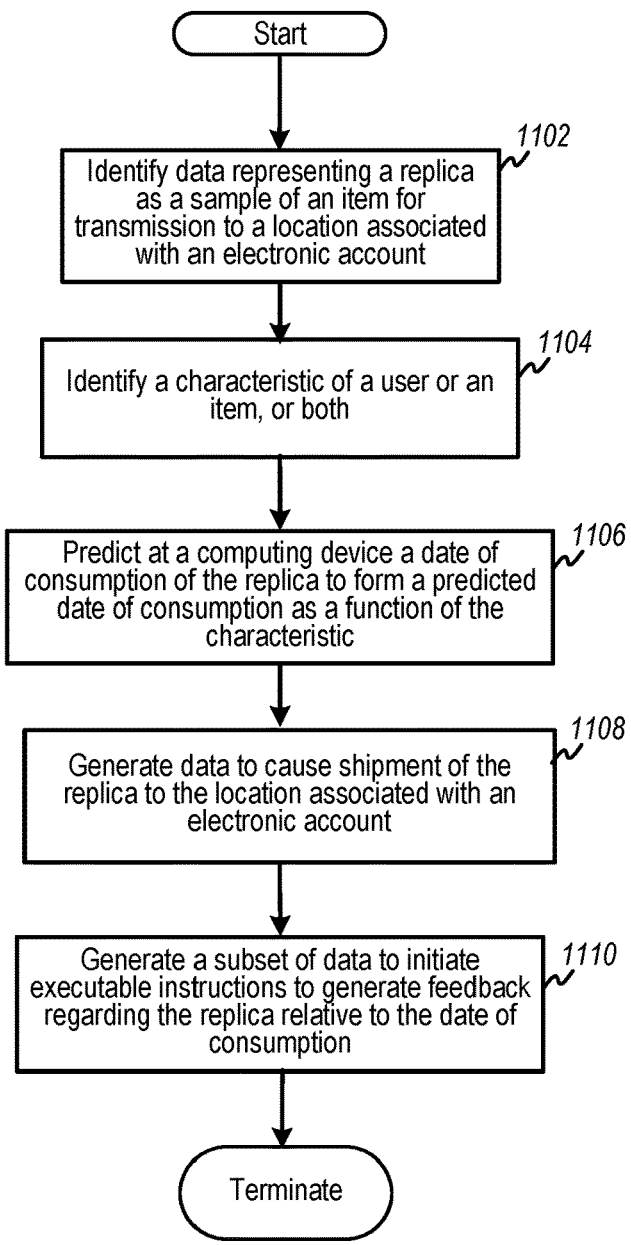
FIG. 11 is a diagram depicting an example of a flow to facilitate predictive consumption of a sample for an item that implements an automatically adaptive schedule, according to some embodiments.

FIG. 11 is a diagram depicting an example of a flow to facilitate predictive consumption of a sample for an item that implements an automatically adaptive schedule, according to some embodiments. At 1102 of flow 1100, data representing a replica of an item, as a sample, may be identified for transmission to a location associated with an electronic account. For example, a selected sample may be included in a container being shipped with purchased goods, or may be shipped separately, to a residential address associated with an electronic account (e.g., an online account with which to purchase items online from a merchant).

At 1104, a characteristic of a user or an item, or both, may be identified. For example, an item characteristic may be identified, such as a product classification (e.g., generic product name, such as shampoo), a product type (e.g., a brand name), etc., any of which may be used to describe a sample. Further, user characteristics (e.g., past usage or consumption patterns, including past purchasing patterns), and the like, may be used to predict a date of consumption for providing a timely acquisition of a response from a recipient of a sample.

At 1106, a date of consumption of a replica may be predicted to form a predicted date of consumption as a function of, for example, one or more characteristics (e.g., one or more user characteristics and/or one or more item characteristics). According to some examples, a usage rate of an item may be calculated at 1104, whereby a sample may be a replica of the item (e.g., a consumable item). In some cases, a usage rate may be determined as a function of a depletion rate of the consumable item. A time for a unit of consumption may be computed (e.g., predicted) based on a calculated usage rate. Also, a unit of consumption may be selected as a feedback commencement time during which to solicit feedback. In one example, an interval of time for a predicted unit of consumption may be determined similarly to a zone of time as described herein.

In some examples, a subset of the data (e.g., included in an electronic message) may be transmitted to generate feedback from a user computing device. Data representing a command to delay a feedback commencement time may be received via, for instance, a merchant computing system. Further, transmission of another subset of the data (e.g., another electronic message including feedback) may be postponed by an amount of time. For example, a recipient may request a certain number of additional days to provide feedback. Or, a second electronic message to delay feedback may be transmitted based on predicted or empirical data. Further, a predicted date of consumption may be adapted to form an adapted predicted date of consumption. For example, data representing a feedback commencement time (e.g., a point in time or an interval in which feedback may be solicited) may be modified based on an adapted predicted distribution date to form a modified feedback commencement time.

At 1108, data to cause shipment of a replica may be generated to initiate shipment of the replica or sample to a location associated with the electronic account. For example, an application or software module may include executable instructions to modify or control a shipping application (e.g., an enterprise-level application configured to coordinate shipping of online purchases) to ship a purchased item in a container. In some cases, the selection of the sample may be based on the above-described characteristic. At 1110, a subset of data disposed in an electronic message may be generated to cause initiation of executable instructions to perform a process in which feedback may be generated relative to a date of consumption.

Figure 12:
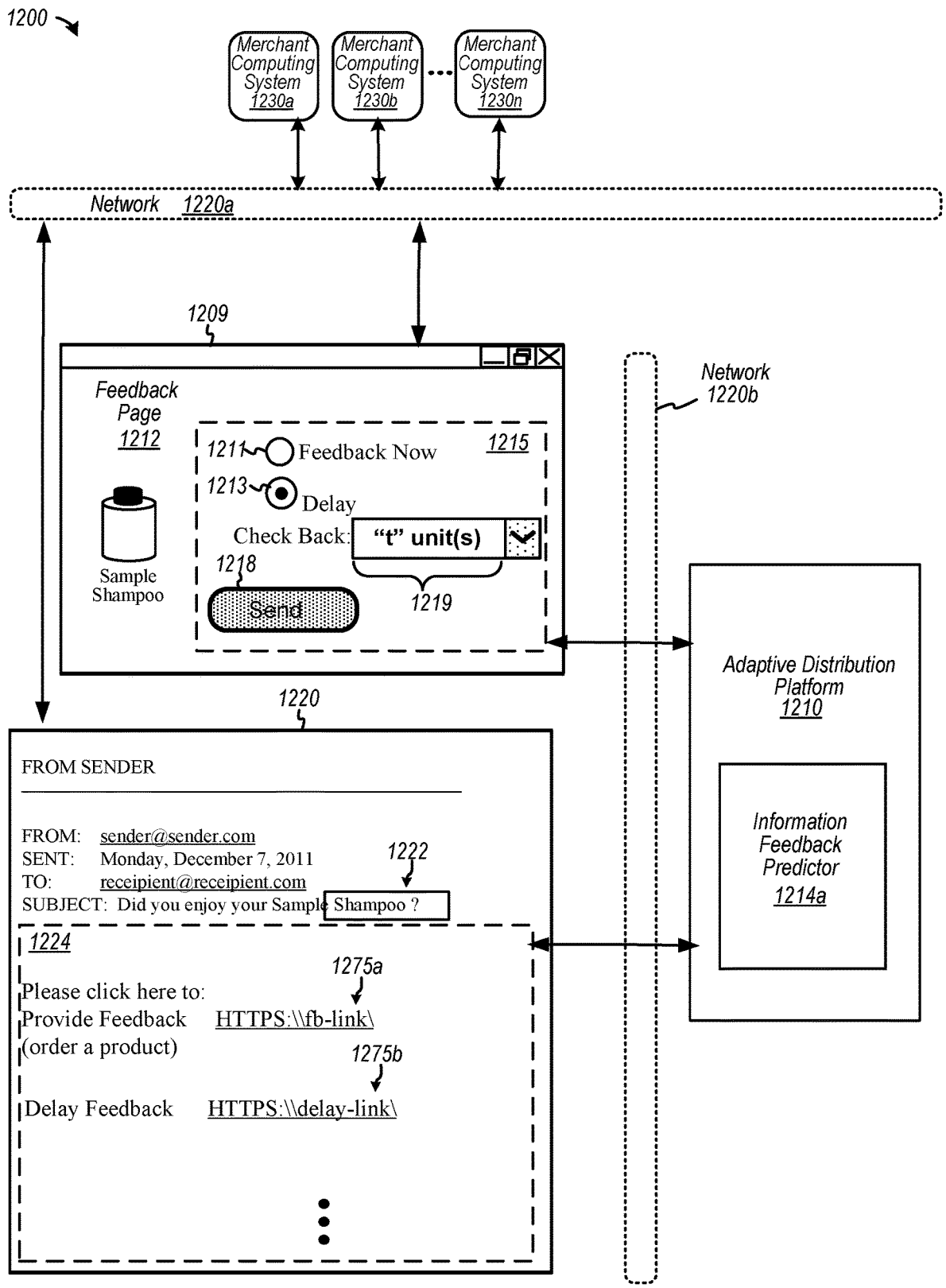
FIG. 12 is a diagram depicting examples of integrated interfaces to facilitate predictions of sample consumption, according to some embodiments.

FIG. 12 is a diagram depicting examples of integrated interfaces to facilitate predictions of sample consumption, according to some embodiments. Diagram 1200 depicts merchant computing systems 1230*a*, 1230*b*, and 1230*n*, each of which may be configured to host or generate (via network 1220*a*) user interfaces 1209 and 1220 that are integrated with interface portions 1215 and 1224, respectively. Interface portions 1215 and 1224 may generated by adaptive distribution platform 1210, which includes information feedback predictor 1214*a*. Thus, information feedback predictor 1214*a* may be configured to inject interface portions 1215 and 1224 into user interfaces 1209 and 1220, respectively, via network 1220*b* to form hybrid interfaces. Thus, web pate 1209 and email 1220 are hybrid electronic pages or messages and may include graphical elements having a "look and feel" originating from a source of origin (e.g., a merchant computing system as host). According to some examples, elements depicted in diagram 1200 of FIG. 12 may include structures and/or functions as similarly-named or similarly-numbered elements depicted in other drawings.

Various structures and/or methods described herein may be applied to web pages 1209, emails 1220, among other forms of communicating requests for acquiring feedback for a sample. Web page 1209 includes a feedback page as a user interface 1212 to provide feedback of a sample (e.g., a shampoo sample) by selecting in interface portion 1215 either immediate feedback via input 1211 (e.g., including an order) or delayed feedback via input 1213. Input 1219 (a pull-down menu to select an amount of delay) may be used to delay a feedback response by "t" units (e.g., any time units, such as units of days). Data received into interface 1212 via inputs 1211, 1213, and 1219 may be stored until input ("send") 1218 is activated, after which the data may be transmitted contemporaneously (or substantially contemporaneously) to information feedback predictor 1214*a* and adaptive distribution platform 1210.

An electronic message to request feedback of the sample may be communicated as an email 1220, which is shown to include an item characteristic 1222 in a subject line may be display so a user readily may discern the action required for such a communication. In email body 1224, various delivery options may be embedded as hypertext links to enable a user to provide feedback for a sample of a "Product P" "now," by selecting link 1275*a*, or postponing feedback by 7 days with the selection of link 1275*b*. According to some embodiments, the presentation of a link for a "7 day" delay, as a first link, may be due to its relatively high degree of certainty that a user may experience the sample within another 7 days (based on probabilistic determinations). Thus, adaptive distribution platform 1210 including information feedback predictor 1214*a* may adapt presentation of user inputs to accommodate user purchasing and scheduling patterns and preferences to enhance, among other things, users' experiences when sampling a good or service.

In view of the foregoing, webpages 1209 and emails 1220 may be formed as integrated electronic messages that are a hybrid of different formatted data originating from different sources, whereby a user may perceive webpages 1210 and emails 1220 as originating from a single source (e.g., a merchant).

Figure 13:
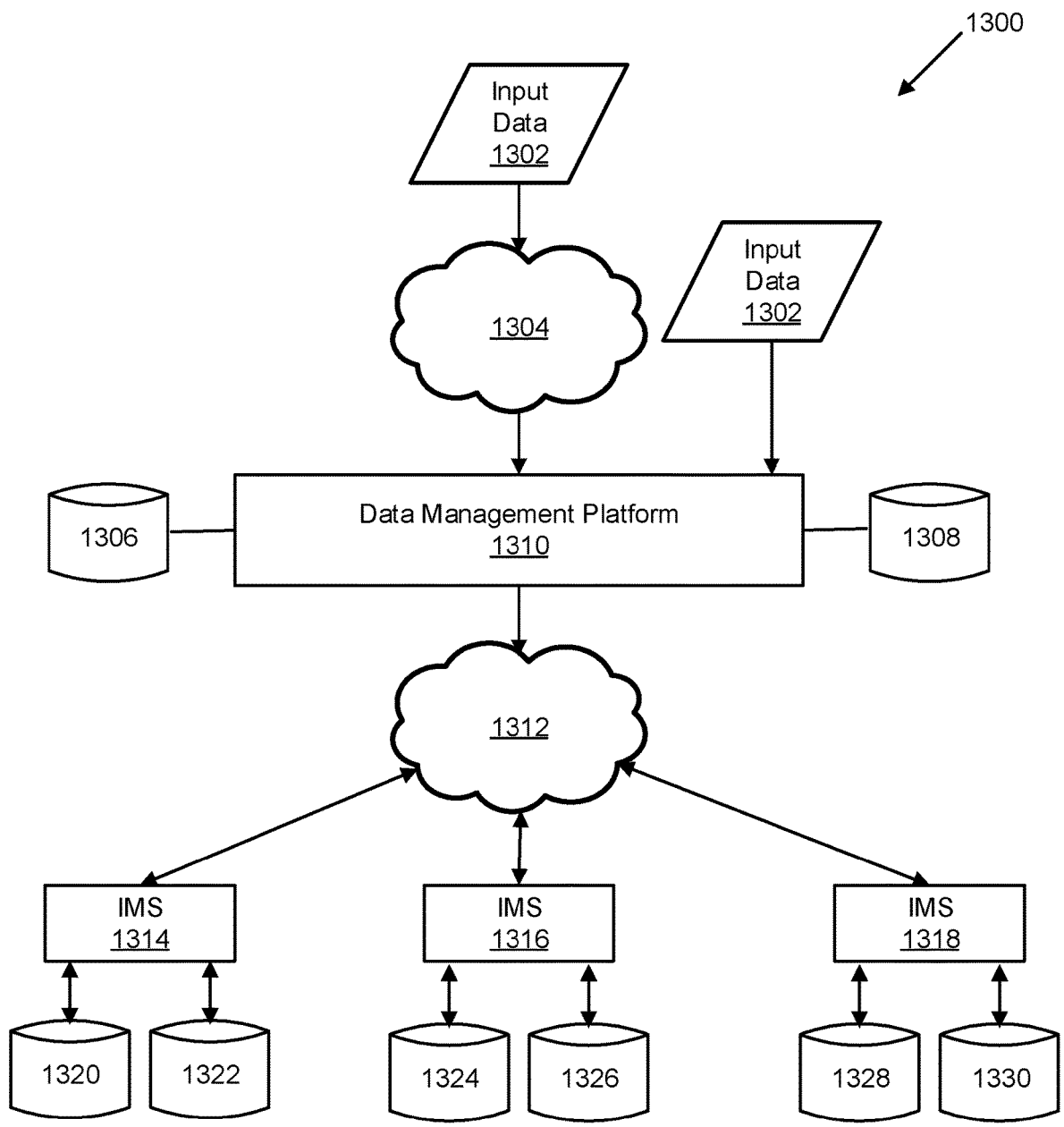
FIG. 13 is an exemplary system configured to dynamically process electronic messaging data to automatically generate location predictive retrieval using a networked, multi-stack computing environment.

FIG. 13 is an exemplary system configured to dynamically process electronic messaging data to automatically generate location predictive retrieval using a networked, multi-stack computing environment. Here, system 1300 includes input data 1302, network 1304, account data 1306, order/subscription data 1308, data management platform (hereafter "platform") 1310, network 1312, inventory management systems (hereafter IMS) 1314-1318, and IMS data 1320-1322. The quantity and configuration of the above-listed elements may be varied and are not limited to the descriptions provided herein, which are examples of implementations that are provided for purposes of illustration. As used herein and throughout the accompanying descriptions to the drawings, "system" may refer to or include the description of a computer network system or topology associated with a map, network, layout, environment, or the like of computing resources that are used to implement a feature, function, process, element, component, part, or multiple instances thereof, without any particular limitation as to the type, configuration, programming or formatting language, service, class, resource, specification, protocol, or other attributes thereof. As used herein and throughout the accompanying descriptions to the drawings, "application" may also be used interchangeably or synonymously with, or refer to a computer program, software, firmware, hardware, circuitry, or any combination thereof that may be configured to implement a logical set of instructions that, when executed, performs a function or set of functions within a computing system or machine, regardless of whether physical, logical, or virtual and without restriction or limitation to any particular implementation, design, configuration, instance, or state. Any type of programming or formatting language, framework, or data schema including, but not limited to, binary, machine assembly, object oriented, C, Objective C, C++, C#, Java®, JavaScript®, Python®, Swift™, Ruby, Ruby on Rails®, Rust™, Elixir™, HTML, XML, R, SQL®, MySQL®, DynamoDB™, R, Scala Also as used below, "platform" may refer to any type of computer hardware (hereafter "hardware") and/or software environment using one or more local, remote, distributed, networked, or computing cloud (hereafter "cloud")-based computing resources (e.g., computers, clients, servers, tablets, notebooks, smart phones, cell phones, mobile computing platforms or tablets, and the like) to execute an application, such as those described above, without restriction or limitation to any particular implementation, design, configuration, instance, or state. Distributed resources such as cloud networks (also referred to interchangeably as "computing clouds," "storage clouds," "cloud networks," or, simply, "clouds," without restriction or limitation to any particular implementation, design, configuration, instance, or state) may be used for processing and/or storage computing resources, without restriction or limitation to any particular implementation, design, configuration, instance, or state of a device or machine, physical, virtual, logical, or otherwise.

As shown, input data 1302 may be data or signals that are transmitted to system 1300 from, for example, a client device (e.g., mobile or smart phone, tablet computer, laptop, desktop, "smart" appliance, sensor, or any other type of apparatus or process configured to transmit analog or digital data, regardless of whether initiated by a user or other machine-related process, software, firmware, or hardware) or another computing element, such as those shown and described below. As shown, input data 1302 may be transmitted directly or indirectly over a local or distributed data network (e.g., local area network (LAN), wide area network (WAN), computing cloud (i.e., "cloud"), or the like). Alternatively, input data 1302 may be transmitted directly to subscription management platform 1310. Here, network 1304 may be used to transmit input data 1302 to data management platform 1310, which is in data communication with various databases (e.g., account data 1306, order/subscription data 1308, or others not shown or described). Databases 1306-1308 may be implemented using various programming languages and formats, including, but not limited to SQL, MySQL, R, DynamoDB™ from Amazon® Web Services, Inc. of Seattle, Wash., FMP, Oracle®, relational, structured, or unstructured databases and database management systems, without limitation. Account data 1306 may, in some examples, be configured to store data related to a given user's subscription(s) including items (e.g., those items being purchased using a subscription that are sent on a replenishing schedule, which may be regular or irregular in response to either a user-specified rule for a given periodicity or which may be fulfilled when a given item requires replenishment and an order is initiated by either a user or, for example, a sensor that detects when a given item has been depleted to an extent, which may be specified by a user, manufacturer, retailer, distributor, or wholesaler of the item to be replenished), payment data (e.g., credit card, bank, automated clearing house (ACH) or wire transfer information, or the like), user data (e.g., location to which subscribed items are to be shipped or delivered, account-related computing devices such as mobile phones, laptops, or computers that can be identified by unique identifiers (i.e., IDs) such as cellular phone numbers, phone numbers, MAC IDs, IP ("Internet Protocol") addresses, physical street addresses, user-specified or rule-generated preferences such as types or brands of items preferred for subscription or limitations or restrictions placed on a given user's account (e.g., a tiered account structure that may permit a greater population of items for subscription based on a recurring fee or a smaller pool of items that may be permitted for a lower or "no-fee" arrangement, or the like. Other data, characteristics, criteria, rules, preferences, or the like such as those described herein, but without limitation, may be specified in account data 1306 without restriction and is not limited to the examples shown and described.

In some examples, data management platform 1310 (i.e., platform 1310) may be an application or multi-stack application that is configured to transmit, receive, and process data at different levels of a programming stack. For example, data transmitted between platform 1310 and databases 1306-1308 may be transmitted in, for example, a programming language such as SQL, MySQL, R, or others that are configured for data operations between databases, data repositories, data warehouses, or other types of data storage facilities. Additionally, platform 1310 may also be coded using various types of object-oriented programming and formatting languages such as Java®, JavaScript®, Python®, HTML, XML, and others, to provide user interfaces and displays that, at a presentation level of an application stack architecture, enable a user to interact with, input, and perceive data and information. Still further, other stack levels such as the transport level of a stack architecture may be used to transfer and communicate data between various elements of the described techniques, such as those shown below in connection with FIG. 14, in order to facilitate and improve interoperability between the elements shown and described as well as those shown here in connection with system 1300.

Referring back to FIG. 13, platform 1312 may also be implemented to communicate over network 1312. As shown, networks 1304 and 1312 may be data networks of various types and numbers, without restriction, that are configured to transfer data between endpoints such as client devices (not shown), platform 1310, databases 1306-1308, or other systems such as inventory management systems (hereafter "IMS") 1314-1318. Here, IMS 1314-1318 may be inventory management systems for various manufacturers, retailers, distributors, wholesalers, importers, or other types of sellers or resellers (including the manufacturer itself) of items that data management platform 1310 may exchange data in order to fulfill an order for an item, regardless of whether the item was ordered pursuant to a subscription or an ad hoc, one-time order. While "items" may refer to items ordered without a subscription, "subscribed item" may refer to items that are purchased subsequent to a subscription for an account (i.e., a user, using her account, has created a subscription to purchase an item on a periodic, scheduled, frequent, infrequent, non-periodic, unscheduled, random, or ad hoc basis). In some examples, data management platform 1310 may be coupled, directly or indirectly, to a seller, manufacturer, warehouse/distribution system (e.g., IMS 1314-1318) using, for example, an application programming interface (i.e., API) that may be in data communication with one or more data networks in order to transfer data related to an order received for an item, regardless of whether purchased as an item of a subscription or a one-time, ad hoc, or random purchase. In some examples, IMS 1314-1318 may be used to track items held in inventory in a warehouse, storage facility, store location (e.g., "location"), or any other type of location where items may be assembled or otherwise collected and prepared for fulfillment. Fulfillment may occur when an item is shipped and/or delivered to a location specified in account data 1306 or order/subscription data 1308, picked up or retrieved from a location by a user or by platform 1310. With regard to the latter, techniques are described herein for platform 1310, without user input or the need for additional user entered data, may be configured to automatically detect and prepare for fulfillment, by either shipment or local pickup at a location in convenient proximity to a user, an item. Convenient proximity for a user may be input by a user, for example, as locations within a 5 mile radius (for example) or other specified distance from his home. Convenient proximity may also be implemented as a relative geographic distance from a user, her home, or her client devices such as those described above. Convenient proximity may also be used interchangeably with the term "proximate" to express the descriptions provided herein. Convenient proximity may also be expressed as a proximate location based on a data relationship between account data 1306 and/or order/subscription data 1308. For example, convenient proximity to a location where a user can retrieve an item can also be those locations for a given seller of an item that share the same zip code, city, state, nation, or street name as that of the user. In still other examples, convenient proximity may be determined using geolocation data (e.g., data that may be retrieved from any type of data network that is configured to generate localized coordinates for a given client device, such as a cellular communication network, global positioning system (hereafter "GPS"), IMMARSAT, or other ground or satellite-based data communication or positioning system, without limitation or restriction. For example, geolocation data from a constellation of low earth orbit (LEO) GPS satellites may provide a set of coordinates (e.g., Cartesian, Mercator, or others, without limitation or restriction) from which a boundary or bounding box or other shape may be determined in which items may be indicated for retrieval by a user. As used herein, "retrieval" may refer to retrieving, picking up, getting, or otherwise obtaining an item in lieu of fulfillment occurring by shipment to a location or address specified by a user. In other words, system 1300 and the elements shown and described may be configured to detect when an item of a subscription is to be fulfilled (or within a temporal proximity to a fulfillment date for a given subscription) and automatically determine and generate one or more retrieval options, with or without any type of user-specified input or rule, to permit a user to instead pick up or retrieve the item from, for example, a nearby store that, using an IMS (e.g., IMS 1314-1318) may have the item type and quantity within its local inventory. Further, platform 1310 may be implemented and configured to automatically determine retrieval options that are convenient or proximate to a user based on determining her location or, in some examples, if a user is visiting a physical location, she may also wish to pickup the item, regardless of whether a transaction is occurring, which can lead to improved subscription and/or general purchasing activity using the techniques described herein.

As an example, when an item to be fulfilled is detected by platform 1310 to be held in inventory at a given location (e.g., as determined by IMS 1314-1318, which may be configured to poll store, inventory, or item data from one or more of databases 1320-1330, the number, type, configuration, function, and quantity of which may be varied without limitation), an automatic determination may be made to generate retrieval options that may be sent, for example, at a data or application layer of an application stack to one or more client devices indicated by a given account. When a client device receives a message (e.g., SMS, email (i.e., SMTP, POP, or others), Internet Relay Chat ("IRC"), Messenger® (such as that provided by Facebook® of Menlo Park, Calif.), iMessage® (such as that provided by Apple Corporation of Cupertino, Calif.), or others) including a retrieval option (which may be implemented as a data query), if a response is sent, platform 1310 may receive it as input data 1302 and, using constraints, rules, preferences, or other account or subscription data stored in databases 1306-1308, prepare an item for in-store pickup or local retrieval without the need for shipment or shipment preparation. In other examples, system 1300 and the elements shown and described may be implemented differently and is not limited to those shown and described herein.

Figure 14:
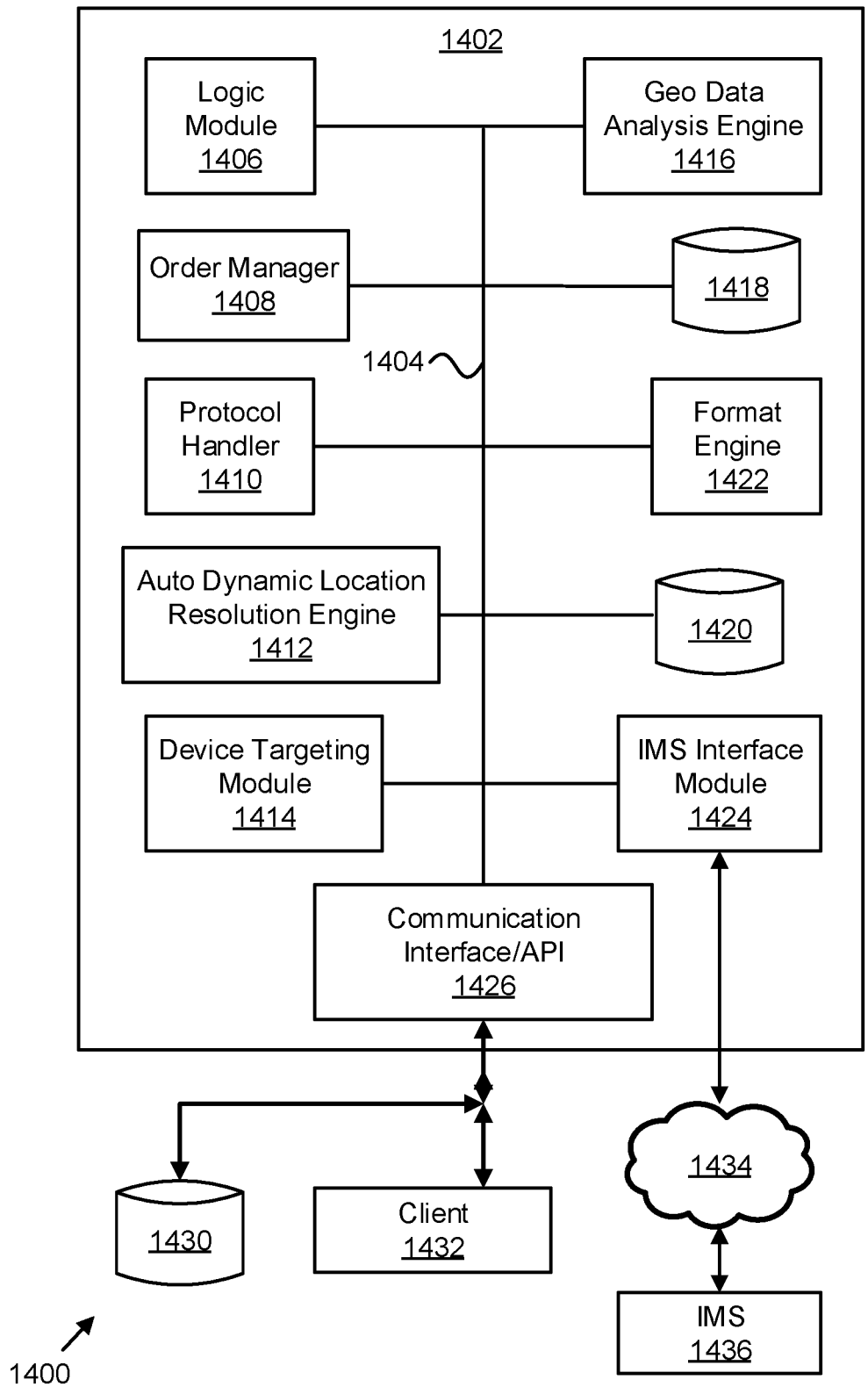
FIG. 14 is an exemplary application architecture for a data management platform configured to dynamically process electronic messaging data to automatically generate location predictive retrieval using a networked, multi-stack computing environment.

FIG. 14 is an exemplary application architecture for a data management platform configured to dynamically process electronic messaging data to automatically generate location predictive retrieval using a networked, multi-stack computing environment. Here, application architecture 1400 includes, as an example, application 1402, which includes data bus (hereafter "bus") 1404, logic module 1406, order manager 1408, protocol handler 1410, auto dynamic location resolution engine 1412, device targeting module 1414, geo data analysis engine 1416, local databases 1418-1420, format engine 1422, IMS interface module 1424, and communication interface/application programming interface ("API") 1426. One, some or all of application 1402 and elements 1404-1436 may be implemented as software, hardware, firmware, circuitry, or a combination thereof using programming or formatting languages, frameworks, and schema such as those described above, but without limitation. Application 1402, in some examples, may also be in data communication and transfer data with remote database 1430 (which may be in direct or indirect data communication with application 1402), client 1432, network 1434, and IMS 1436. The number, type, configuration, and function or application architecture 1400 and the elements shown and described may be varied without limitation or restriction. In some examples, application 1402 may be implemented as platform 1310 (FIG. 13) and additional detail is provided with regard thereto. For example, logic module 1406 may implemented using any type of computing facility, computer, processor, or other type logic or sets of logical process that may be configured to compile and execute various types of computer programs or program code, regardless of programming or formatting language. Examples of computer software, programming, or formatting languages may include Java®, JavaScript®, JSON, R, SQL, MySQL, HTML, XHTML, XML, Python, Hadoop, or others, and may be implemented on any type of operating system for a computing device, mobile or otherwise, such as Windows®, MacOS®, iOS®, Android®, Linux®, or others, without limitation or restriction.

In some examples, order manager 1408 is configured to manage orders (regardless of whether placed as a single, standalone, group, ad hoc, random, or subscription-based order) for items using account data (e.g., account data 1306 (FIG. 13)) and/or subscription data (e.g., order/subscription data 1308 (FIG. 13)), which may be stored in one or more of databases 1418-1420 or 1430. For example, order manager 1408 may be configured to automatically execute an order or subscription for an item or set of items once a user has input order data (e.g., order/subscription data 1308 (FIG. 13)) using a display interface (not shown) provided by platform 1310. Further, order manager 1408 may also be configured to transfer data with auto dynamic location resolution engine 1412 in order to automatically generate and provide retrieval options, as shown and described herein.

In some examples, auto dynamic resolution engine 1412 may be configured to determine whether retrieval options for an item or set of items may be automatically generated and offered to a user for retrieving in item in lieu of performing a default or "first option," which may be implemented by fulfillment using a shipping service. In other words, order/subscription data 1308 may indicate a default option or set of data that is used to fulfill or ship an item or set of items at periodicities or frequencies also specified in account data 1306 (FIG. 13) and/or order/subscription data 1308. In some examples, this option for shipping an item to a location (i.e., delivery destination or simply "destination") may be input by a user at the time of subscribing to a service to purchase an item or set of items at a given interval, periodicity, frequency, or level of depletion of the item or set of items. However, order manager 1408 may also receive data from auto dynamic location resolution engine 1412 that automatically generates retrieval options using account, purchase, user, and/or history data as well as geolocation data such as geographic coordinates from a ground or satellite-based location service (e.g., cellular communication network, data network, GPS constellation, MILSTAR, IMMARSAT, or the like) that can be compared to account data 1306 and/or order/subscription data 1308 to determine whether proximate retrieval options are available (e.g., picking up an item or set of items from a nearby location from which the item was recently purchased. As an example, geolocation data in the form of GPS coordinates may be provided by geolocation data analysis engine 1416 working cooperatively with device targeting module to determine a device ID from a header, payload, or footer portion of a data packet, segment, or frame coming from a device (e.g., mobile or smart phone, laptop, computer, or others (i.e., client 1432)) associated with an account identified in account data 1306 and which also has a subscription for an item in order/subscription data 1308. As an example, auto dynamic location resolution engine 1412 is configured to transform the geolocation data (e.g., GPS coordinates) from geo data analysis engine 1416 and device ID or other characteristics from device targeting module 1414 to generate a proximity of said devices to one or more locations specified by IMS 1436, which may be configured to transfer data with application 1402 over network 1434 or, alternatively, using a direct data transfer connection (not shown). Using account data and/or subscription data stored in one or more of databases 1418-1420 and/or 1430, auto dynamic location resolution engine is configured to determine, by comparing analyzed geolocation data from geo data analysis engine 1416 whether the item or set of items can be retrieved from locations identified in data stored by IMS 1436 in one or more other databases managing item inventory data (not shown). If auto dynamic location resolution engine 1412 determines one or more locations have item(s) for a given subscription in inventory prior to preparing the items for shipment, in some examples, data may be sent to protocol handler 1410, format engine 1422, and communication interface/API 1426 by logic module 1406 and auto dynamic location resolution engine 1412 to generate and send a message to client 1432 with retrieval option(s) and a query for responsive data. If responsive data is generated that indicates a retrieval option other than a default or first option (i.e., a default option) have been selected for obtaining the item(s), then responsive data from client 1432 is received by communication interface/API 1426 and processed by logic module 1406 and order manager 1408 to generate and send additional data to IMS 1436 to override the default option and instead prepare the item(s) for pickup at the location specified in the responsive data. In other examples, if client 1432 is detected being at a location identified by GPS coordinates, for example, by geo data analysis engine, device targeting module 1414 may be configured to work with logic module 1406, auto dynamic location resolution engine 1412, and communication interface/API 1426 to automatically generate and send (i.e., not requiring manual or user intervention and independently operative without requiring invocation of user-specified rules or criteria to initiate communication with client 1436) data in a messaging format (e.g., SMS, iMessage®, messenger, or others) to client 1436 offering a retrieval option for obtaining the item(s) from the location at which client 1432 is resident (as determined by geo data analysis engine 1416) and which is identified as having inventory of the item(s) by IMS 1436. In some examples, protocol handler 1410 may be configured to transform data for transmission from a one protocol to another (e.g., transmission control protocol/Internet protocol (i.e., TCP/IP) to send mail transfer protocol, simple messaging service (SMS), Internet relay chat (IRC), Messenger®, or the like), without limitation or restriction. Message data may also be transmitted from application 402 to various social media, social networks, social applications using native messaging tools or applications provided by social media developers such as Facebook®, Instagram®, Twitter®, Snapchat®, Yelp®, Pinterest®, Amazon.com®, and others.

In some examples, protocol handler 1410 may be configured to transform data from one protocol format to another for transmission between elements of application 1402. Further, format engine 1422 may be implemented to provide functionality to format data for transmission to various endpoints (e.g., client 1432). For example, format engine 1422 may be implemented to generate message data in HTML or text format while, in other examples, other message data may be generated in SMS for transmission to a mobile device (e.g., client 1432). In still other examples, format engine 1422 may generate messaging data in scripting formats such as JavaScript® or Java® to generate and send messages via communication interface/API 1426 to other third party applications or platforms that can convert or transform messaging data for presentation using in-media, native social media, social networks, or social applications, without limitation or restriction. In other examples, application 1402 and the above-described elements may be implemented and configured differently in function and/or structure and are not limited to the descriptions provided above.

Figure 15:
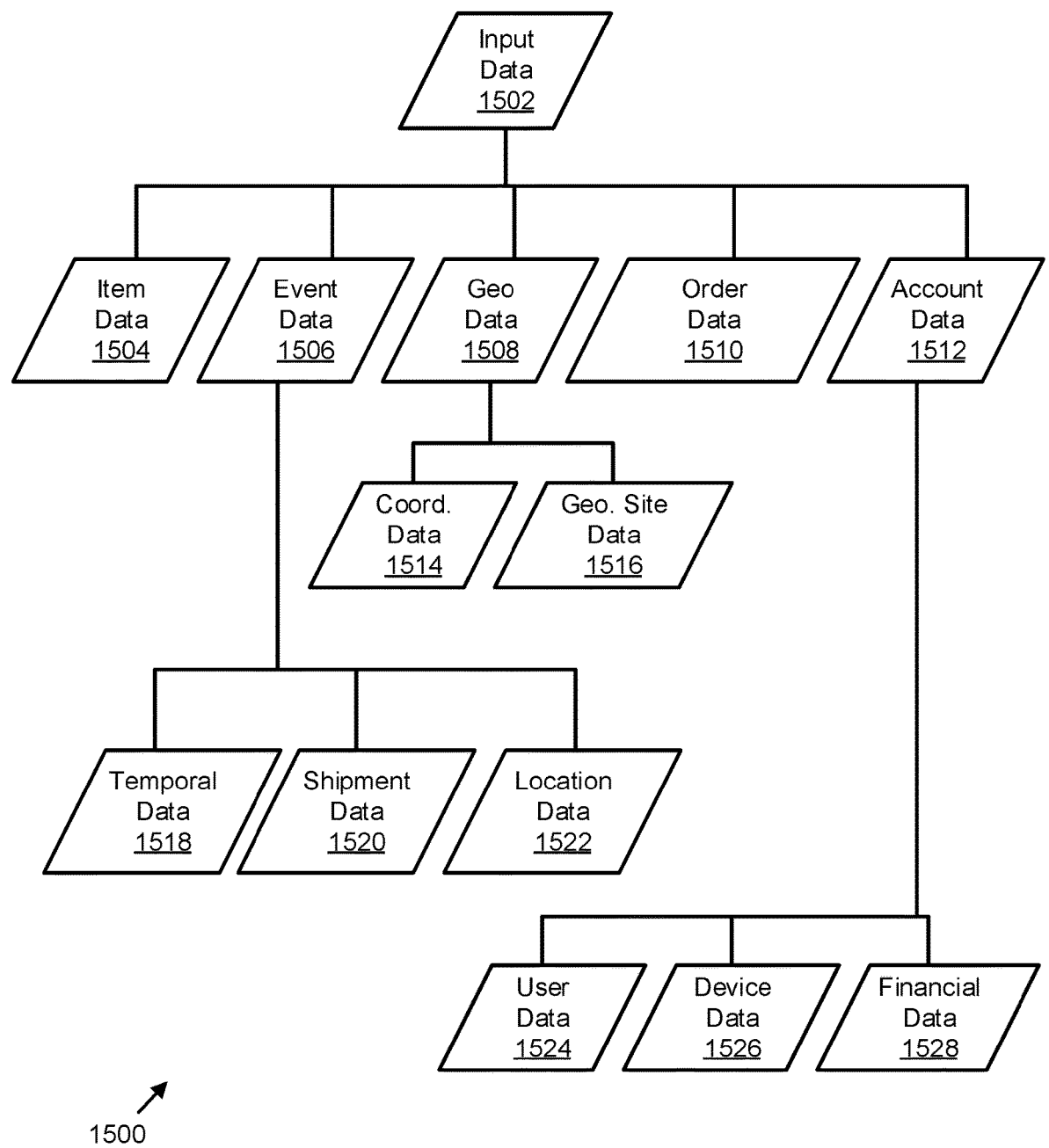
FIG. 15 illustrates exemplary data types operated upon in an exemplary system configured to dynamically process electronic messaging data to automatically generate location predictive retrieval using a networked, multi-stack computing environment.

FIG. 15 illustrates exemplary data types operated upon in an exemplary system configured to dynamically process electronic messaging data to automatically generate location predictive retrieval using a networked, multi-stack computing environment. Here, input data 1502 may be similar to input data 1302 (FIG. 13) as described herein. Input data 1502 may include different types of data that, when parsed by application 1402 (FIG. 14) using logic module 1406 (FIG. 14) and communication interface/API 1426 (FIG. 14) resolve (i.e., parsing to determine and identify) different types, formats, sections/segments/frames/elements, protocols, and structures of data such as those shown and described. Here, input data 1502 may include various sub-types of data including item data 1504, event data 1506, geo data (i.e., geolocation data such as that described above; for all purposes herein, "geo data," "geolocation data," "geolocation site data," and "geographic data" may be used interchangeably and are not intended to have individually different meanings) 1508, order data 1510 (e.g., order/subscription data 1308 (FIG. 13), or databases 1418-1420, or 1430 (FIG. 14)), and account data 1512.

As an example, event data 1506 may have sub-types of data including, but not limited to, temporal data 1518, shipment data 1520, and location data 1522. In some examples, geo data 1508 may have sub-types of data including, but not limited to, coordinate data 1514 and geolocation site data 1516. Order data 1510 may, in some examples, include any type, format, category, or structure of data and/or information associated with the order of a given item. In some examples, order data 1510 may include data or information based on a subscription that invokes a recurring order to be replaced for a given item or as a standalone, one-time, ad hoc, random, or otherwise, non-recurring or non-subscription based order. In other examples, order data 1510 may include other types of data. Further, account data 1512 may have sub-types of data including, but not limited to, user data 1524, device data 1526, and financial data 1528.

Here, item data 1504 may include any type or quantity of data (subject to any particular data structure requirements or limitations) used to describe a given item, such as a product code (e.g., SKU), internal or external product identifier, category, price, unit size, weight, dimensions, specifications, or others, without limitation or restriction. Event data 1506 is a data structure, in some examples, including temporal data 1518, shipment data 1520, and location data 1522. As used herein, temporal data 1518 may be data that describes a frequency, periodicity, or other temporal criteria or threshold for determining when an item(s) is required to be shipped, delivered, or otherwise made available for retrieval using the techniques described herein. Temporal data 1518, for example, may be describe a pre-set or default schedule on which item(s) are to be shipped to a destination or location as indicated by location data 1522. Temporal data 1518 may also include rules for determining when to ship an item, including using sensory input to determine when an item needs to be replenished. In still other examples, temporal data 1518 may include other data that is used to describe when an item(s) is to be shipped or otherwise retrieved using the techniques described herein.

As shown, event data 1506 may also include sub-types of data directed to shipment data 1520 and location data 1522. In some examples, shipment data 1520 may include various types of data related to shipping item(s) ranging from destination locations (i.e., specified by either a street address, store identifier (i.e., store ID), coordinates (e.g., map, GPS, Cartesian, Mercator, latitude/longitude, or others) linked to an account to shipping service types ranging from ground transport to air delivery services. Alternatively, stores from which an item was purchased could also be found in purchase history data (e.g., history data), but which is not linked to an account. In some examples, location data 1522 may include any type of data used to describe a location to which an item(s) is to be shipped, regardless of physical locale (e.g., land and/or sea). In other examples, location data 1522 may also include user-specified location data for nearby sites from which an item(s) may be retrieved or otherwise obtained.

In some examples, geo data or geolocation data 1508 may also include sub-types of data such as coordinate data 1514 and/or geographic site data 1516. The former, in some examples, may describe various types of coordinates for identifying a given location. This may include data and information ranging from street addresses to GPS coordinates to GIS (i.e., geographic information systems) data. Coordinate data 1514 may be retrieved, in some examples, from various types of systems such as GPS or similar satellite-positioning systems and constellations to ground-based location systems utilize cellular, microwave, or other types of radio frequency systems ranging from near-field communication (NFC) to radio frequency identification tags (RFID) to Wi-Fi to Bluetooth® to others, without limitation or restriction. Geographic or geolocation site data 1516 may be data that is used to locate a given site from which an item(s) may be retrieved, shipped, packaged, or is otherwise found in inventory. In other examples, geographic site data 1516 may be retrieved from an inventory management system such as IMS 1314-1318 (FIG. 13) or IMS 1436 (FIG. 14) and may include information such as a store number, store location, address, internal address, facility identifier, zip code, sector, zone, or others, without limitation or restriction. Geo data 1508 and the described sub-types of coordinate data 1514 and geographic site data 1516 may be retrieved from any type of system configured to generate and provide, for example, via communication interface/API 1426, geographic or geolocation data.

As shown and described, account data 1512 may include sub-types of data such as user data 1524, device data 1526, and financial data 1528, all of which were previously described above. As used herein, "financial data" and "payment data" may be used interchangeably and are not intended to be distinguished in the lexicon of the present description. In other examples, financial data 1528 may also include data related to the financial or payment history of a given account or item. The former may refer to the payment or financial history of a given user across one or multiple items while the latter may refer to data retrieved from IMS 1314-1318 (FIG. 13) or 1436 (FIG. 14) and which may include public or privately-available financial data such as the financial performance of a given item, pricing, discounting, shipping charges, freight charges, and the like. In still other examples, more or different types and sub-types of data may be included as input data 1502, which may be used to refer generally to any type, amount, or structure of data provided to application 1402 (FIG. 14) or system 1300 (FIG. 13), without limitation or restriction.

Figure 16:
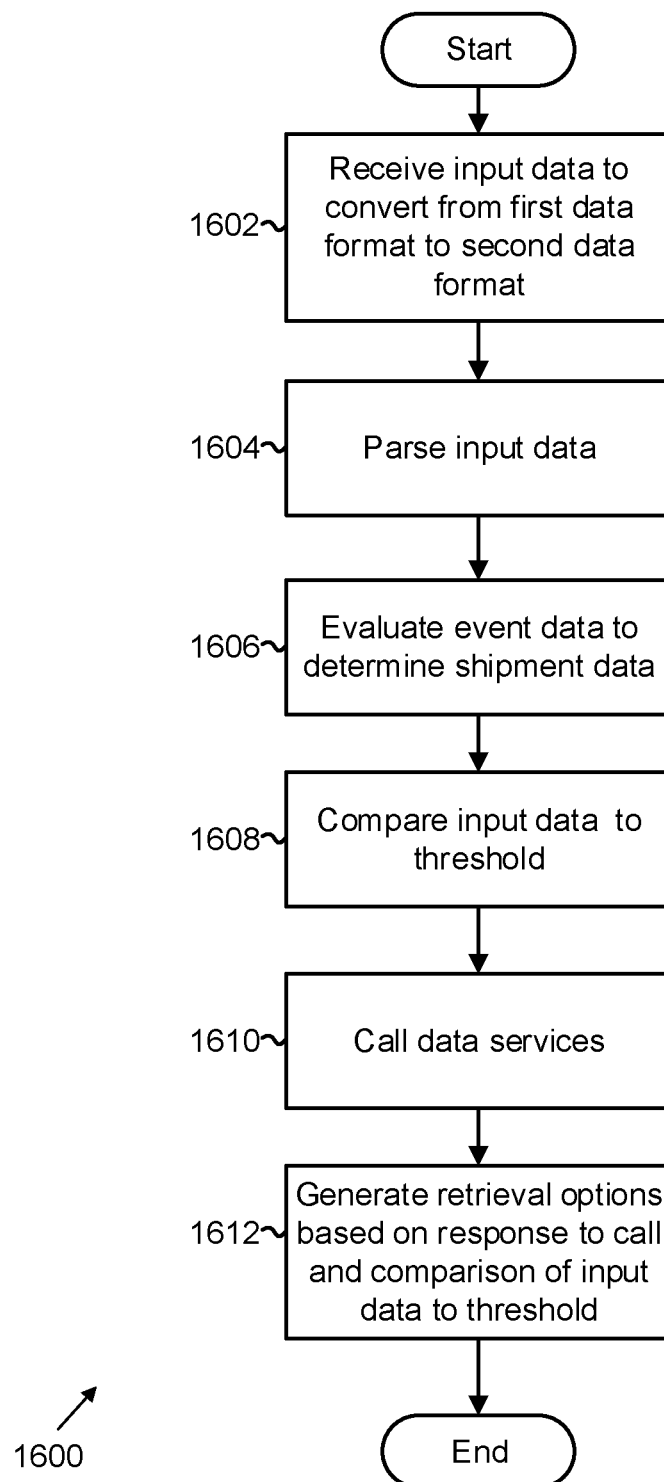
FIG. 16 is an exemplary algorithmic flow diagram to dynamically process electronic messaging data to automatically generate location predictive retrieval using a networked, multi-stack computing environment.

FIG. 16 is an exemplary algorithmic flow diagram to dynamically process electronic messaging data to automatically generate location predictive retrieval using a networked, multi-stack computing environment. Here, process 1600 starts by receiving input data to convert from a first data format to a second data format (1602). As an example, data transferred from auto dynamic location resolution engine 1412 (FIG. 14) in C, C++, Java®, or the like may be converted, transformed, or otherwise modified into a database schema, format, and language such as R or SQL. Next, the input data is processed in the second data format in order to identify respective components of the input data structure, which may include a header, footer, payload, checksum, or the like (1604). The input data (e.g., input data 1302 (FIG. 13)), once parsed, is then evaluated by, for example, logic module 1406, auto dynamic resolution engine 1412, geo data analysis engine 1416, and other modules of application 1402, as invoked, to identify event data and shipment data contained within the input data (1606). Next, input data is compared to a threshold (e.g., 5 miles from a home address specified in account data 1306 (FIG. 13), comparison run against zip codes for store locations against the zip code for a user home address as indicated in account data or a delivery address as indicated in subscription data, and others), the results of which may be configured to initiate auto dynamic location resolution engine 1412 to generate one or more retrieval options as alternatives to fulfilling a default option (i.e., a "first option") shipment to a user's home or shipping address (as indicated in order/subscription data 1308 (FIG. 13)) (1608). Analysis may be performed, in some examples, by geo data analysis engine 1416 (FIG. 14) and auto dynamic location resolution engine 1412 (FIG. 14) by generating and sending a service call to one or more data networks to retrieve location data for a given device or user (1610) or to retrieve other data including data and information as to where prior in-store purchases or "pick ups" (i.e., retrievals) occurred, regardless of whether said addresses are linked to an account. In other words, items may be retrieved from a location (e.g., address) that is not linked to account, but was instead selected as a retrieval location for a past purchase while, for example, traveling outside of a regularly frequented geographic area (e.g., vacation destination, business trip, or the like).

Next, a determination is made as to whether, based on the location of a device associated with a given user's account, to generate a retrieval option to provide an alternative to physically pick up, obtain, or otherwise retrieve an item from a physical location instead of fulfillment through shipping (1612). Alternatively, in some examples, a service call or query may be periodically sent to update the location of a device associated with a user's account. In still other examples, a routine, scheduled, or periodically transmitted call to a service may result in responsive data indicating a device (e.g., mobile or smart phone or tablet computer) is within relatively close proximity to a store location based on comparing geolocation data included in input data 1302. As an example, "close proximity" may be determined by specifying a spatial or distance range or offset to a set of coordinates or other geolocation data to indicate whether a device is located near or within a site that, based on data received from IMS 1314-1318, has a given item(s) in inventory and is available for "in-store pickup" or retrieval. In still other examples, a retrieval option may be generated upon detecting that a given account is involved in a transaction at a location at which the item(s) is in inventory and, because of a threshold comparison (1608), an impending subscription shipment is detected and an alternative retrieval option is presented by generating and sending to a mobile device associated with an account, a query requesting additional input data as to whether to retrieve (i.e., pick up) the item while at a location, if a device associated with the account is determined by geo data analysis engine 1416 (FIG. 14) to be proximate to a stored location identified by IMS 1314-1318 (FIG. 13) or during the course of a transaction at the location as detected by application 1402 (FIG. 14). In other examples, different retrieval options apart from those shown or described may be generated by application 402 and auto dynamic location resolution engine 1412 without limitation or restriction. Process 1600 may be varied in step, order, function, or description, and the above-described example is provided for purposes of illustrating the described techniques.

Figure 17:
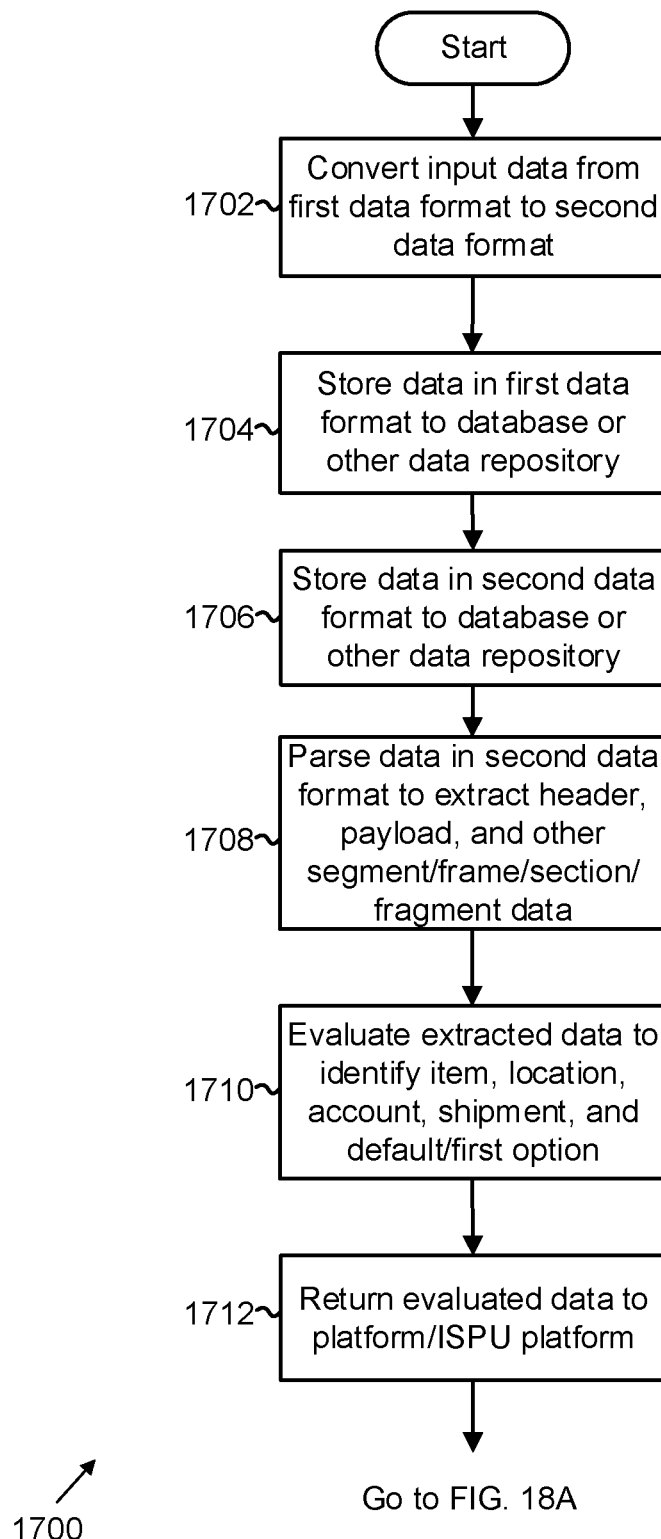
FIG. 17 is an alternative exemplary algorithmic flow diagram to dynamically process electronic messaging data to automatically generate location predictive retrieval using a networked, multi-stack computing environment.

FIG. 17 is an alternative exemplary algorithmic flow diagram to dynamically process electronic messaging data to automatically generate location predictive retrieval using a networked, multi-stack computing environment. Here, alternative process 1700 starts by converting input data (e.g., input data 1302 (FIG. 13), input data 1502 (FIG. 15)) from a first data format to a second data format (1702). Input data in the first data format (i.e., native) may be loaded or stored in a database (e.g., account data 1306 (FIG. 13), order/subscription data 1308 (FIG. 13), databases 1418-1420, 1430 (FIG. 14)) or other data storage facility/repository (1704). Once converted, input data in a second data format may also be stored (1706). Once loaded, an ETL (i.e., extract, transform, load) operation may be performed to parse input data in the first or second data formats to extract components (e.g., header, payload, end bit, footer, checksum, or the like) of the data to be input to logic module 1406 (FIG. 14), geo data analysis engine 1416 (FIG. 14), auto dynamic location resolution engine 1412 (FIG. 14), and other elements of application 1402 (FIG. 14) (1708). Evaluated (i.e., analyzed) input data is then returned to application 1402 and the above-described elements for further evaluation (1710). Process 1700 may be varied in step, order, function, or description, and the above-described example is provided for purposes of illustrating the described techniques.

Figure 18A:
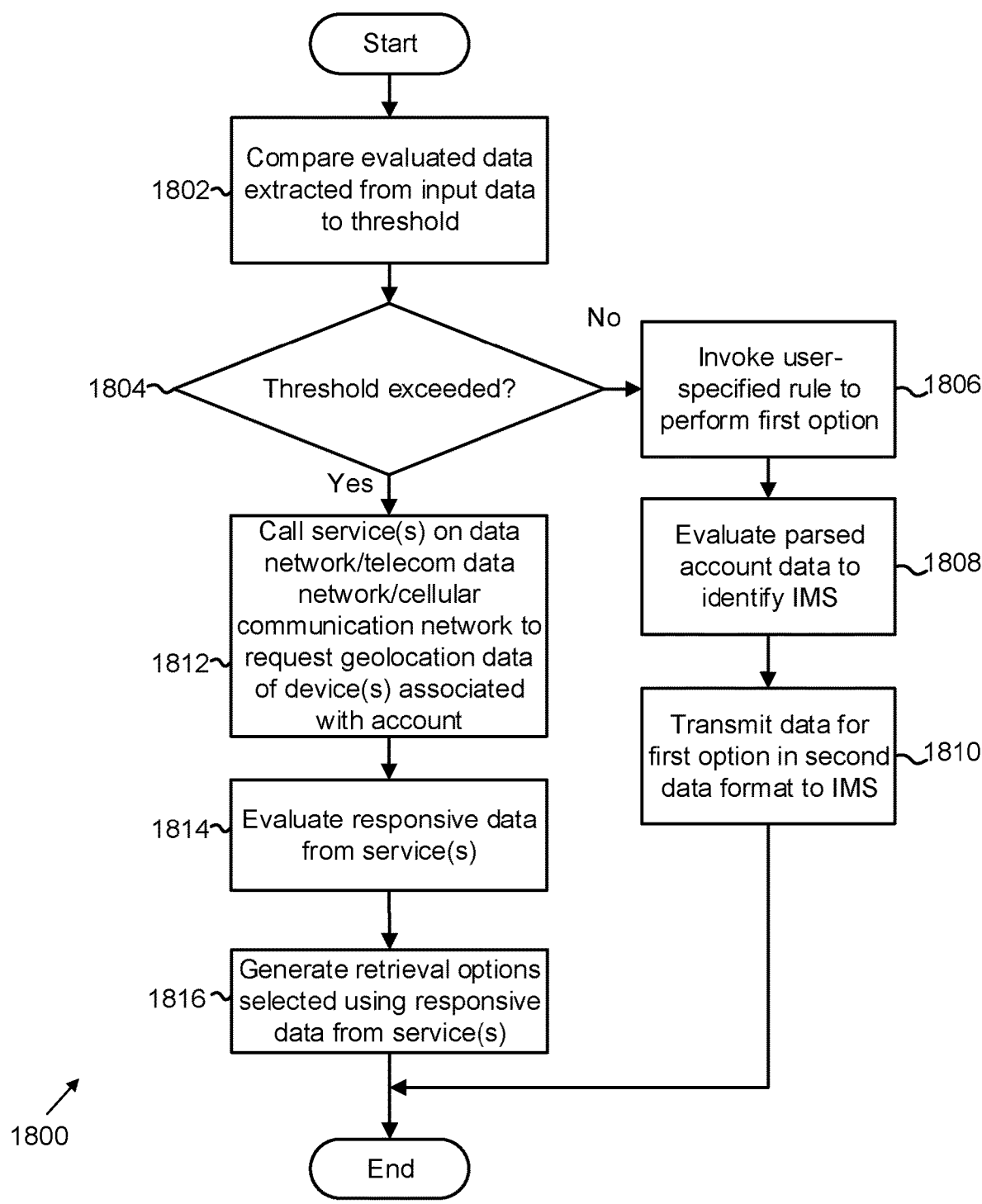
FIG. 18A is another exemplary algorithmic flow diagram to dynamically process electronic messaging data to automatically generate location predictive retrieval using a networked, multi-stack computing environment.

FIG. 18A is another exemplary algorithmic flow diagram to dynamically process electronic messaging data to automatically generate location predictive retrieval using a networked, multi-stack computing environment. Here, evaluated data from input data 1302/1502 (FIGS. 13, 15) is compared to a threshold to determine whether alternative retrieval options to a default or first option are available for generation (1802). For example, if location data extracted from input data indicates a device associated with an account is outside a threshold distance from any nearby stores that have in inventory a given item, then a default or first option for fulfillment (e.g., shipment) is executed. If a threshold is not exceeded (1804), then user-specified rules are invoked to perform a first option for fulfillment (1806). In other examples, a different type or structure of threshold may be used and is not limited to a comparison in which a determination is made as to whether the threshold is exceeded, but instead whether a comparison results in a determination that input data is below the threshold. Likewise, a comparison of input data to a threshold may be performed using data other than location data. For example, a comparison of input data to determine temporal proximity to an impending shipment date may be performed to determine when, within a given threshold from a shipment data (e.g., 72 hours from shipment of a next order of a subscribed item) to generate an alternative retrieval option for, in some examples, picking up or retrieving an item in-store.

Referring back to FIG. 18A, parsed account data from input data 1302/1502 is evaluated to identify an item that, when referenced against a lookup table, spreadsheet, record, or other type of database structure, indicates a corresponding IMS (1808). Once an IMS has been determined, data may be transmitted from application 1402 using communication interface/API 1426 to IMS 1436 (FIG. 14) (1810).

Alternatively, if a threshold is exceeded, a call to a service (i.e., a data-based query to a computing service, application, or platform) on a data network, telecommunications network, cellular communications network, or the like is made (1812). Calling a service on these networks is performed, in some examples, to request geolocation data for a device associated with an account. Upon receiving a response to a service call, responsive data is evaluated further to determine, for example, geolocation data of a device associated with an account (1814). In some examples, geolocation data may include a current location of a device using GPS coordinates, Cartesian coordinates, or cellular network coordinates. Using geolocation data returned in response to a service call, retrieval option(s) are generated (1816). However, in other examples, service calls to query and retrieve geolocation data are not required and retrieval options may be generated based on other factors such as temporal proximity to a shipment date. For example, when an item for a subscription approaches a shipment date, a retrieval option may be generated using geolocation data from IMS 1314-1318 (FIG. 13) to determine whether any locations proximate to a user's home address as specified in account data 1306 (FIG. 13) have the item in inventory. Other alternative retrieval options may be generated and are not limited to those shown and described here. Further, process 1800 may be varied in step, order, function, or description, and the above-described example is provided for purposes of illustrating the described techniques.

Figure 18B:
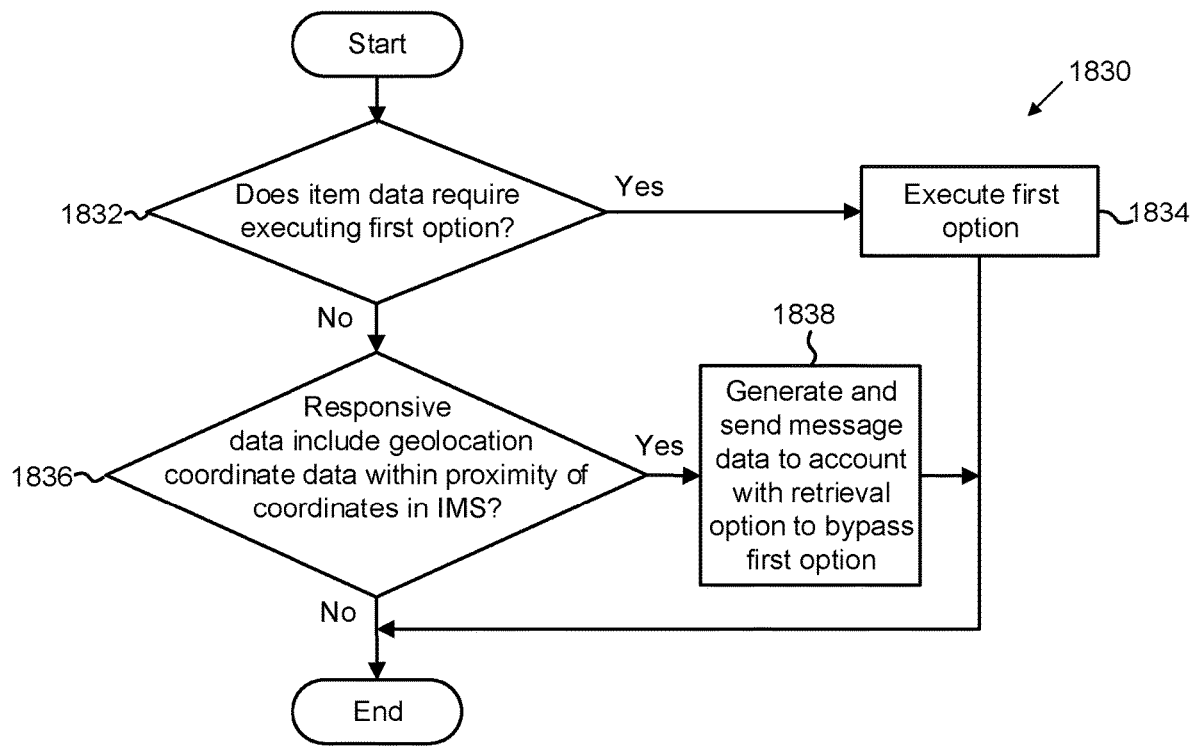
FIG. 18B is a further exemplary algorithmic flow diagram to dynamically process electronic messaging data to automatically generate location predictive retrieval using a networked, multi-stack computing environment.

FIG. 18B is an algorithmic flow diagram of an exemplary process to automatically generate location predictive retrieval using a networked, multi-stack computing environment. Here, a determination is made as to whether item data (e.g., item data 1504 (FIG. 15)) included in input data (e.g., input data 1302 (FIG. 13)/1502 (FIG. 15)) includes data that, when parsed and evaluated, indicates a first option is to be executed (1832). As an example, a first option may be a default option to ship an item of a subscription to a home address specified in account data 1306 (FIG. 13). However, as described herein in, alternative or retrieval options may be generated, for example, by auto dynamic location resolution engine 1412 (FIG. 14) that transfer data to client 1432 (FIG. 14) and IMS 1436 (FIG. 14). If evaluated input data (e.g., from FIG. 18A) indicates a first option is required to be executed, the first option is executed by IMS 1436 and process 1830 ends (1834). However, if evaluated input data including item data indicates a first option is not required to be executed, then another determination is made as to whether data sent in response to a service call includes geolocation data that, when evaluated, indicates a device associated with an account is proximate to a location stored in an IMS-managed database (e.g., databases 1320-1330 (FIG. 13)) (1836). If not, then process 1830 ends. However, if a device associated with an account is proximate to a location indicated by IMS 1436, then message data is generated by logic module 1406, protocol handler 1410, format engine 1422, and transferred/transmitted over communication interface/API 1426 and, subsequently, a data command to override the first option is generated and processed, thus preventing shipment in favor of retrieval of the item from a store, warehouse, or other physical location (1838). In other examples, process 1830 may be varied in step, order, function, or description, and the above-described example is provided for purposes of illustrating the described techniques.

Figure 18C:
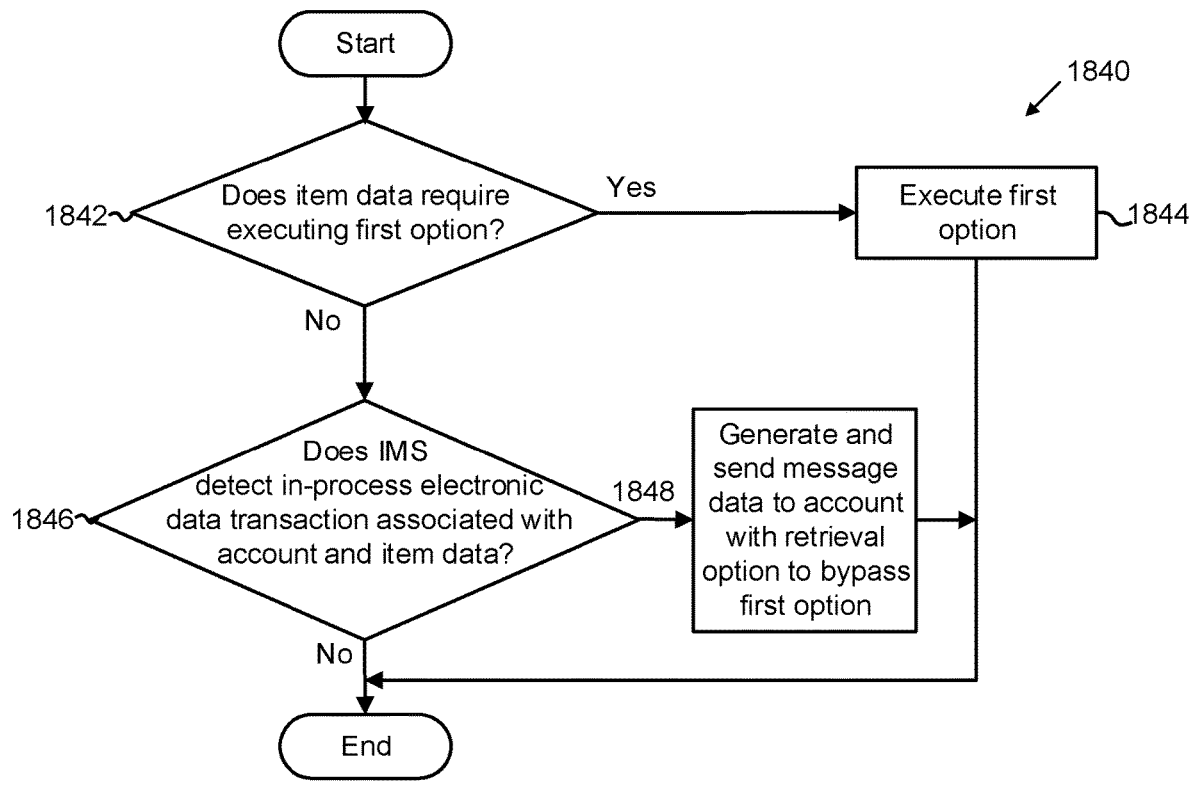
FIG. 18C is another exemplary algorithmic flow diagram to dynamically process electronic messaging data to automatically generate location predictive retrieval using a networked, multi-stack computing environment.

FIG. 18C is an alternative algorithmic flow diagram of an exemplary process to automatically generate location predictive retrieval using a networked, multi-stack computing environment. Here, a determination is made as to whether item data (e.g., item data 1504 (FIG. 15)) includes data that indicates a first option is required to be executed (1842). If required, the first option is executed and process 1840 ends (1844). Alternatively, if item data 1502 does not include data that requires a first option to be executed, then another determination is made as to whether an IMS (e.g., IMS 1436 (FIG. 14)) has detected an in-process electronic transaction (i.e., received data indicating an electronic data transaction is being performed at a location indicated by location data stored in one or more databases managed and accessed by an IMS (e.g., databases 1320-1330) (FIG. 13)) (1846). In some examples, a detected in-process electronic transaction may be transmitting data to IMS 1436 (FIG. 14) identifying an account that has matching data (e.g., payment data, location data, subscription data, or other account data) to that of a record or file stored in account data 1306 (FIG. 13), subscription data (1308 (FIG. 13), or IMS databases 1320-1330 (FIG. 13). In other examples, a detected in-process electronic transaction may include transmission of item data for items other than an impending subscription fulfillment, but for which potential retrieval options may be generated. If detected, then message data may be generated and transmitted to client 1432 (FIG. 14) with data indicating one or more retrieval options that, if invoked, would override the first option (1848). Process 1840 may be varied in step, order, function, or description, and the above-described example is provided for purposes of illustrating the described techniques.

Figure 18D:
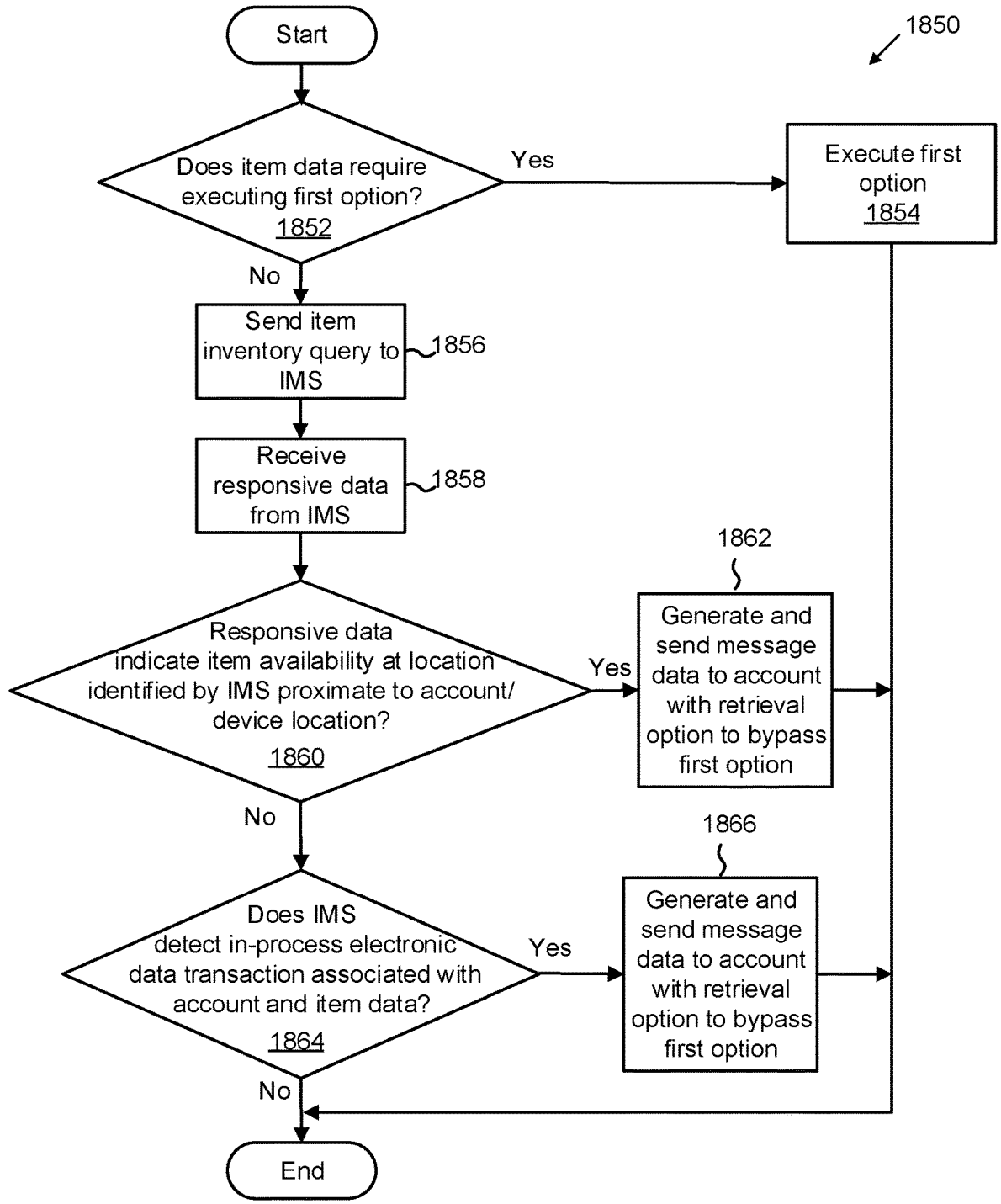
FIG. 18D is yet another exemplary algorithmic flow diagram to dynamically process electronic messaging data to automatically generate location predictive retrieval using a networked, multi-stack computing environment.

FIG. 18D is another alternative algorithmic flow diagram of an exemplary process to automatically generate location predictive retrieval using a networked, multi-stack computing environment. Here, process 1850 starts by making a determination as to whether item data (e.g., item data 1502 (FIG. 15)) indicates a requirement to execute a first option (1852). If a first option is required, then the option is executed and process 1850 ends (1854). If the first option is not required, then a query is sent to IMS requesting inventory data on a given item (1856). Responsive data, in some examples, is received from an IMS (e.g., IMS 1314-1318 (FIG. 13), IMS 1436 (FIG. 14)) (1858). Next, a determination is made as to whether the responsive data indicates the item is available or in inventory at a location proximate to that of a device associated with an account identified in account data 1306 (1860). If the item is available, then a message is generated and sent to a device associated with the account including a query requesting input data as to whether to override a first option (i.e., a default option to ship an item for a subscription to an address specified in account data 1306 (FIG. 13) and/or order/subscription data 1308 (FIG. 13)) (1862). Alternatively, if an item is not available at a location proximate to that of a device associated with an identified account (i.e., an account identified by evaluating account data 1306 (FIG. 13)), then a further determination is made as to whether application 1402 has detected an in-process electronic data transaction associated with an account identified as being stored in account data 1306 (FIG. 13) (1864). If no in-process electronic data transaction is detected, then process 1850 ends. However, if an in-process electronic data transaction is detected, then message data is generated and sent to a device associated with an account identified in account data 1306 (1866) and then process 1850 ends. In other examples, process 1850 may be varied in step, order, function, or description, and the above-described example is provided for purposes of illustrating the described techniques.

Figure 18E:
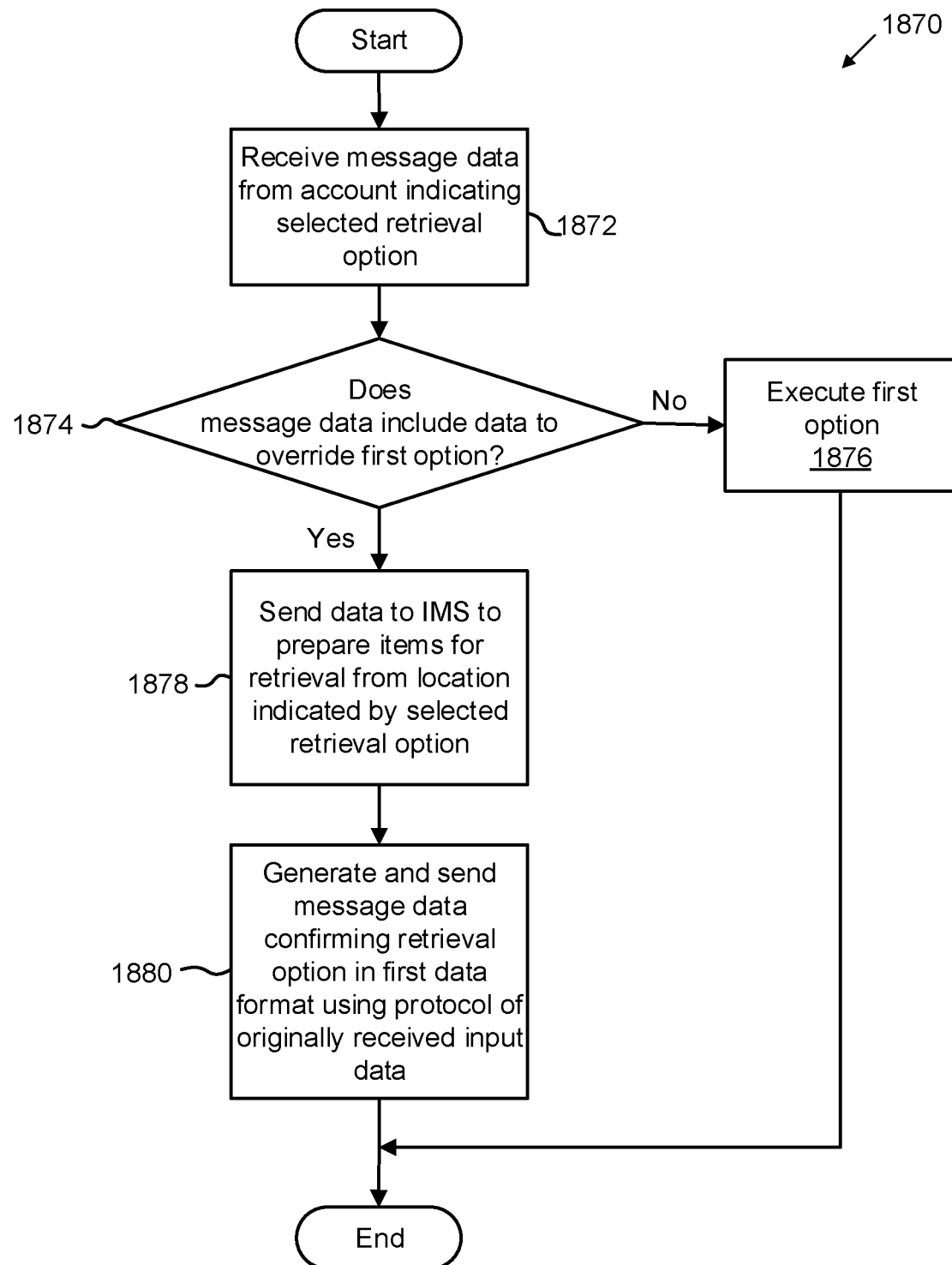
FIG. 18E is a still further exemplary algorithmic flow diagram to dynamically process electronic messaging data to automatically generate location predictive retrieval using a networked, multi-stack computing environment.

FIG. 18E is yet another alternative algorithmic flow diagram of an exemplary process to automatically generate location predictive retrieval using a networked, multi-stack computing environment. Here, alternative process 1870 starts by receiving message data from an account identified in account data 1306 (FIG. 13) indicating a retrieval option has been selected (1872). In some examples, process 1870 may be an extended process of those shown and described above in connection with FIGS. 18A-18D that occurs when a response is received to a query included in message data sent with retrieval option data (i.e., data underlying a query or request to a user to select an option to retrieve an item from a physical location thus overriding a default shipping option). As shown, received message data is evaluated by application 1402 (FIG. 14) to determine whether there is included data indicating a first option (as described above) has been selected (1874). If not, a first option (e.g., a default option to ship an item that is subject to a subscription) is then executed (1876). If the message data includes data to override the first option (i.e., the received and evaluated message data includes data responsive to a query presenting retrieval options), then other data is sent to IMS 1436 (FIG. 14) to prepare the item(s) for retrieval from a location indicated by the selected retrieval option (1878). Next, message data is generated and sent to one or more devices associated with an account identified in account data 1306 to confirm the retrieval option and provide item data from IMS 1436 (FIG. 14) once the item has been prepared for retrieval (1880). The message data is prepared and sent in the data format native to the original message data received as input data 1302 (FIG. 13)/1502 (FIG. 15) and using the same data transmission protocol (e.g., TCP/IP, SMTP, SMS, or others). Process 1870 may be varied in step, order, function, or description, and the above-described example is provided for purposes of illustrating the described techniques.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method, comprising:
 receiving from a device geolocation data and input data configured to identify an item, the input data being converted from a first data format to a second data format;
 parsing the input data in the second data format to extract event data and location data associated with the item and other location data associated with the device;
 evaluating the event data and the location data to generate shipment data configured to identify a first location from which to send the item to a second location associated with a destination at which to receive the item, an account associated with a subscription providing the input data, and one or more options associated with the item;
 parsing the account to identify subscription data;
 selecting a sample associated with another item, the sample being selected by an adaptive distribution platform;
 transmitting other data to the device that, when processed by the device, renders an electronically-displayed message on an interface on the device, the other data being configured to solicit feedback about the sample, the feedback being configured to be transmitted from the device to the adaptive distribution platform before expiration of a time period;
 calling one or more data services to retrieve item data associated with the item, the item data being compared to the geolocation data and the input data received from the device and being used to generate a determination of proximity of the device to the first location identified by an inventory management system to present, using a logic module, protocol handler, and format engine a query requesting additional input data from the device associated with retrieval of the item from the first location or an alternative location; and
 generating a retrieval option associated with the item if the threshold, the query, and the additional input data indicates the device is within a numerical range of the first location or an alternative location and retrieval of the item from the first location is indicated.

2. The method of claim 1, wherein the geolocation data indicates a geographic location of a physical device.

3. The method of claim 1, wherein the geolocation data indicates a geographic location of a mobile device.

4. The method of claim 1, wherein the device is a mobile computing device configured to transmit the input data and the geolocation data to the adaptive distribution platform using a data network.

5. The method of claim 1, wherein the subscription is configured to indicate purchase and shipment of the item to the second location.

6. The method of claim 1, wherein the subscription is configured to indicate purchase and shipment of the item to the second location according to a schedule associated with the account.

7. The method of claim 1, wherein the input data is transmitted from a database management system to the adaptive distribution platform configured to execute one or more program instructions associated with the method.

8. The method of claim 1, wherein the input data is transmitted from a database management system to the adaptive distribution platform, the adaptive distribution platform being in data communication with an inventory management system.

9. The method of claim 1, wherein the item and the sample are retrieved from the first location.

10. The method of claim 1, wherein the item is retrieved from the first location and the sample is retrieved from a third location.

11. The method of claim 1, wherein the retrieval option comprises data transmitted to a data management system configured to identify at least one of the one or more items.

12. The method of claim 1, wherein the retrieval option is configured to identify a device location associated with the device and to determine proximity of the device to the first location.

13. The method of claim 1, wherein the retrieval option is configured to identify a device location associated with the device and to determine proximity of the device to the first location or another location at which a copy of the item is stored.

14. The method of claim 1, further comprising:
 determining a numerical range indicating proximity of the device to the item; and
 generating a query to retrieve the item from another location proximate to the device.

15. A system, comprising:
 a memory configured to store data generated using an application associated with a device; and
 a processor configured to receive from a device geolocation data and input data configured to identify an item, the input data being converted from a first data format to a second data format, to parse the input data in the second data format to extract event data and location data associated with the item and other location data associated with the device, to evaluate the event data and the location data to generate shipment data configured to identify a first location from which to send the item to a second location associated with a destination at which to receive the item, an account associated with a subscription providing the input data, and one or more options associated with the item, to parse the account to identify subscription data, to select a sample associated with another item, the sample being selected by an adaptive distribution platform, to transmit other data to the device that, when processed by the device, renders an electronically-displayed message on an interface on the device, the other data being configured to solicit feedback about the sample, the feedback being configured to be transmitted from the device to the adaptive distribution platform before expiration of a time period, to call one or more data services to retrieve item data associated with the item, the item data being compared to the geolocation data and the input data received from the device and being used to generate a determination of proximity of the device to the first location identified by an inventory management system to present, using a logic module, protocol handler, and format engine a query requesting additional input data from the device associated with retrieval of the item from the first location or an alternative location, and to generate a retrieval option associated with the item if the threshold, the query, and the additional input data indicates the device is within a numerical range of the first location or an alternative location and retrieval of the item from the first location is indicated.

16. The system of claim 15, wherein the adaptive distribution platform is configured to implement the processor.

17. The system of claim 15, wherein the device is a mobile computing device.

18. The system of claim 15, wherein the one or more data services are called using an application programming interface configured to transmit data from a data network.

19. The system of claim 15, wherein the one or more data services are called from the adaptive distribution platform using an application programming interface to one or more host services that are configured to transmit data over a data network in response to a query from the adaptive distribution platform.

20. A non-transitory computer readable medium having one or more computer program instructions configured to perform a method, the method comprising:

receiving from a device geolocation data and input data configured to identify an item, the input data being converted from a first data format to a second data format;

parsing the input data in the second data format to extract event data and location data associated with the item and other location data associated with the device;

evaluating the event data and the location data to generate shipment data configured to identify a first location from which to send the item to a second location associated with a destination at which to receive the item, an account associated with a subscription providing the input data, and one or more options associated with the item;

parsing the account to identify subscription data;

selecting a sample associated with another item, the sample being selected by an adaptive distribution platform;

transmitting other data to the device that, when processed by the device, renders an electronically-displayed message on an interface on the device, the other data being configured to solicit feedback about the sample, the feedback being configured to be transmitted from the device to the adaptive distribution platform before expiration of a time period;

calling one or more data services to retrieve item data associated with the item, the item data being compared to the geolocation data and the input data received from the device and being used to generate a determination of proximity of the device to the first location identified by an inventory management system to present, using a logic module, protocol handler, and format engine a query requesting additional input data from the device associated with retrieval of the item from the first location or an alternative location; and generating a retrieval option associated with the item if the threshold, the query, and the additional input data indicates the device is within a numerical range of the first location or an alternative location and retrieval of the item from the first location is indicated.

* * * * *